(12) United States Patent
Chen

(10) Patent No.: US 9,423,879 B2
(45) Date of Patent: Aug. 23, 2016

(54) SYSTEMS AND METHODS FOR CONTROLLING DEVICE OPERATION ACCORDING TO HAND GESTURES

(71) Applicant: Chia Ming Chen, Cambridge, MA (US)

(72) Inventor: Chia Ming Chen, Cambridge, MA (US)

( * ) Notice: Subject to any disclaimer, the term of this patent is extended or adjusted under 35 U.S.C. 154(b) by 0 days.

(21) Appl. No.: 14/318,019

(22) Filed: Jun. 27, 2014

(65) Prior Publication Data

US 2015/0002391 A1   Jan. 1, 2015

Related U.S. Application Data

(60) Provisional application No. 61/840,791, filed on Jun. 28, 2013.

(51) Int. Cl.
*G06F 3/01* (2006.01)
*G01J 3/50* (2006.01)

(52) U.S. Cl.
CPC ..................................... *G06F 3/017* (2013.01)

(58) Field of Classification Search
USPC ...................................... 345/156; 348/47, 48
See application file for complete search history.

(56) References Cited

U.S. PATENT DOCUMENTS

| | | | |
|---|---|---|---|
| 4,843,522 A | 6/1989 | Rosenberg | |
| 4,985,651 A | 1/1991 | Chitayat | |
| 8,139,935 B2 | 3/2012 | Pace et al. | |
| 8,455,830 B2 | 6/2013 | Westaway | |
| 8,854,433 B1 * | 10/2014 | Rafii .................. | G06F 3/017 348/42 |
| 2003/0067773 A1 | 4/2003 | Marshall et al. | |
| 2005/0029458 A1 | 2/2005 | Geng et al. | |
| 2005/0087601 A1 | 4/2005 | Gerst, III et al. | |
| 2005/0228366 A1 | 10/2005 | Kessler et al. | |
| 2006/0119865 A1 | 6/2006 | Hoyt et al. | |
| 2007/0023661 A1 | 2/2007 | Wagner et al. | |
| 2008/0256494 A1 | 10/2008 | Greenfield | |
| 2008/0294017 A1 | 11/2008 | Gobeyn et al. | |
| 2008/0294315 A1 | 11/2008 | Breed | |
| 2009/0027682 A1 | 1/2009 | Hebert et al. | |
| 2009/0040299 A1 | 2/2009 | Harrison et al. | |
| 2009/0103780 A1 * | 4/2009 | Nishihara et al. ............. | 382/103 |

(Continued)

FOREIGN PATENT DOCUMENTS

| | | |
|---|---|---|
| EP | 0903608 | 3/1999 |
| EP | 2463751 A2 * | 6/2012 |

(Continued)

OTHER PUBLICATIONS

International Search Report and Written Opinion dated Nov. 7, 2014, issued in corresponding International Application No. PCT/US14/44643.
International Search Report and Written Opinion dated Oct. 27, 2014, issued in corresponding International Application No. PCT/US14/46807.

(Continued)

*Primary Examiner* — Jason Olson
*Assistant Examiner* — Deeprose Subedi
(74) *Attorney, Agent, or Firm* — Onello & Mello, LLP

(57) ABSTRACT

Provided is a non-contact sensing device that comprises a sensor comprising a plurality of function key sensors. A function key sensor of the plurality of function key sensors has a field of view. The function key sensor is constructed and arranged to detect a hand gesture at the field of view and to generate a function key control signal in response to detecting the hand gesture at the field of view. A processor processes the function key control signal from the function key sensor and outputs a command to a remote apparatus in response to the processed control signal.

21 Claims, 50 Drawing Sheets

(56) References Cited

U.S. PATENT DOCUMENTS

| | | | |
|---|---|---|---|
| 2010/0066821 A1 | 3/2010 | Rosener et al. | |
| 2010/0128109 A1 | 5/2010 | Banks | |
| 2010/0151946 A1 | 6/2010 | Wilson et al. | |
| 2010/0176270 A1 | 7/2010 | Lau et al. | |
| 2010/0200753 A1 | 8/2010 | Westaway | |
| 2011/0102763 A1 | 5/2011 | Brown et al. | |
| 2011/0103063 A1 | 5/2011 | Jurik | |
| 2011/0221599 A1* | 9/2011 | Hogasten | H01L 27/14609 340/632 |
| 2011/0242042 A1 | 10/2011 | Xu | |
| 2011/0301934 A1* | 12/2011 | Tardif | G06F 3/017 704/1 |
| 2012/0075463 A1 | 3/2012 | Chen et al. | |
| 2012/0146903 A1 | 6/2012 | Arihara et al. | |
| 2012/0194083 A1 | 8/2012 | Henig et al. | |
| 2012/0320092 A1* | 12/2012 | Shin et al. | 345/633 |
| 2013/0063042 A1 | 3/2013 | Bora et al. | |
| 2013/0101276 A1 | 4/2013 | Keller et al. | |
| 2013/0120238 A1 | 5/2013 | Spaulding et al. | |
| 2013/0128334 A1 | 5/2013 | Stephen | |
| 2013/0131836 A1 | 5/2013 | Katz et al. | |
| 2013/0193315 A1 | 8/2013 | Shemesh | |
| 2013/0208481 A1 | 8/2013 | Sooferian | |
| 2013/0293722 A1 | 11/2013 | Chen | |
| 2015/0002046 A1 | 1/2015 | Schlangen | |
| 2015/0002391 A1 | 1/2015 | Chen | |
| 2015/0023019 A1 | 1/2015 | Chen | |
| 2015/0049062 A1* | 2/2015 | Kim | G06F 3/0304 345/175 |

FOREIGN PATENT DOCUMENTS

| | | |
|---|---|---|
| WO | 03031923 | 4/2003 |
| WO | 2010138741 | 12/2010 |
| WO | 2012001677 | 1/2012 |
| WO | 2013076606 | 5/2013 |

OTHER PUBLICATIONS

International Search Report and Written Opinion dated Sep. 23, 2013, issued in correspoding International Application No. PCT/US2013/039666.

Borah et al.: A review of communication-oriented optical wireless systems. EURASIP Journal on Wireless Communications and Networking 2012, 2012:91.

Elgala ety al.: OFDM Visible Light Wireless Communication Based on White LEDs. IEEE 2007, pp. 2185-2189.

Elgala et al.: Indoor Optical Wireless Communication: Potential and State-of-the-Art. IEEE Communications Magazine. Sep. 2011, pp. 56-62.

Herbst et al.: Basics of 3D Digital Image Correlation. Dantec Dynamics Application Note—T-Q-400-Basics-3DCORR-002a-EN.

Kumar et al.: Visible Light Communication Systems Conception and VIDAS. IETE Technical Review, vol. 25 Issue 6. Nov.-Dec. 2008, pp. 359-367.

Sun: Fast Stereo Matching Using Rectangular Subregioning and 3D Maximum-Surface Techniques. International Journal of Computer Vision, vol. 46 No. 1/2/3, pp. 99-117, May 2002.

Wang, et al.: 12.5 Gbps Indoor Optical Wireless Communication System with Single Channel Imaging Receiver. ECOC Technical Digest 2011 OSA.

Wu, et al.: Modulation based cells distribution for visible light communication. Optic Express, vol. 20, No. 22, Oct. 2012.

Office Action issued on Feb. 5, 2016 in U.S. Appl. No. 14/048,505.

International Search Report and the Written Opinion dated Oct. 8, 2015, issued in corresponding International Patent Application No. PCT/US15/28163.

Office Action dated Aug. 7, 2015 issued in U.S. Appl. No. 13/826,177.

International Preliminary Report of Patentability dated Jan. 7, 2016, issued in corresponding International Patent Application No. PCT/US2014/044643.

* cited by examiner

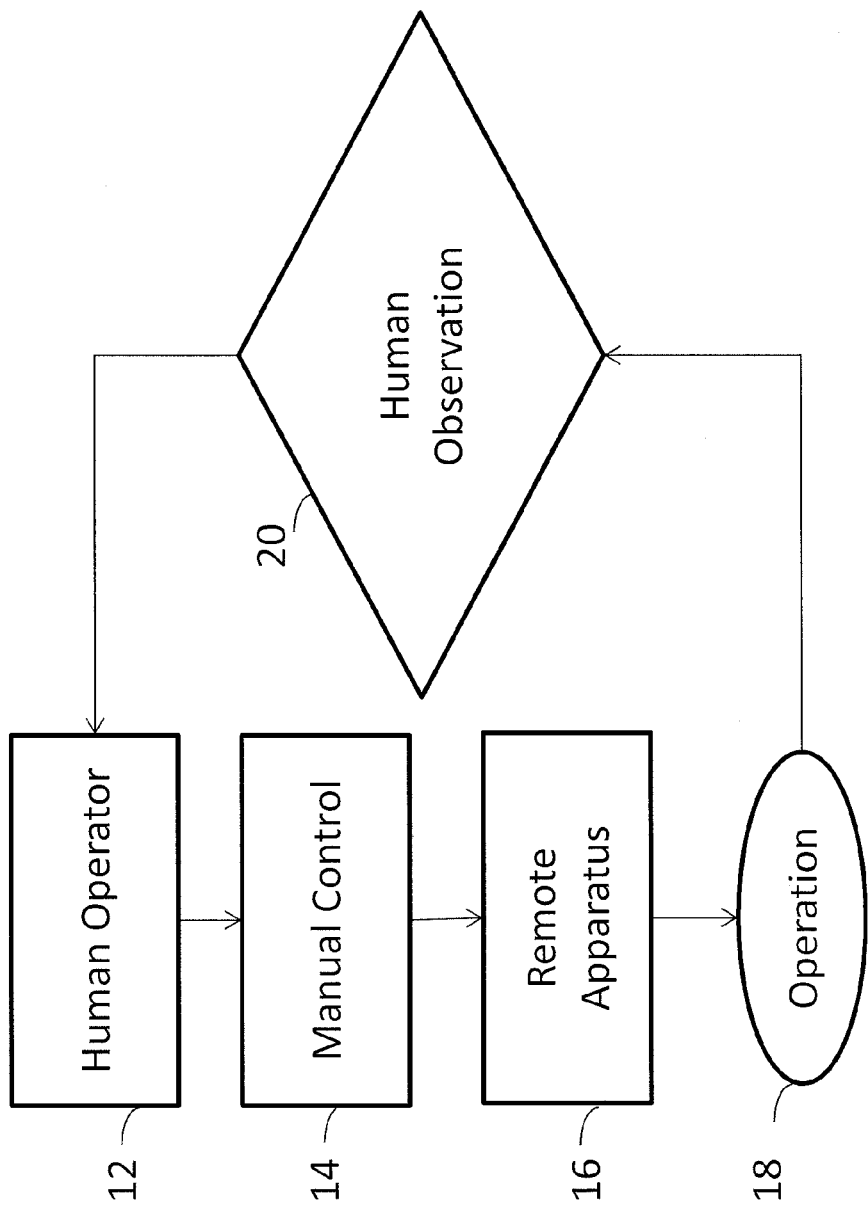

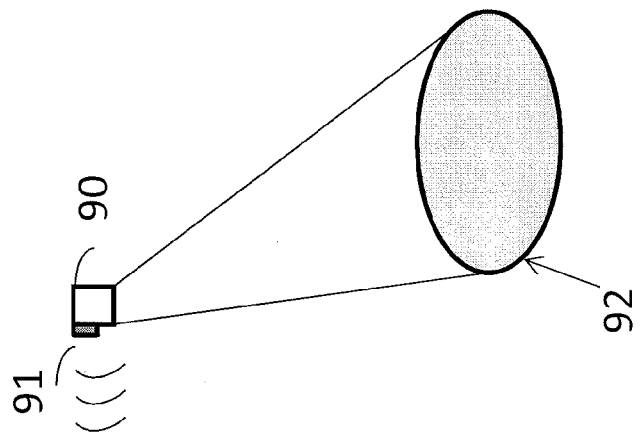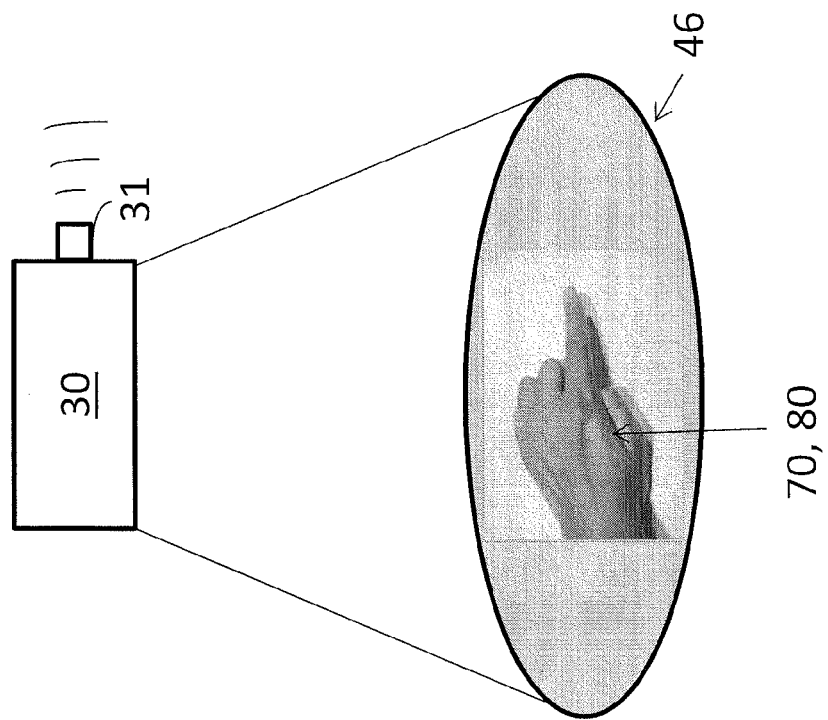
Figure 6

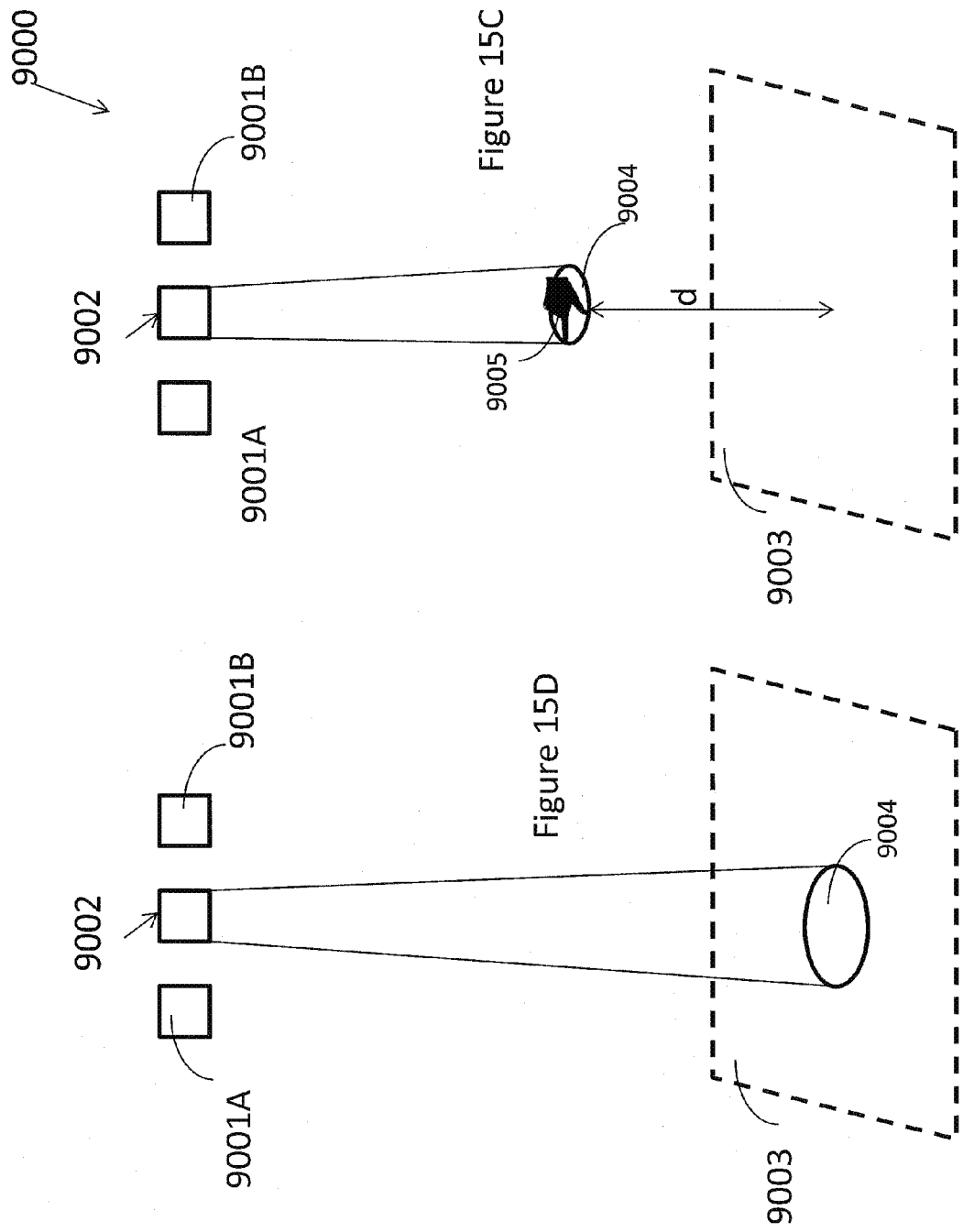

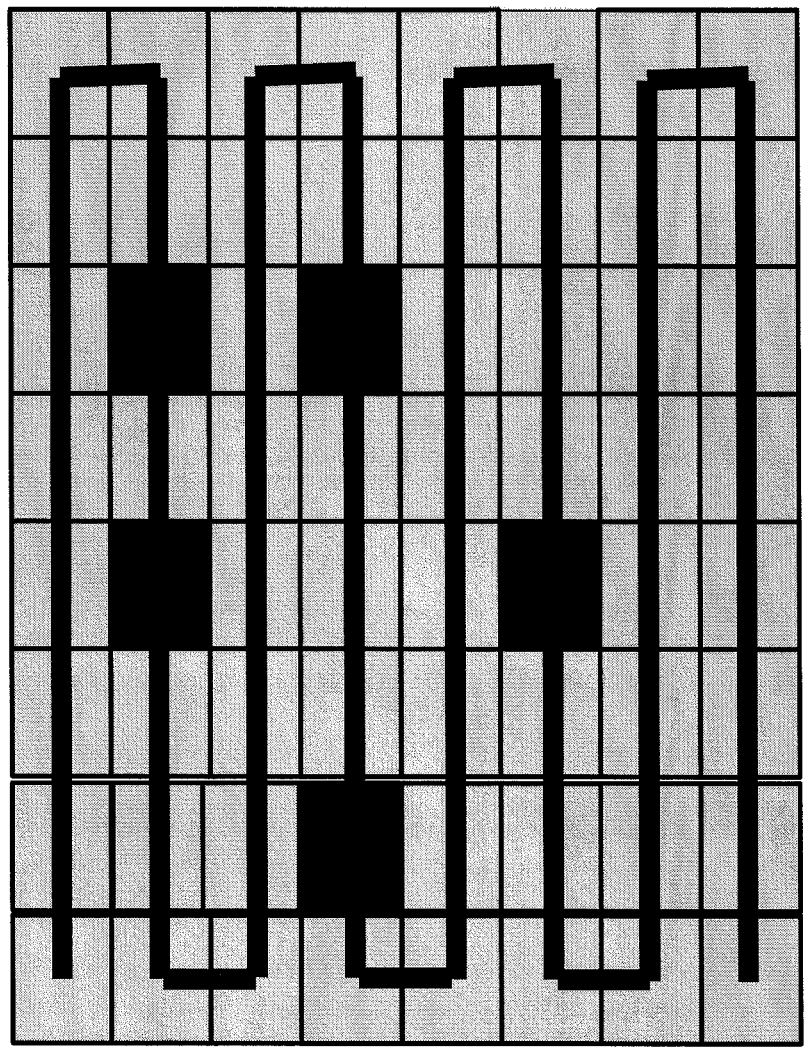
2100B
Figure 21B
Function key pixel
Non-function key pixel

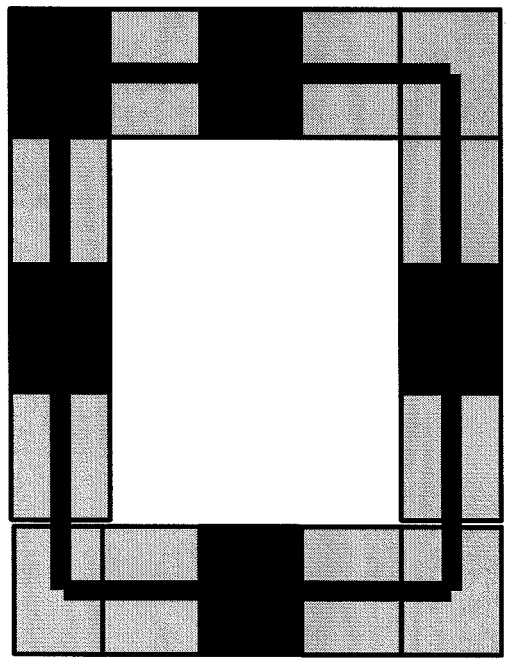
2100C
 Function key pixel
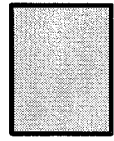 Non-function key pixel
Figure 21C

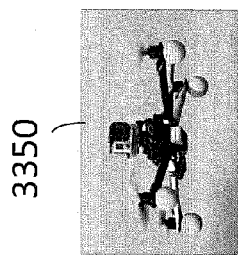
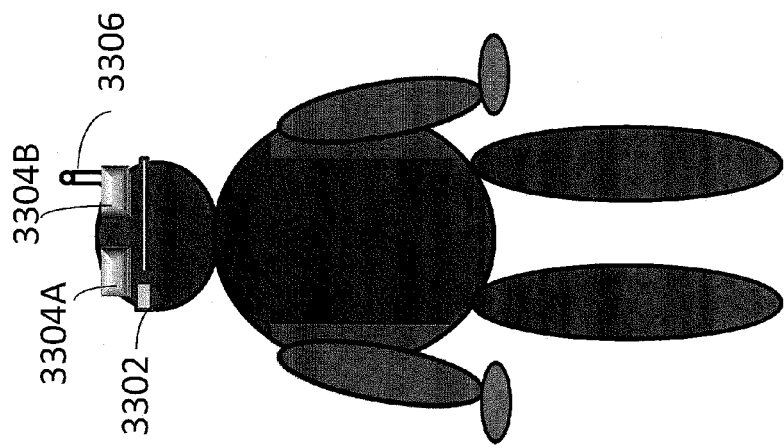
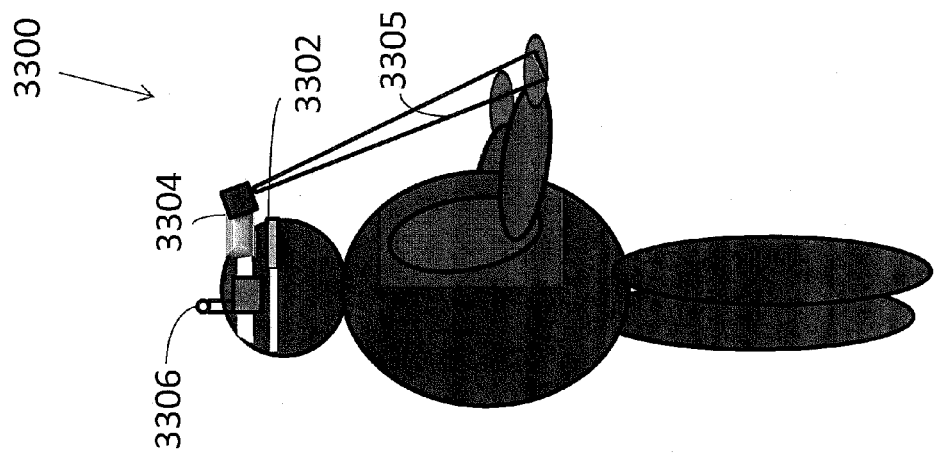
Figure 33A
Figure 33B
Figure 33C

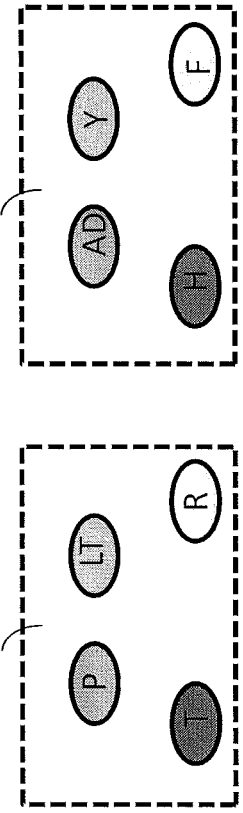
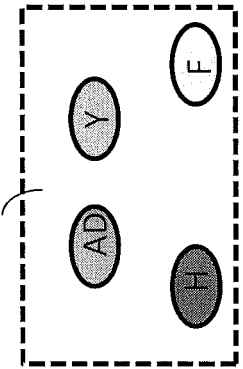
Figure 34

Flight track

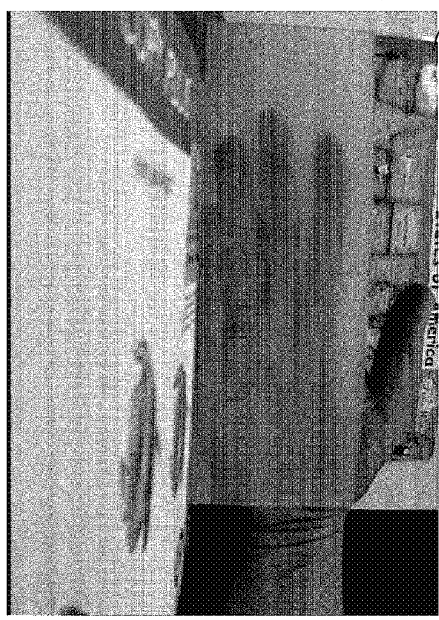
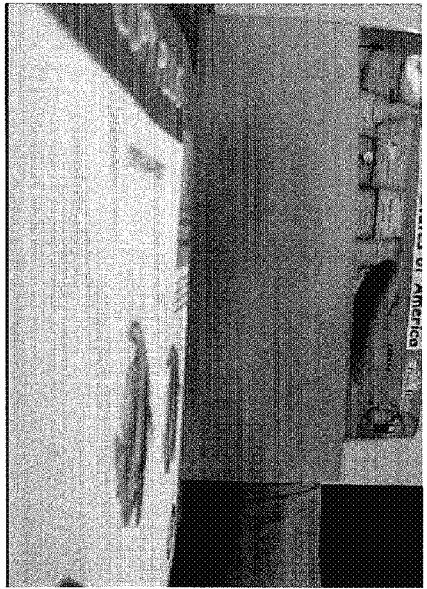
Figure 38A — Background behind diffuser 3800A
Figure 38B — Hand touches diffuser 3800B
Figure 38C — Hand near but not touching diffuser 3800C
Figure 38D — Hand further away from diffuser 3800D

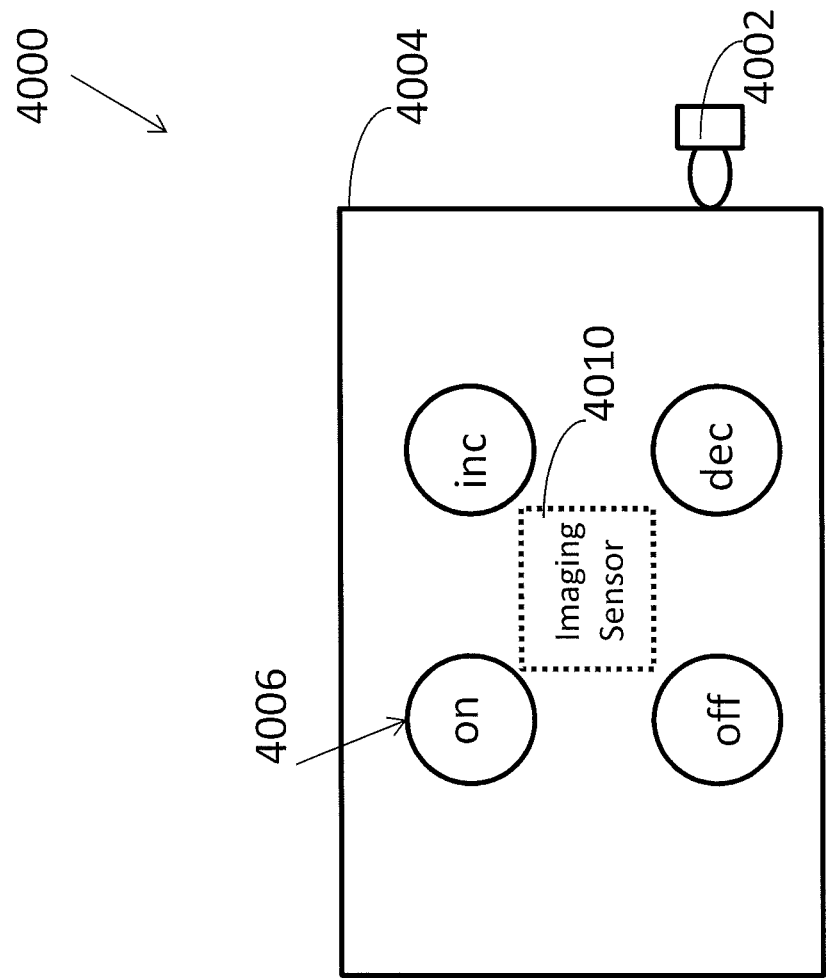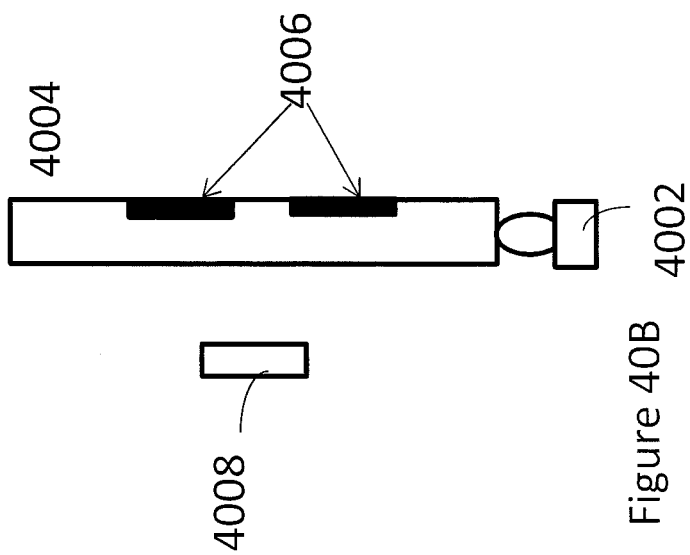

SYSTEMS AND METHODS FOR CONTROLLING DEVICE OPERATION ACCORDING TO HAND GESTURES

RELATED APPLICATIONS

This application claims the benefit of U.S. Provisional Patent Application No. 61/840,791 filed Jun. 28, 2013, the content of which is incorporated herein by reference in its entirety. This application is related to U.S. patent application Ser. No. 13/826,177 filed on Mar. 14, 2013, U.S. Provisional Patent Application No. 61/643,535 filed on May 7, 2012, U.S. Provisional Patent Application No. 61/684,336 filed on Aug. 17, 2012, U.S. Provisional Patent Application No. 61/760,966 filed on Feb. 5, 2013, PCT Patent Application No. PCT/US13/39666 filed May 6, 2013, U.S. Provisional Patent Application No. 61/696,518 filed on Sep. 4, 2012, U.S. Provisional Patent Application No. 61/846,738 filed on Jul. 16, 2013, U.S. patent application Ser. No. 14/048,505 filed on Oct. 8, 2013, U.S. Provisional Patent Application No. 61/985,762 filed on Apr. 29, 2014, the content of each of which is incorporated herein by reference in its entirety.

TECHNICAL FIELD

The present inventive concepts generally relate to device control, and more particularly relate to devices, systems, and methods for controlling a machine, instrument, robot, vehicle, or other device or object according to hand gestures.

BACKGROUND

Operation of a machine by a human operator can be summarized as follows. First, an operator can observe or inspect the result of a previous operation. If the desired result is not yet obtained, the operation can continue, or adjustments can be made to the inputs of the next operation. This process can continue until a desired result is obtained.

Conventional approaches require an operator to control an operation of a machine, device, and/or instrument by way of mechanical elements in communication with the machine, device, and/or instrument, such as a joystick, steering wheel, or foot pedestal.

SUMMARY

In one aspect, provided is a non-contact sensing device, comprising a sensor comprising a plurality of function key sensors. A function key sensor of the plurality of function key sensors has a field of view. The function key sensor is constructed and arranged to detect a hand gesture at the field of view and to generate a function key control signal in response to detecting the hand gesture at the field of view. A processor processes the function key control signal from the function key sensor and outputs a command to a remote apparatus in response to the processed control signal.

In some embodiments, the non-contact sensing device comprises one or more cameras that recognize the hand gesture, wherein the command is generated from a combination of a function key corresponding to the function key sensor and the recognized hand gesture.

In some embodiments, the sensor is a staring sensor comprising a detector array that includes a combination of the function key sensors and non-function key sensors, the staring sensor generating all image pixels of the detector array simultaneously.

In some embodiments, the sensor is a scanning sensor that scans a portion of a field of view at a time.

In some embodiments, the sensor includes a scan mirror that scans all function key sensors and only the non-function key sensors in the path of the scan to shorten the data acquisition time.

In some embodiments, the sensor is constructed and arranged as an emissive mode sensor comprising a thermal sensor that collects thermal radiation emitted from the hand gesture.

In some embodiments, the sensor is constructed and arranged as a reflective mode sensor comprising a color sensor that collects color light reflected from the hand gesture.

In some embodiments, the non-contact sensing device further comprises a control spot generator that generates a control spot that is aligned with the field of view, and the function key sensor detects a target within the control spot In some embodiments, the sensor detects the hand gesture at the control spot.

In some embodiments, the non-contact sensing device further comprises a beamsplitter positioned between the sensor and the control spot generator, wherein light output from the control spot generator directed at the beamsplitter coincides with the field of view.

In some embodiments, a function key corresponding to the function key sensor distinguished from other function key sensors is identified by positioning a ground truth target such as a hand at the control spot among a plurality of control spots and collecting by the non-contact sensing device an image of the ground truth target, wherein a pixel or group of pixels at the sensor having a highest detector output is identified as the function key.

In some embodiments, the control spot generator comprises a white light emitting diode (LED), a control spot generator plate having a plurality of color filters, and a lens, wherein color light is generated from the color filters when the white LED illuminates, and wherein a plurality of control spots are generated.

In some embodiments, each color control spot is aligned with a field of view of a function key sensor.

In some embodiments, the control spot generator comprises a plurality of color LEDs, light pipes, a light pipe mounting plate, and a lens, wherein the color LEDs are placed at the input ends of light pipes and the output ends of light pipes are placed at the focal plane of the lens, thereby generating control spots of different colors that each illuminate a field of view of a different function key sensor, and wherein the light pipe plate holds the light pipes together at the focal plane of the lens.

In some embodiments, the remote apparatus comprises a plurality of devices, and the processor generates a device number for a device of the plurality of devices, each device number corresponding to a hand gesture at a designated control spot, thereby allowing a user to choose what device to operate.

In some embodiments, a function key corresponding to the function key pixel become inactive when the hand gesture is placed in the control spot, and the function key is reactivated when the hand gesture is placed in the control spot.

In some embodiments, the sensor is a color sensor comprising color filters on a rotating wheel in front of the sensor, wherein an image of a scene is taken for each color filter, and wherein function key pixels of color images are processed to determine if a skin color spectrum is detected.

In some embodiments, the sensor is a color sensor comprising a color camera, and wherein function key pixels of color images are processed to determine if a skin color spectrum is detected.

In some embodiments, the processor distinguishes the function key sensor from other sensors of the plurality of sensors from the function key positions stored in the processor during a function key identification calibration process.

In some embodiments, the non-contact sensing device further comprises a head mounted display collocated with the sensor, the display providing visual information regarding an operation of the remote apparatus.

In some embodiments, the remote apparatus is a drone, the non-contact sensing device is constructed and arranged to control the operation of the drone, and the head mounted display displays a combination of flight information, onboard camera images, and other information regarding the operation of the drone.

In some embodiments, a camera captures image data corresponding to the hand gesture and the processor converts the captured image data into a cursor command signal that controls a cursor at a display.

In another aspect, provided is a hand gesture control system, comprising: a control spot generator that forms a control spot at a surface; a sensor that senses the presence of a hand in the control spot; at least one hand gesture sensor that provides a field of view for capturing images of a hand gesture at the control spot; a processor that converts the captured images of the hand gesture into a command signal; and a transmitter that outputs the command signal to an apparatus that translates the command signal to an action performed by the apparatus.

In some embodiments, the sensor is at least one of a color sensor or a thermal sensor.

In some embodiments, the hand gesture control system further comprising a display for operating the apparatus, and a plurality of applications that are displayed from the display, which are activated in response to the command signal corresponding to the hand gesture.

In some embodiments, the sensor comprises a visible-thermal dual band camera or multiple cameras for recognizing the hand gesture.

In some embodiments, the processor converts the captured images of the hand gesture into a cursor command signal that controls a cursor at a display.

In some embodiments, the processor converts the captured images of the hand gesture into a joystick command signal that controls the apparatus without interaction with the display.

In some embodiments, the hand gesture control system is constructed and arranged for mounting to a ceiling, a mount, or a head band.

In another aspect, provided is a method for providing non-contact switching and controlling an apparatus, comprising: sensing of hand signal in the field of view of a function key sensor of a imaging sensor lit up by color light of a control spot generator; capturing a hand gesture images by one or multiple cameras in a control spot; issuing, by a processor, a control command based on the assigned task of the function key sensor, the assigned task of the hand gesture, or both, sample of the image area to form an image pixel; converting the image pixel to a function key pixel; and controlling an apparatus by blocking a field of view of the function key pixel.

In another aspect, provided is a diffuser based control system comprising: a diffuser for smearing background details while keeping details for target near it; a imaging sensor for capturing hand gestures; one or more function key sensors constructed from selected pixels of the imaging sensor; a light source for illuminating the target; control spots for identifying field of views of function key sensors; a processor for processing a combination of hand gesture images, function key sensor signals, and converting them into commands; and a transceiver for sending commands to and receiving information from the control apparatus.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

FIG. 1 is a flowchart illustrating an operation requiring manual control.

FIG. 6 is a diagram illustrating a hand gesture control module remotely controlling a light emitting diode (LED) lamp, in accordance with some embodiments.

FIG. 21B is an illustration of a scanning configuration for a single element non-contact sensor, in accordance with some embodiments.

FIG. 21C is an illustration of a fast scanning configuration for a single element non-contact sensor, in accordance with some embodiments.

FIG. 33A is a side view of a non-contact controller system for controlling a drone, in accordance with some embodiments.

FIG. 33B is a front view of the non-contact controller system of FIG. 33A.

FIG. 33C is a view of a drone controlled by the non-contact controller system of FIGS. 33A and 33B.

FIG. 34 is another illustration of control spot functions of a non-contact controller system for controlling a drone, in accordance with some embodiments.

FIGS. 38A-D are images generated when a diffuser is between a camera and an object, in accordance with some embodiments.

FIG. 40A is a top view of a switch having a diffuser, in accordance with some embodiments.

FIG. 40B is a side view of the switch of FIG. 40A.

DETAILED DESCRIPTION OF EMBODIMENTS

Figure 2A:
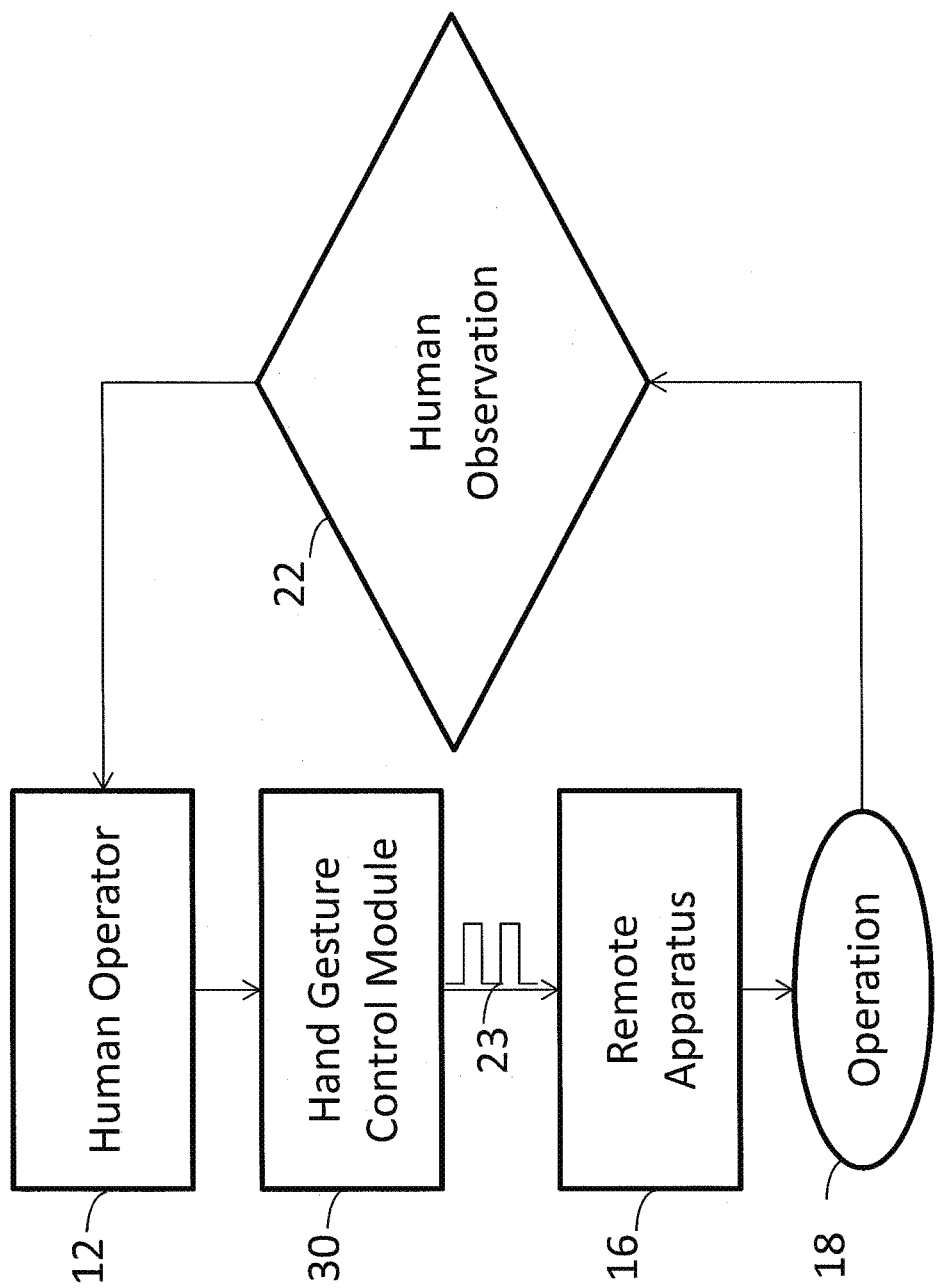
FIG. 2A is a flowchart illustrating the operation of an apparatus, in accordance with some embodiments.

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

FIG. 1 is a flowchart illustrating an operation requiring manual control of a device.

A human operator 12 participates in an operation 18 requiring manual control 14 of a device 16, such as a machine, instrument, robot, vehicle, or other device or object. Manual control 14 can include direct manual control of the apparatus 16, for example, the operator 12 sitting in a car and turning the car in a desired direction by way of a steering wheel in the car. Manual control 14 can alternatively include indirect control, or remote control, of the apparatus 16, for example, the operator 12 remotely controlling a drone by way of a joystick in communication with a computer console. When the operation 18 is performed, a human observation 20 may establish that adjustments are required regarding the control of the apparatus 16. For example, the human operator 12 may determine that a joystick must be moved in a different direction as part of the operation 18 in response to human observation.

In some applications, for example, when seated in a vehicle, the operator may have to sit in a cramped space and repeat laborious hand and foot motions for hours when performing operations, which can be ergonomically hazardous. In some applications, the operator may be physically close to a hazardous operation area.

Remote controls may be used to address these problems. While remote controls have advantages in some situations because they are inexpensive and easily constructed, they have extensive weight and require repeated hand motions, for example, when using a joystick or computer mouse to move a cursor translating to a movement of the apparatus.

Hand gesture control mechanisms do not have extra weight, since hand gesture motions are natural motions of a user's hands and fingers. As described in U.S. patent application Ser. No. 13/826,177, incorporated herein by reference in its entirety, hand gestures can be used to control a light emitting diode (LED) lamp or related light-emitting device. Here, the hand gesture recognition can be accomplished by a visible camera in conjunction with either a thermal sensor or a radiometric skin detection sensor. A beam steering mechanism can steer the illumination spot and control spot generated by the device as well as the field of view (FOV) of the sensors and visible camera according to the user's hand gestures.

In brief summary, embodiments of the present inventive concepts include systems and methods for permitting a hand gesture to be used to remotely control an apparatus such as a mechanical device, instrument, machine, robot, gaming console, and/or other apparatus capable of receiving and processing a signal output in response to the hand gesture. The system generates and outputs a control spot so that a user can determine where to position a hand or related object. In doing so, the user can make a hand gesture prior to or at the control spot to control the apparatus. Accordingly, the hand gesture can represent a command. In some embodiments, a hand gesture control module can replace a control panel, joystick, computer mouse, or other conventional peripheral device, or direct manual action commonly use to communicate with one or more machines, robots, devices, instruments, and game consoles. In other embodiments, a hand gesture control module can complement a control panel, joystick, computer mouse, or other conventional peripheral device, or direct manual action commonly use to communicate with one or more machines, robots, devices, instruments, and game consoles.

FIG. 2A is a flowchart illustrating the operation of an apparatus 16, in accordance with some embodiments.

The apparatus 16 can include an instrument, robot, vehicle device such as a crane shown in FIG. 3, gaming console, and/or other mechanical device that can receive and process an electronic, optical, RF, or other control signal 23 output to the apparatus in response to a hand gesture or the like performed to control a movement or other action of the apparatus.

As shown in FIG. 2A, a control signal 23 is generated by a hand gesture control system 30 instead of conventional manual control 14. Also, in FIG. 2A, a human observation decision diamond 22 can be performed by human observation with or without a wearable computer, such as a Google Glass computer. The wearable computer, preferably with an optical head-mounted display (OHMD), can be added to monitor an operation and assist in observing the operation and enhancing the hand gesture functions during feedback from the operation 18 performed by the apparatus 16. In some embodiments where only a few hand gestures are needed, a wearable computer is not part of the system.

Figure 2B:
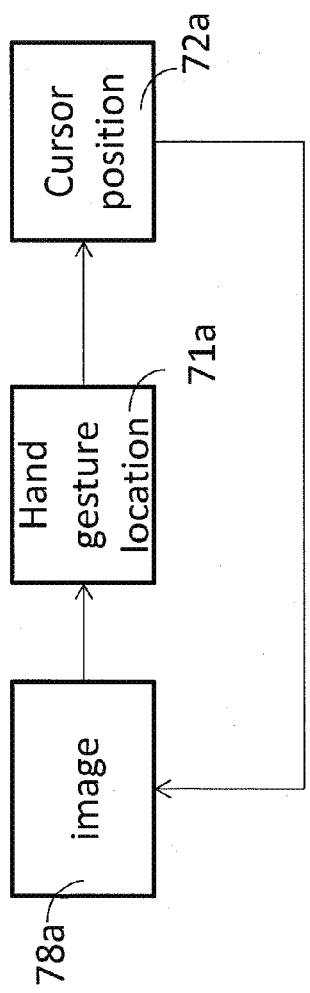
FIG. 2B is a block diagram illustrating an operation of a hand gesture control system, in accordance with some embodiments.
Figure 2D:
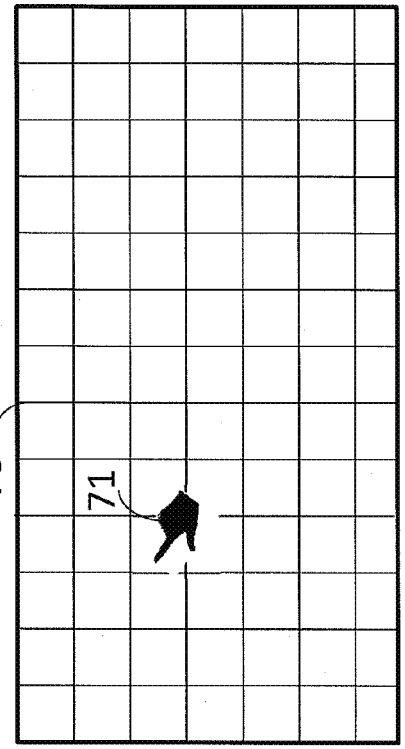
FIGS. 2C and 2D are views of a relationship between a hand gesture and a cursor and corresponding display views, in accordance with some embodiments.
Figure 2C:
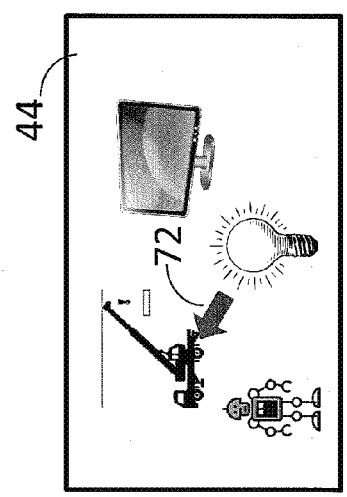

As shown in FIG. 2B, the flowchart of FIG. 2A can be implemented, whereby a hand gesture 71 can be used to control a movement of a cursor 72 in some embodiments, for example, between different displayed icons, buttons, windows, or other display elements known to those of ordinary skill in the art. The cursor 72 is shown as an arrow in the display 44 in FIG. 2C. FIG. 2D illustrates a hand gesture in an image grid of pixels 78. The pixel location 71a of the hand gesture in the image 78 is known. The pixel location of the hand gesture 71 is converted into a pixel position of the cursor 72 in the display 44. The cursor 72 can move to a new position from a current position. FIG. 2B illustrates the process of moving the cursor 72 by the hand gesture 71. Image 78a corresponding to the hand gesture is captured. The location 71a of the hand gesture is extracted from the image 78a. The location 71a is converted into a cursor position 72a in the display 44. The cursor 72 moves to new position from current position. The process keeps repeating until the hand gesture 71 stops moving.

Figure 3A:
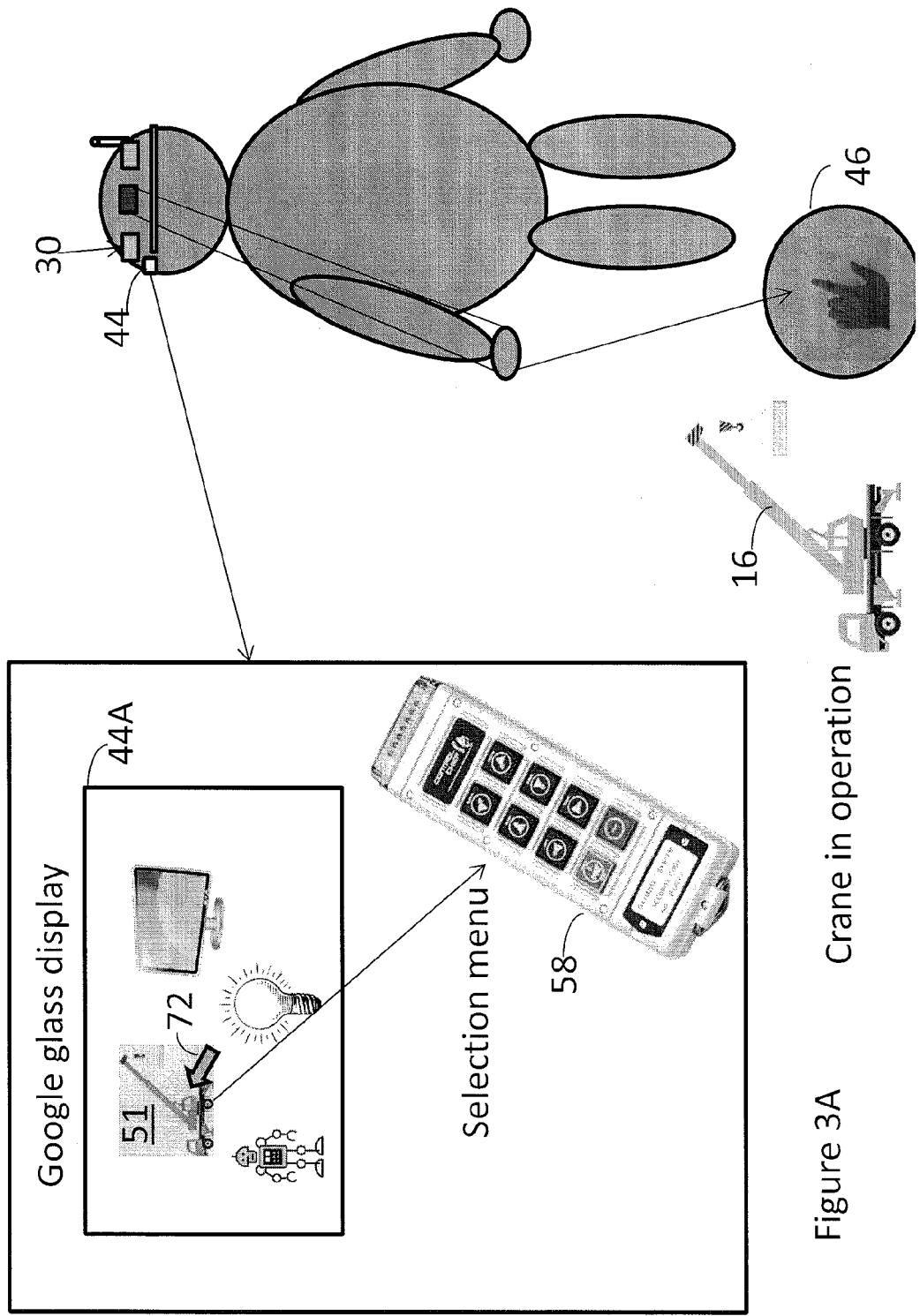
FIG. 3A is a diagram illustrating the operation of an apparatus controlled by a hand gesture control module that provides an interaction between a hand gesture and a wearable computer display, in accordance with some embodiments.
Figure 15:
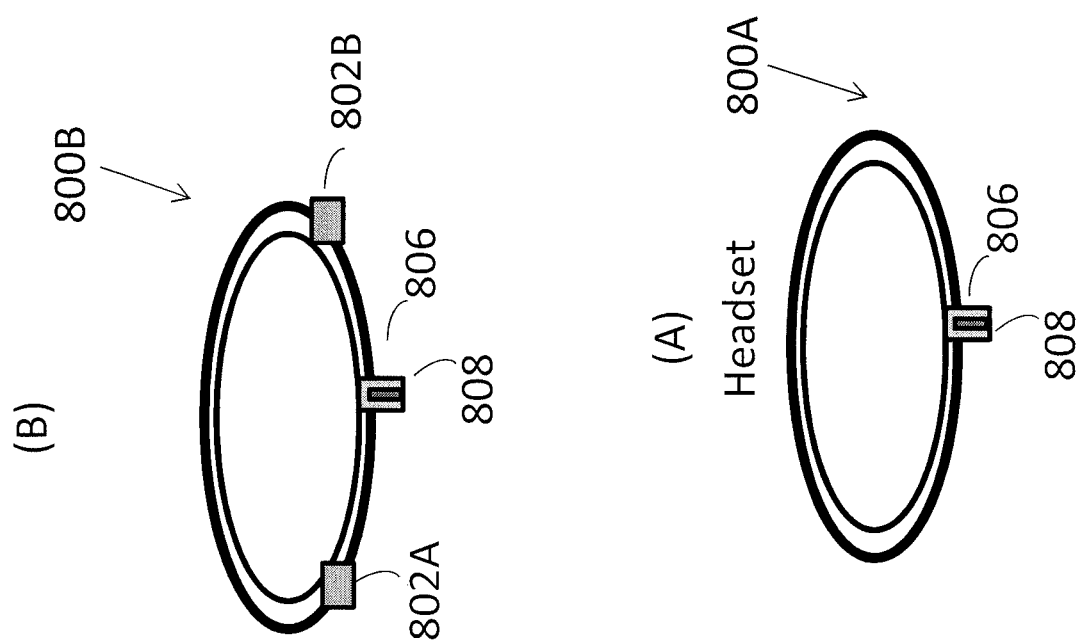
FIGS. 15A-15B are views of various headsets, each including a three-dimensional hand gesture control module and a predetermined number of cameras, in accordance with some embodiments.
FIGS. 15C and 15D are views of a control module outputting color control spots at two different heights before and after a hand gesture is positioned, respectively, in accordance with some embodiments.

FIG. 3A is a diagram illustrating the operation of an apparatus 16 controlled by a hand gesture control system 30 that provides an interaction between a hand gesture and a wearable computer display 44, in accordance with some embodiments. In FIG. 3A, the apparatus 16 is a crane. However, the inventive concepts are not limited thereto, and can be implemented for an operation of another apparatus known to those of ordinary skill in the art, for example, pilotless airplanes, robots, instruments, game consoles, and so on. In some embodiments, the hand gesture control system 30 can be mounted on a permanent platform such as ceilings, walls, or fixtures. In some embodiments, the hand gesture control system 30 can be mounted to temporary platforms such as tripods, poles, and other fixtures for field operations. In some embodiments, as shown in FIGS. 15A and 15B, a hand gesture control module can be mounted on a head set worn by the operator.

During operation, a crane operator can place a hand in an illuminated control spot 46 and make a hand gesture. The control spot 46 can be generated by a light source, for example, an LED light, that illuminates a surface with the control spot 46. In some embodiments, a single control spot 46 is employed. In other embodiments, multiple control spots 46 are employed. In some embodiments, the control spot 46 is a color in the visible spectrum. The control spot 46 can be produced by a filter, a light pipe, a control spot LED, or a combination thereof, for example, described herein.

The hand gesture can be presented as a cursor 72 or the like at the display 44. The image size corresponding to the hand gesture and the display size corresponding to the cursor can be scaled. For example, if the image size is twice the size of the display, then a hand gesture position at i, j (200,400) is cursor position (100,200) in the display 44.

When the hand gesture moves over a control spot generated by the hand gesture control system 30, the cursor also moves in the same direction. The display and camera image are preferably aligned so that when the hand gesture moves in the horizontal direction in the image, the cursor also moves in the horizontal direction at the display 44. At the display screen 44A, the operator can choose the apparatus to operate on by selecting, e.g., double clicking, the icon 51 corresponding to the apparatus 16, for example, the crane. In some embodiments, the clicking is performed by hitting the index finger by the thumb, i.e., a motion whereby the user snaps the fingers together as shown in FIG. 4(B). Other hand gestures can translate to different cursor functions. For example, holding down the cursor is accomplished by touching the index finger with the thumb as shown in FIG. 4(C).

During operation, the hand gesture control module mounted above the user or worn by the user captures image of the hand gesture. The processor analyzed the hand gesture type. If it is a cursor hand gesture, then its position is a cursor position. When the hand gesture moves, the cursor also moves to a new location. By moving the hand gesture to the upper left corner of the image, the cursor also moves to the upper left corner of the display. When the cursor arrives at icon 51, using the clicking hand gesture 70B shown in FIG. 4(B), the user can then access the control panel 58 of the crane. One hand is shown being used for gesture control. In some embodiments, two hands can be placed in the control spot for hand gesture control, for example, to enhance hand gesture control capability permitting additional hand gestures to be processed.

Figures 3B, 3C:
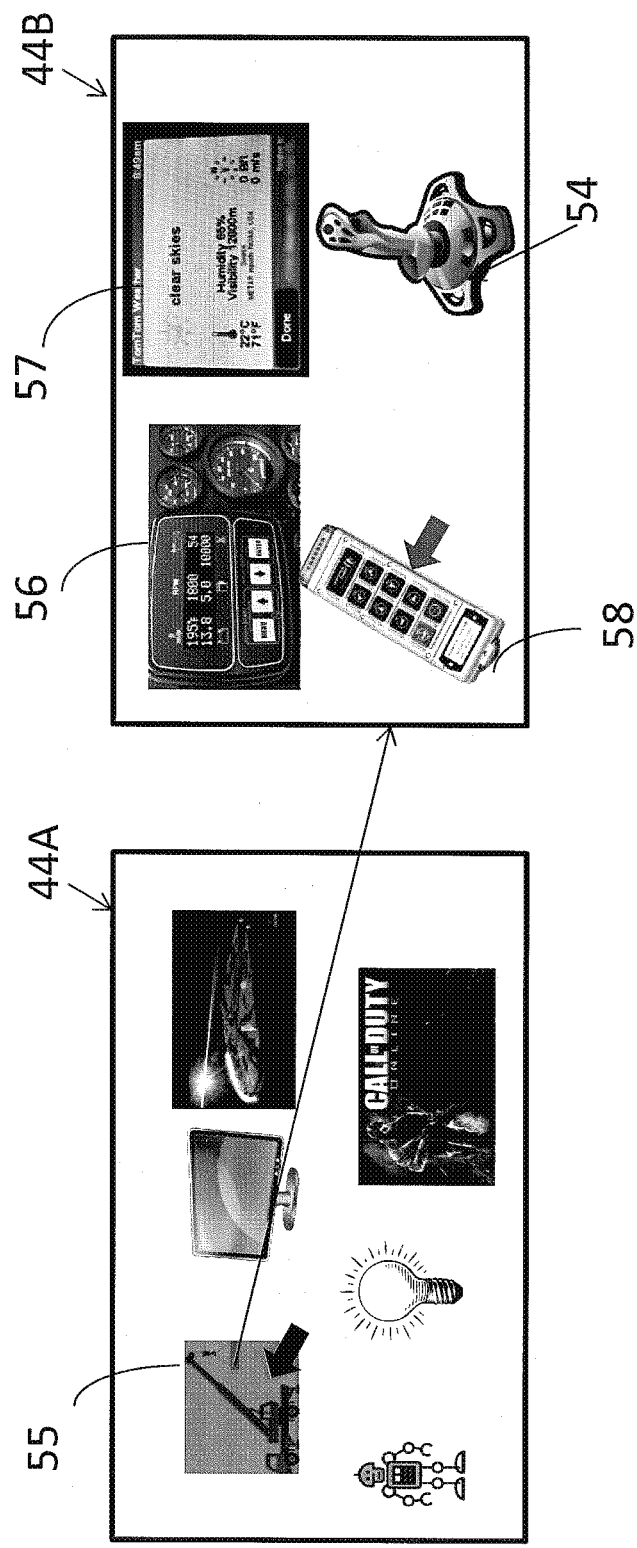
FIGS. 3B and 3C are diagrams illustrating views of a wearable computer display, in accordance with some embodiments.

FIGS. 3B and 3C are diagrams illustrating views of a wearable computer display 44, in accordance with some embodiments.

At display 44, a computer application screen 44A displays icons of various devices, robots, equipment, instruments, vehicles, games, and so on. Instead of using a mouse or the like to move a cursor over the icon, a user can activate an icon, for example, icon 55, by performing a hand gesture. In doing so, an operation screen 44B can be displayed. In some embodiments, the operation screen 44B includes an instrument status sub-window 56 showing current information of the instrument, for example, device status information and an environmental sub-window 57 showing environmental information, which is also important in crane operation, for example, providing weather information so that the operator is aware of a rainy day, and icons of various tools for controlling the instrument, such as a button mode icon 58, and a joystick mode icon 60. In some embodiments, hand gesture control can operate in cursor mode, shown in the selection menu display of the control panel of FIG. 3B and FIG. 3C. In a cursor mode, the user can click on buttons on the control panel. In some embodiments, hand gesture control can be performed in a joystick mode. In this mode, hand gestures for various motions can be used. In some embodiments, hand gesture control can be performed in both a cursor and a joystick mode.

FIGS. 4A to 4C illustrate different hand gestures 70A-70C and corresponding commands for performing cursor operations, in accordance with embodiments. In FIG. 4A, a hand gesture 70A relates to a command so that the hand gesture 70A emulates a cursor, or otherwise performs a function of a cursor. For example, a cursor clicking function can be performed by making a hand gesture 70B that includes hitting the index finger with the thumb as shown in FIG. 4B. The hand gesture 70B can be performed to "click" on icon 55 of FIG. 3B, and activate a program corresponding to icon 55. In another example, a function that relates to holding down the cursor is accomplished by touching the index finger with the thumb as illustrated by the hand gesture 70C shown in FIG. 4C, for example, to drag and drop icons, windows, buttons, on a display, similar to a cursor function.

FIGS. 5A to 5F illustrate different hand gestures 80A-80F and corresponding commands for performing joystick operations, in accordance with embodiments. In FIG. 5A, a hand gesture 80A relates to a command for emulating an up motion or pitching up motion of a joystick, which translates to a motion on a computer screen of an item, character, or other element displayed on the computer screen that moves from one point at the computer screen to another point in response to the hand gesture. During a typical joystick mode operation, the operator does not look at the display, but instead focuses attention at the operation at hand by looking at the joystick. A human response in joystick mode, i.e., using hand gestures, is faster than in a cursor mode. In other words, in a joystick mode, minimum interaction occurs between the operator and the monitor. The operator memorizes the hand gestures for various motions. A joystick mode can therefore be faster than a cursor mode because the operator can focus attention on the operation. An operation in a joystick mode may therefore be preferred by gamers or the like.

Figure 4:
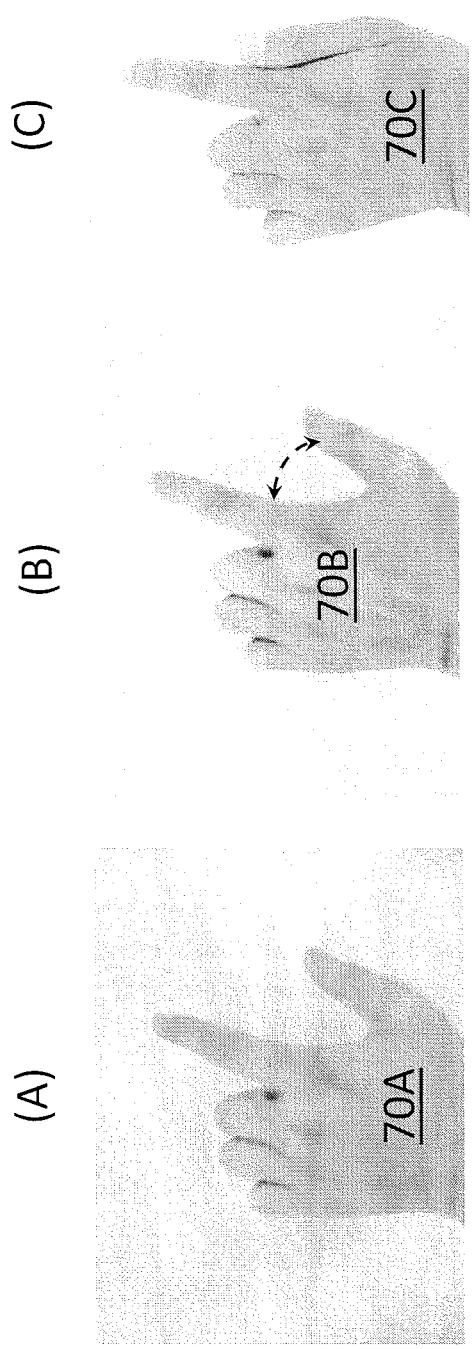
FIGS. 4A to 4C illustrate different hand gestures and corresponding commands for performing cursor operations, in accordance with embodiments.
Figure 5:
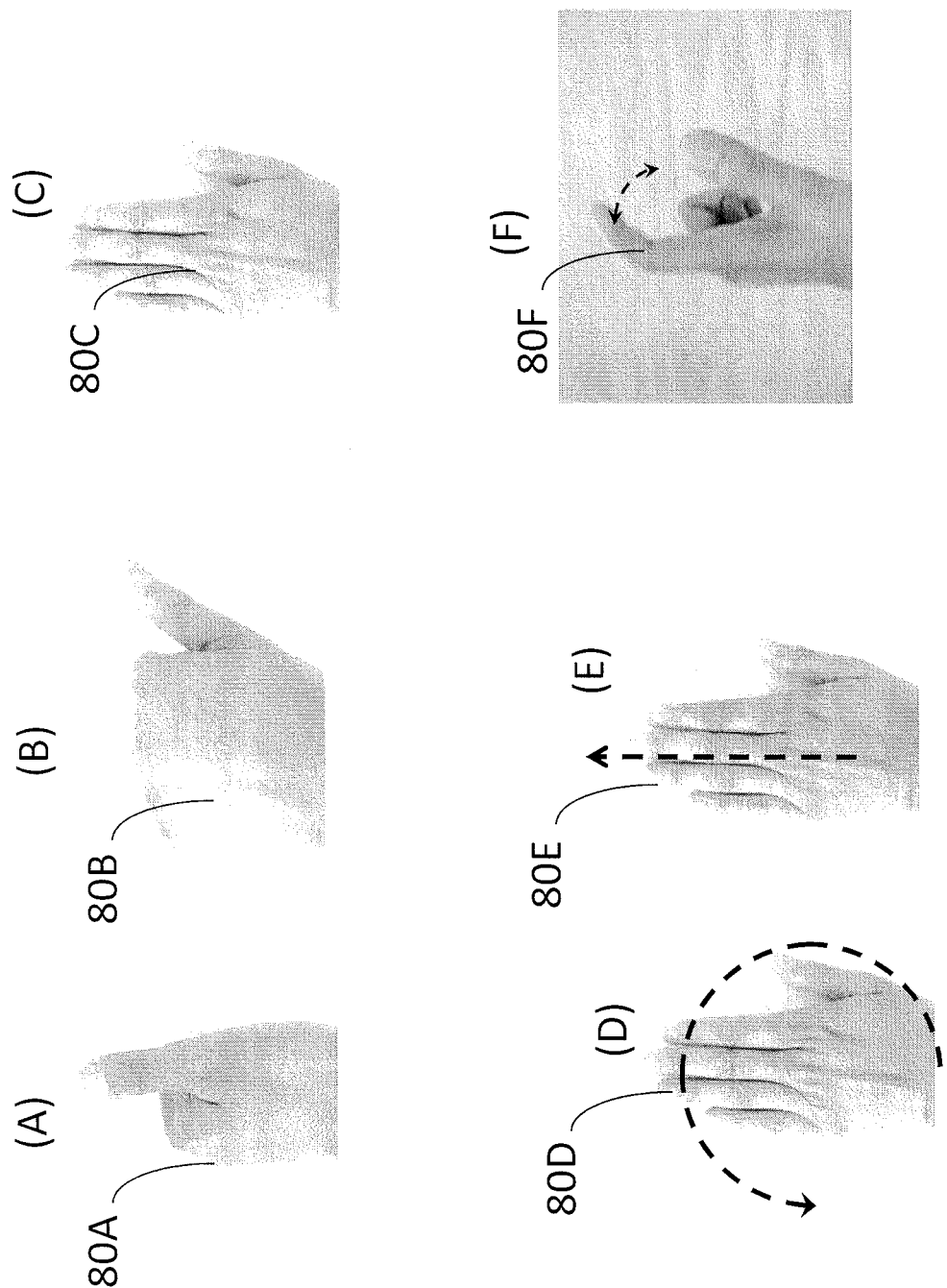
FIGS. 5A to 5F illustrate different hand gestures and corresponding commands for performing joystick operations, in accordance with embodiments.

In FIG. 5B, a hand gesture 80B relates to a command for emulating joystick down motions, including a pitching motion. In FIG. 5C, a hand gesture 80C relates to a command for stopping up and down motions, including pitching motions. Circular motions, for example, for controlling a rotating motion of a steering wheel, can be obtained by making a rotating hand gesture in a circular pattern as illustrated by the hand gesture 80D shown in FIG. 5D. A linear motion can be obtained a hand gesture motion along the horizontal plane as illustrated by the hand gesture 80E shown in FIG. 5E. The hand gesture 80F on the lower right corner can be for triggering, for example, pulling the trigger on a joystick, gun, or other device. In some embodiments as shown in FIGS. 4 and 5, hand gesture motions 70, 80 are two-dimensional hand gestures.

Referring again to FIG. 3B, the application screen 44A can display a large number of icons, windows, buttons, or other visual representations of computer applications of various types. A hand gesture control system 30 in accordance with some embodiments can be used to control many different devices using the applications corresponding to the icons 55 displayed at the application screen 44A. For example, the same hand gesture control system 30 can be used to control a robot or other mechanical device having one or more elements that move relative to each other. The same hand gesture control system 30 can also be used to control one or more other apparatuses.

FIG. 6 is a diagram illustrating a hand gesture control system 30 remotely controlling a light emitting diode (LED) lamp 90, in accordance with some embodiments. Individual elements of the hand gesture control system 30 and/or LED lamp 90 can be similar to or the same as those described in U.S. patent application Ser. No. 13/826,177, incorporated by reference herein.

As shown in FIG. 6, the hand gesture control system 30 and the LED lamp 90 are physically separate. The hand gesture control system 30 includes a signal transmitter 31. The LED lamp 91 includes a signal receiver 91 that communicates with the signal transmitter 31 via wireless communication signals, for example, radio waves, optical signals, or the like. In some embodiments, the signal can be transmitted via a fiber or Ethernet cable. Since the hand gesture control system 30 generates a control spot 46, and since the LED lamp 90 generates an illumination spot 92, a hand gesture can be placed under the control spot 30 to control the illumination spot 92. If a user or other human observer wants to steer the illumination spot 92 to a desired position, he/she can adjust hand gesture position and compare the current illumination spot 92 position to the desired position. Continue this process can continue and be repeated until illumination spot 92 reaches its destination.

One or both of the hand gesture control system 30 and the LED lamp 90 can have a beam steering mechanism (not shown), for example, described in U.S. patent application Ser. No. 13/826,177, incorporated by reference herein. In some embodiments, a monitor and corresponding processor are provided for controlling multiple LED lamps through the same hand gesture control system 30.

Figure 7:
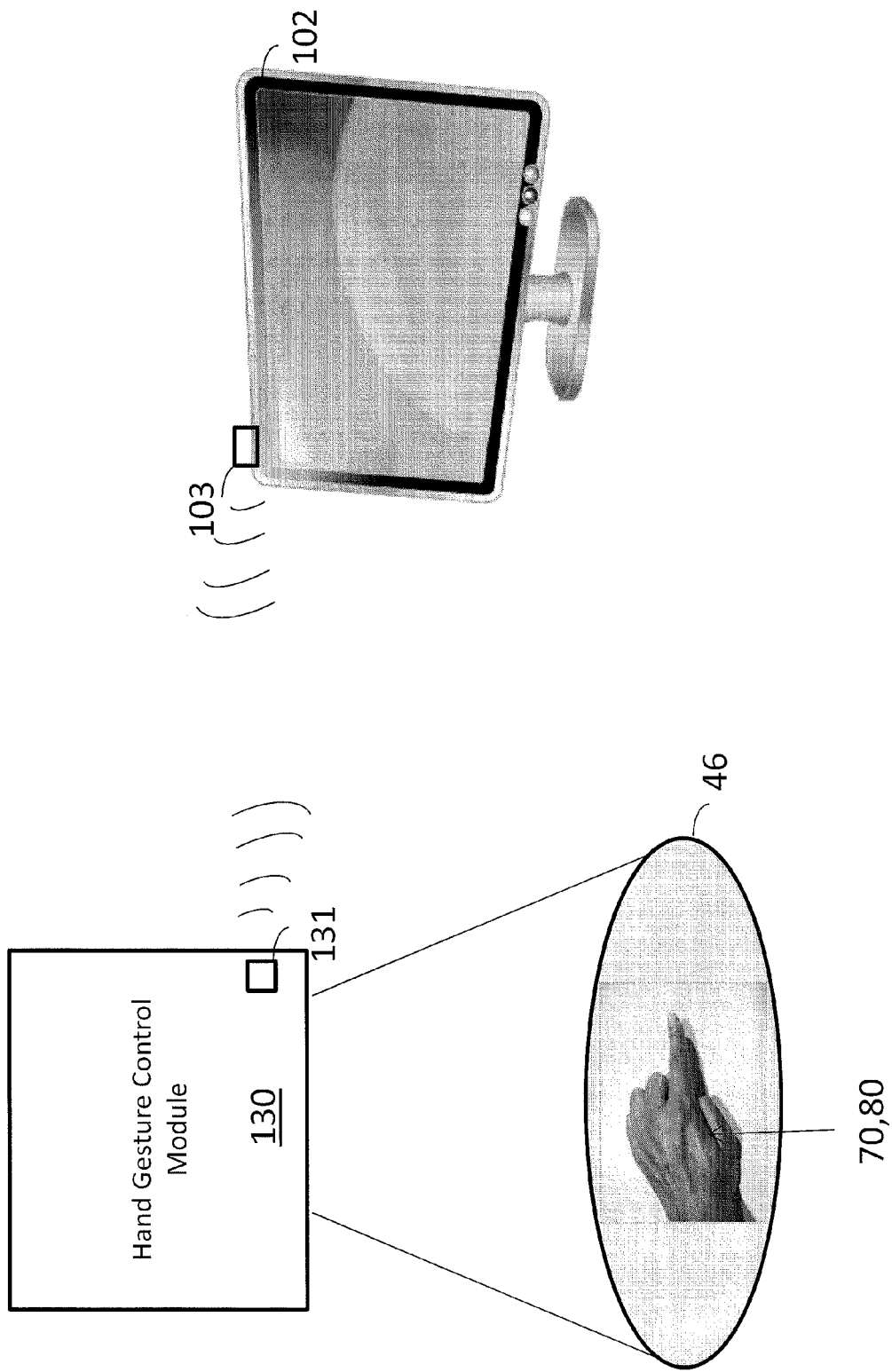
FIG. 7 is a diagram illustrating a hand gesture control module remotely controlling a television set, in accordance with some embodiments.

FIG. 7 is a diagram illustrating a hand gesture control module 130 remotely controlling a television set 102, in accordance with some embodiments. Although a television set 102 is described, related vision displays can equally apply, for example, a computer monitor. The control module 130 includes a transmitter 131 that exchanges communication signals with a receiver 103 at the television set 102, for example, wireless communication signals such as radio waves, optical signals, or the like. An example of a communication signal is a control signal similar or the same as control signal 23 described with reference to FIG. 2A, Hand gestures 70, 80 in a control spot 46 generated by the control module 130 can replace a remote control device, or the like, and be used to access a selection menu of the like on the television set 102, which can be achieved by cursor or joystick hand gestures described herein.

Figure 8:
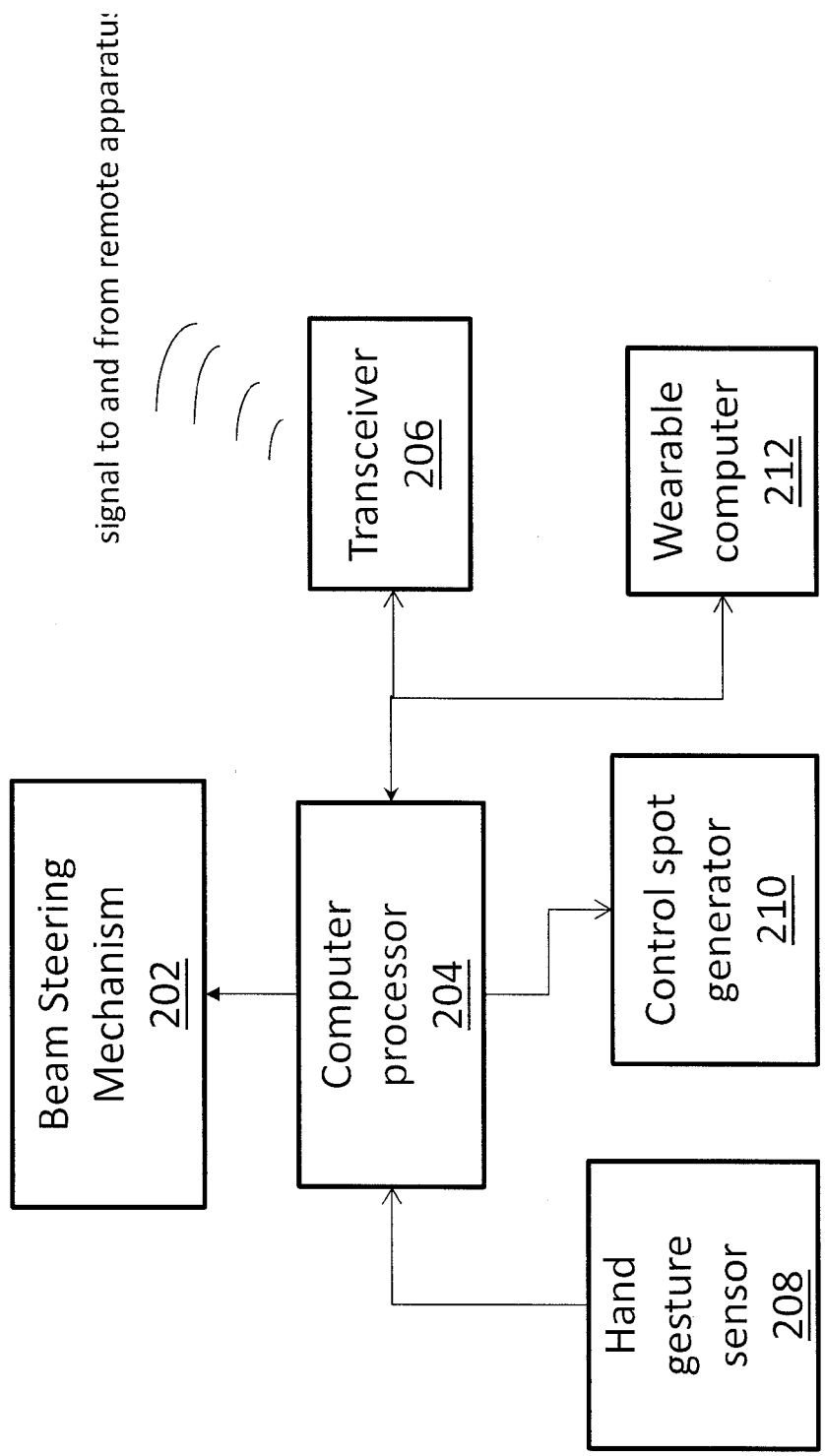
FIG. 8 is a block diagram of a hand gesture control module, in accordance with some embodiments.

FIG. 8 is a block diagram of a hand gesture control system 30, in accordance with some embodiments. The hand gesture control system 30 comprises a beam steering mechanism 202, a computation processor 204, a transceiver 206, a hand gesture sensor 208, a control spot generator 210, and a wearable computer display 212, some or all of which can be co-located under a same housing as a single unit.

The control spot generator 210 generates a control spot at a region at or proximal to that where hand gestures will be sensed. In some embodiments, the control spot is sufficiently large to surround at least one human hand, for example, 12" diameter. In other embodiments, the control spot is small, for example, about a 1" diameter. The control spot generator 210 can include filters, light pipes, LEDs, or a combination thereof for generating a control spot, which can be the same as or similar to that described in U.S. patent Ser. No. 13/826,177 incorporated herein by reference above.

Figure 13:
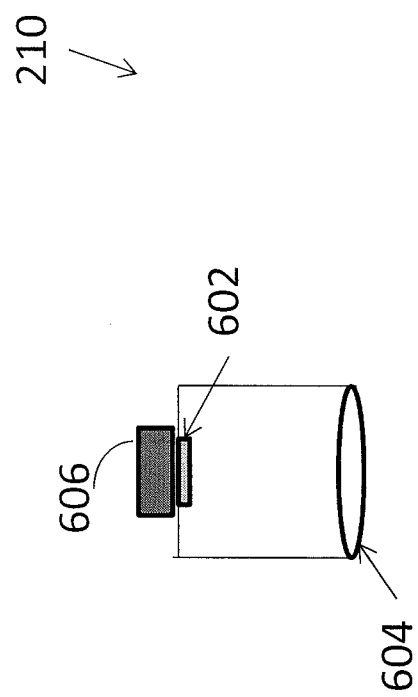
FIG. 13 is a diagram of a control spot generator, in accordance with some embodiments.

In some embodiments, as shown in FIG. 13, the control spot generator 210 comprises one or more LEDs 602 or other light source and a lens 604. An LED 602 can comprise narrow-beam optics for generating a narrow light beam at the lens 604 so that its diameter is equal or smaller than the aperture diameter of the lens. The control spot generator 210 can further include a heat sink 606 for dissipating heat generated by the LEDs 602. Although not shown, other sources that emit light can equally apply. The light output from the LEDs 602 or other light source can be in the visible light spectrum, or other light spectrum.

The hand gesture sensor 208 captures hand gesture images taken from a generated control spot, which can be the same as or similar to that described in U.S. patent Ser. No. 13/826,177 incorporated herein by reference above.

Figure 14:
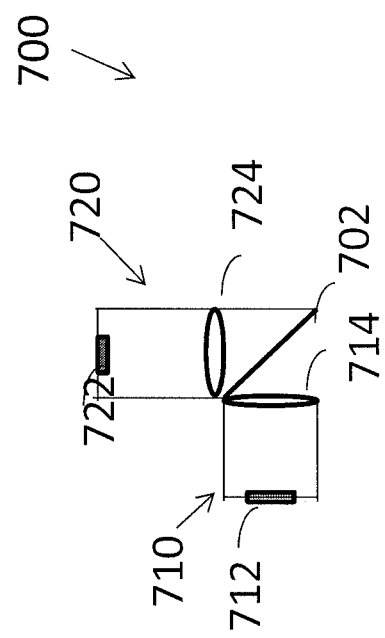
FIG. 14 is a view of a visible-thermal dual-band camera of a hand gesture sensor, in accordance with some embodiments.

In some embodiments, the hand gesture sensor 208 comprises one or multiple thermal cameras, which capture thermal hand gesture images. In some embodiments, the hand gesture sensor comprises one or multiple visible cameras, which capture only visible hand gesture images. In some embodiments, the hand gesture sensor comprises of one or multiple visible, thermal dual-band cameras, for example, illustrated in FIG. 14. In some embodiments, a visible, thermal dual-band camera 700 comprises a visible camera 710, a thermal camera 720, and an infrared window 702 that reflects visible light into the visible camera 710 and transmits thermal light to the thermal camera 720. The thermal camera 720 can include an infrared focal plane detector array 722 and an optical element such as an infrared lens 724 or the like. The visible camera 710 can include a visible FPA or the like and a visible lens 714 or related optical element.

Figure 11A:
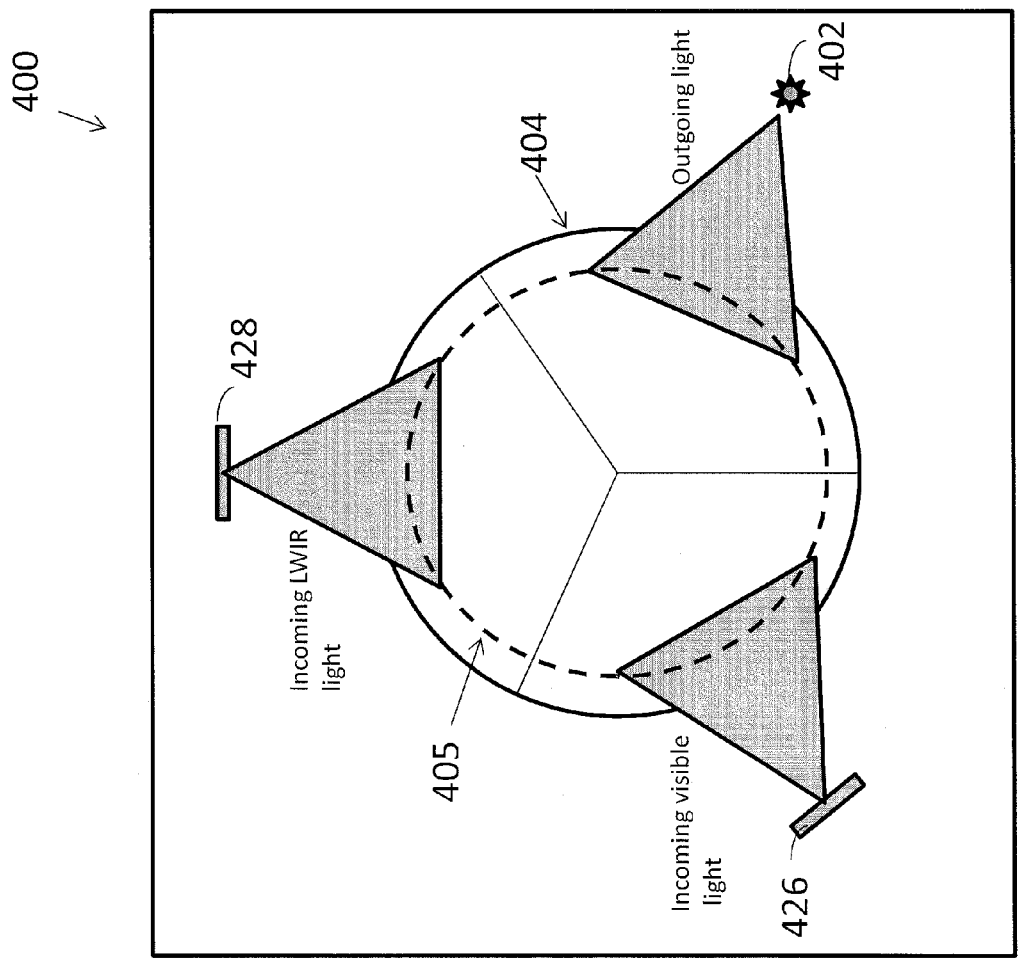
FIG. 11A a top view of a visible-thermal dual-band flashlight camera, in accordance with some embodiments.
Figure 11B:
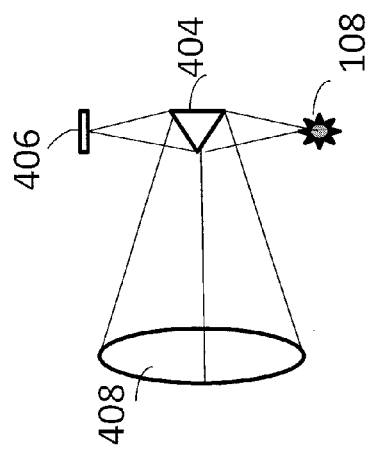
FIG. 11B a side view of the visible-thermal dual-band flashlight camera of FIG. 11A.

In other embodiments, as shown in FIGS. 11A and 11B, a visible-thermal dual-band flashlight camera 400 comprises an infrared lens 402 shared by a visible FPA detector 426 and a thermopile FPA or detector 428, and a three-face mirror 404. The visible, thermal dual-band camera 400 captures both visible and thermal images of a hand gesture. The visible FPA 426 and the thermal FPA 428 can respond to different wavelengths. In particular, the thermal FPA 428 can respond to wavelengths corresponding to emitted thermal light of a hand making a gesture, while the visible FPA 426 can response to wavelengths of light of the hand in the illuminated control spot. A high signal-to-noise ratio thermal image can distinguish a hand gesture from a background, and therefore be used to extract the hand gesture.

Returning to FIG. 8, the beam steering mechanism 202 can include a dual-axis gimbal or the like for steering a control spot and a field of view (FOV) provided by the hand gesture sensor 208. In some embodiments, the beam steering mechanism 202 includes a steering mirror on a gimbal, for example, described in U.S. patent application Ser. No. 13/826,177, incorporated by reference herein. The hand gesture sensor 208 and the control spot generator 210 are preferably placed in front of the mirror of the beam steering mechanism 202. The gimbal mirror steers the beam of the control spot generator 210 and the field of view of the hand gesture sensor 208 as the hand gesture moves.

In some embodiments, the beam steering mechanism 202 comprises a Micro-Electro-Mechanical Systems (MEMS) mirror array as described in U.S. patent application Ser. No. 13/826,177 incorporated by reference herein. The MEMS mirror array can steer the field of view of the hand gesture sensor 208 and the beam output by the control spot generator 210 as the hand gesture moves.

In some embodiments, the beam steering mechanism 202 comprises two counter-rotating prism wedges as illustrated in U.S. patent application Ser. No. 13/826,177 incorporated by reference herein. The hand gesture sensor 208 and the control spot generator 210 can be placed in front of the counter rotating wedge assembly. Beam steering can be performed by a combination of counter-rotation and co-rotation of the two wedge prisms.

Figure 9:
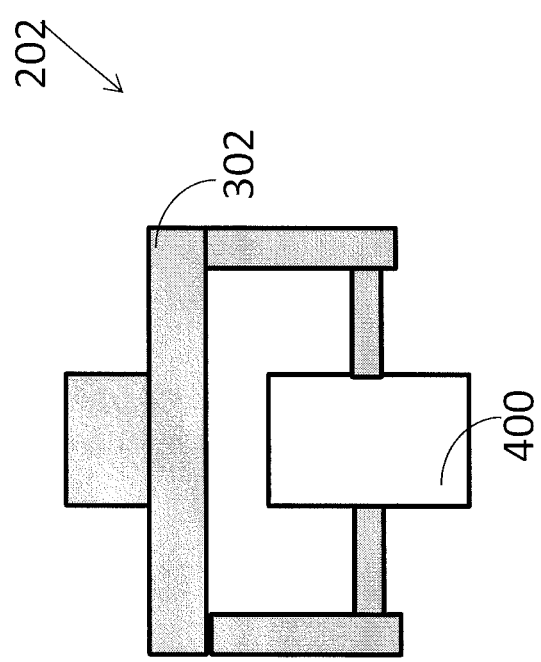
FIG. 9 is a diagram of a flashlight camera coupled to a gimbal of a beam steering mechanism, in accordance with some embodiments.
Figure 10:
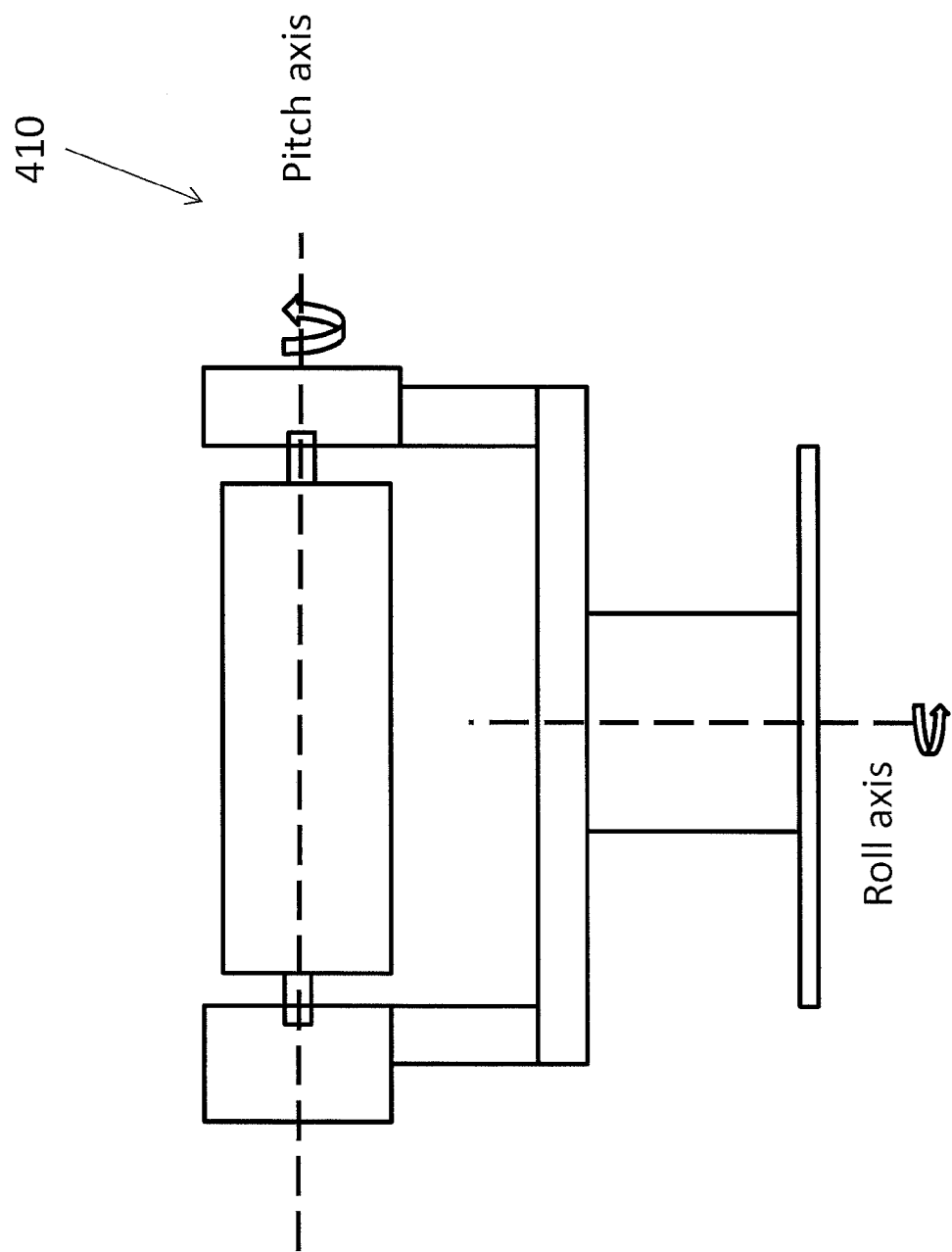
FIG. 10 is a diagram of a dual-axis pitch-roll gimbal of a beam steering mechanism, in accordance with some embodiments.
Figure 12:
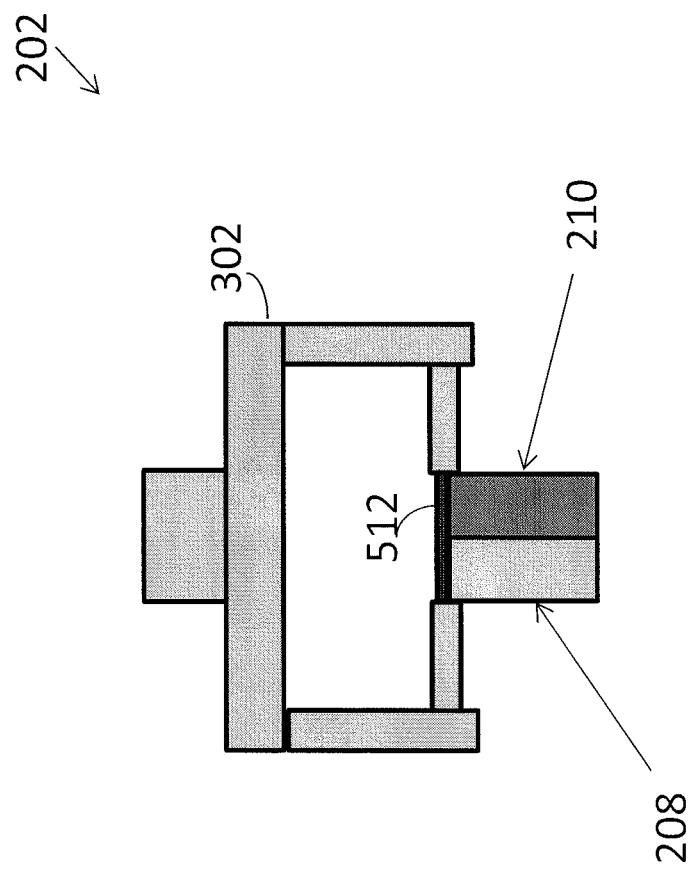
FIG. 12 is a diagram of a hand gesture control module, in accordance with some embodiments.

In some embodiments, the beam steering mechanism 202 comprises a dual-axis gimbal 302. In some embodiments, the hand gesture sensor 208 and the control spot generator 210 can be coupled to a mounting plate 512 on the gimbal 302 as illustrated in FIG. 12. In other embodiments, as shown in FIG. 9, a flashlight camera 400 is coupled to the gimbal 302. The flashlight camera can be the same as or similar to the flashlight camera 400 described at FIGS. 11A and 11B. In some embodiments, the dual-axis gimbal 302 can be pitch-roll type as illustrated by FIG. 10 or pitch-yaw type as illustrated by described and illustrated in U.S. patent application Ser. No. 13/826,177 incorporated by reference herein. Accordingly, the gimbal 302 can include an outer ring and an inner ring rotating relative to each other by shafts or the like. One or more motors (not shown) and can be mounted on the inner ring and outer ring, respectively. Counterweights (not shown) can be mounted on the outer ring and inner ring, respectively, for balancing and stabilizing the gimbal 302, and moving that gimbal 302, i.e. pitch, yaw, and/or roll.

The hand gesture sensor 208 and a control spot generator unit 210 are constructed and arranged on the mounting plate 512 so that the lines of sight (LOS) of the gesture sensor 208 and a control spot generator unit 210 are parallel. Because of the proximity to each other, the center of a control beam spot generated by the control spot generator unit 210 can coincide or nearly coincide with the center of the imaging region provided by the hand gesture sensor 208.

Returning to FIG. 8, the computer processor 204 is responsible for hand gesture recognition, tracking, beam steering, and control command signal generation. In some embodiments, the computer processor 204 can be a computer, for example, comprising a processor, a memory, and a connector between the processor and the memory and/or other elements of the hand gesture control system 30. In other embodiments, the computer processor 204 is a DSP chip. The computer processor 204 is responsible for hand gesture recognition, tracking, beam steering, control command signal generation, communicating with the wearable computer 212, e.g., Google Glass or the like, and/or lighting control. In some embodiments, icons of applications for controlling various machines, instruments, robots, devices, and playing games can be displayed on the wearable computer display 212 or related display screen. In some embodiments, the computer processor 204 in communication with the hand gesture sensor 208 can permit hand gestures to appear as cursors, joysticks, and other symbols on the wearable computer display 212 or related display screen. For example, a cursor can be moved at the display 212 by making a hand gesture as shown in FIG. 4 in a control spot formed by the control spot generator 210. In another example, hand gesture motions can be made that emulate joystick control motions as shown in FIG. 5. Other software applications can equally apply, which are stored in memory, executed by one or more processors. Some or all applications can be displayed at the display 212, and executed in responds to hand gestures or the like, for example, described herein.

The transceiver 206 of the hand gesture control module sends command signals to an operating instrument controlled according to hand gestures processed by the hand gesture control system 30. The transceiver 206 can be similar to or the same as the transmitters 31 and 131 of FIGS. 6 and 7, respectively. A receiver of the operating instrument, for example can provide status information or the like regarding the instrument. Information can be displayed on the wearable computer display 212, for example, a control panel screen 44B shown in FIG. 3C. In some embodiments, the signal and information can be sent wirelessly by radio wave or light beam. In some embodiments, the signal can be transmitted via a fiber or Ethernet cable.

In some embodiments, the hand gesture sensor 208 and the control spot generator 210 are assembled into one unit. In some embodiments, the hand gesture control module 20 comprises one or more of such units. In some embodiments, the assembled unit is constructed and arranged as a visible, thermal dual-band flashlight camera, for example, described in U.S. patent application Ser. No. 13/826,177, incorporated by reference herein, and/or the dual-band flashlight camera 400 illustrated in FIGS. 11A and 11B, which can comprise an infrared lens 408, a three-face pyramid prism mirror 404, a visible focal plane array 426, a thermal focal plane array 428, and one or more color LEDs or related light source 402. In the flashlight camera 400, a hand gesture sensor and the control spot generator are assembled under a single housing, i.e., the flashlight housing. The LEDs 402, visible FPA 426, and thermal detector or FPA 428 can share the same lens 402 but split the aperture, and illuminate at the same target. Therefore, the illumination area of the color LED 402 is also the imaging area of the visible FPA 426. The thermal FPA 428 also provides imaging in the same area as the visible FPA 426. However, the light source 402 is the actual thermal emission from the target under a control spot. In some embodiments, the lens 408 is a transmissive type lens. In other embodiments, reflected Cassagrain optics are provided instead of an infrared lens. In particular, the control spot generator 210 is placed next to a hand gesture sensor 208 as shown in FIG. 12. The flashlight camera functions as the hand gesture sensor.

FIGS. 15A-15B are views of various headsets 800A-800B, respectively, each including a three-dimensional hand gesture control module and a predetermined number of cameras, in accordance with some embodiments.

In some embodiments, shown in FIG. 12, a hand gesture sensor and a control spot generator are co-located, and mounted in the front of a platform, in particular, for 2-dimension hand gesture motion sensing. In other embodiments, as shown in FIG. 15B, two side cameras 812A, 812B are added to a headset 800C for 3-dimension hand gesture motion sensing. In some embodiments, the front 806 and side cameras 802, 812 can be visible cameras. In some embodiments, they can be visible, thermal dual-band cameras.

As described above, some embodiments provide for a hand gesture control module that processes three-dimensional hand gesture motions.

To obtain 3-dimension hand gesture motions, multiple cameras at various point angles are required. FIG. 15B includes an example of a hand gesture control module with 3 cameras, for example, two side cameras and a front camera, in accordance with some embodiments. The hand gesture control modules can be worn by an operator on his/her head. To detect 2-dimensional motions, only one camera looking straight down at the hand gesture is needed. To detect 3-dimensional motions, two side cameras 802A, 802B are needed.

In some embodiments, a hand gesture can be separated from background by using two cameras separated by a distance and a control spot generator. As illustrated in FIGS. 15C and 15D, the color control spot 9004 is at two different heights before and after a hand gesture 9005 is inserted. This color control spot 9004 can be used as a reference. The control spot 9004 appears in different locations in the camera images due to separation between cameras 9001A and 9001B. The distance of control spot between two images increases for control spot near the cameras and decreases for control spot further away from cameras. Before hand gesture 9005 is inserted into the control spot 9004, the control spot is projected onto the background 9003. When hand gesture 9005 is inserted into the control spot 9004, the control spot is at the hand which is closer the cameras than the background. Using this information and 3D stereoscopic method, hand gesture 9005 in the control spot 9004 can be separated from the background 9003. This is done by separating pixels into two groups: one with large image separation and one with small image separation between two camera images. The group with the large image separation belongs to the hand gesture 9005. The group with the small image separation belongs to the background 9003. Normally 3D stereoscopic imaging requires calibration of the camera system to extract the depth information. The reference positions of the control spot 9004 before and after insertion of hand gesture makes the calibration unnecessary. In some embodiments, the two cameras 9001A and 9001B can be color cameras or multispectral cameras. The control spot 9004 can be easily seen in the color band whose color matches that of the control spot. The cameras 802A and 802B in the headset in FIG. 15B can perform some or all of this technique to separate a hand gesture from a background.

In some embodiments where two or more cameras are provided, a control spot can be used as a reference beam for separating hand gesture from background using the fact that the parallax of the hand gesture is larger than that of the background, which is further away from the cameras. The control spot appears in two different distances before and after inserting a hand into the control spot.

Conventional thermal non-contact switches measure thermal signal changes due to an approaching warm body or object in a field of view (FOV) of a passive infrared sensor. A conventional non-contact switch can comprise a thermal detector such as a pyroelectric detector and a Fresnel lens. The thermal detector is located at the focal plane of the lens. A feature of the thermal non-contact switch is that as a warm body approaches the FOV of the thermal sensor, a change of signal from a cooler background to a hotter body is detected. As a result, the switch is triggered. However, such non-contact switches are limited in functionality. For example, a conventional thermal non-contact switch does not have an amplitude increase or decrease capability.

In accordance with embodiments of the present inventive concepts, selected pixels from an image are detected by a non-contact sensor, and provided as function keys for a non-contact switch or controller. The projections of these keys on an imaging surface can serve as non-contact buttons. A user can position a hand or other object into the projection, or field of view, of an image selected as a function key, thereby activating the non-contact button without physically contacting it. The image of the non-contact sensor is small because the number of assigned function keys is also small. Very little processing time is required as compared with other hand gesture processing techniques, thereby increasing a switching time of the non-contact switch. Multiple function keys can be provided, each corresponding to a function key sensor of the non-contact sensor. Therefore, keys other than an on/off function key can be used to control other functions of the device. Therefore, a non-contact switch in accordance with some embodiments can be constructed and arranged as a controller. In some embodiments, color light can be used to illuminate control keys so that users can easily identify the various buttons. A control spot generator can be provided to generate cones of color light. A beamsplitter can be used to align the non-contact keys and the control spots.

In other embodiments, a switch can include a scanning non-contact sensor with a single element detector. Instead of forming a whole image, a scanning non-contact sensor can create a partial image consisting of only function key pixels and minimum number of non-function pixels, for example, shown in FIG. 21C. In doing so, a fast non-contact switch can be constructed because the scan mirror has only a few positions to go to. Since a single detector is used instead of an array of detectors, the manufacturing cost is significantly reduced, especially with respect to the thermal scan sensor. The scan mirror can be inexpensive too, especially for a MEMS mirror in large volume. Therefore, a fast and inexpensive non-contact switch can be constructed from a scanning non-contact sensor. Also, in some embodiments, the scan scans all function key sensors and only the non-function key sensors in the path of the scan to shorten the data acquisition time. In configurations where a camera is part of the system, a hand gesture can be positioned in the field of view of the camera, and can therefore enhance the functions of the switch, for example, for recognizing and distinguishing hand gestures. For example, referring to the cursor or joystick application above, a camera can capture image data corresponding to the hand gesture and a processor can convert the captured image data into a cursor or joystick command signal that controls a cursor or joystick. The function keys become inactive, such that only camera images of hand gesture is processed.

A low resolution staring non-contact sensor with a small detector array can also be used to construct a fast and inexpensive non-contact switch. For staring systems, all image pixels are generated at the same time. Low resolution thermal detector arrays such as 4×4 or 8×8 are relatively inexpensive.

The non-contact sensor can be of thermal type or a radiometric calibrated color type. The thermal type sensor uses the heat from hands while the radiometric calibrated color sensor uses color of hands. A hand can be therefore be distinguished from another object, for example, a sheet of paper, when positioned in the field of view of the non-contact sensor.

A diffuser is a well-known device that scatters light in different directions. Accordingly, light from different scene contents can become mixed after engaging with a diffuser. The net result is a smearing of the image scene or other undesirable effect. The smearing is worse as the scene moves further away from the diffuser. However, by adding color control spots at the diffuser, a diffuser based switch or controller can be constructed, for example, described herein. In some embodiments, an imaging sensor is positioned behind a diffuser, which can resolve images related to a hand gesture or the like only when the hand or the like is close or touches the diffuser. By moving the hand gesture near or touching a selected control spot on the diffuser, a command based on the control spot is generated and sent to the device under control. A non-contact switch in accordance with some embodiments works best for remote applications, the diffuser based switch or controller works best for close proximity applications, and can complement or otherwise co-exist with a non-contact switch.

Figure 16:
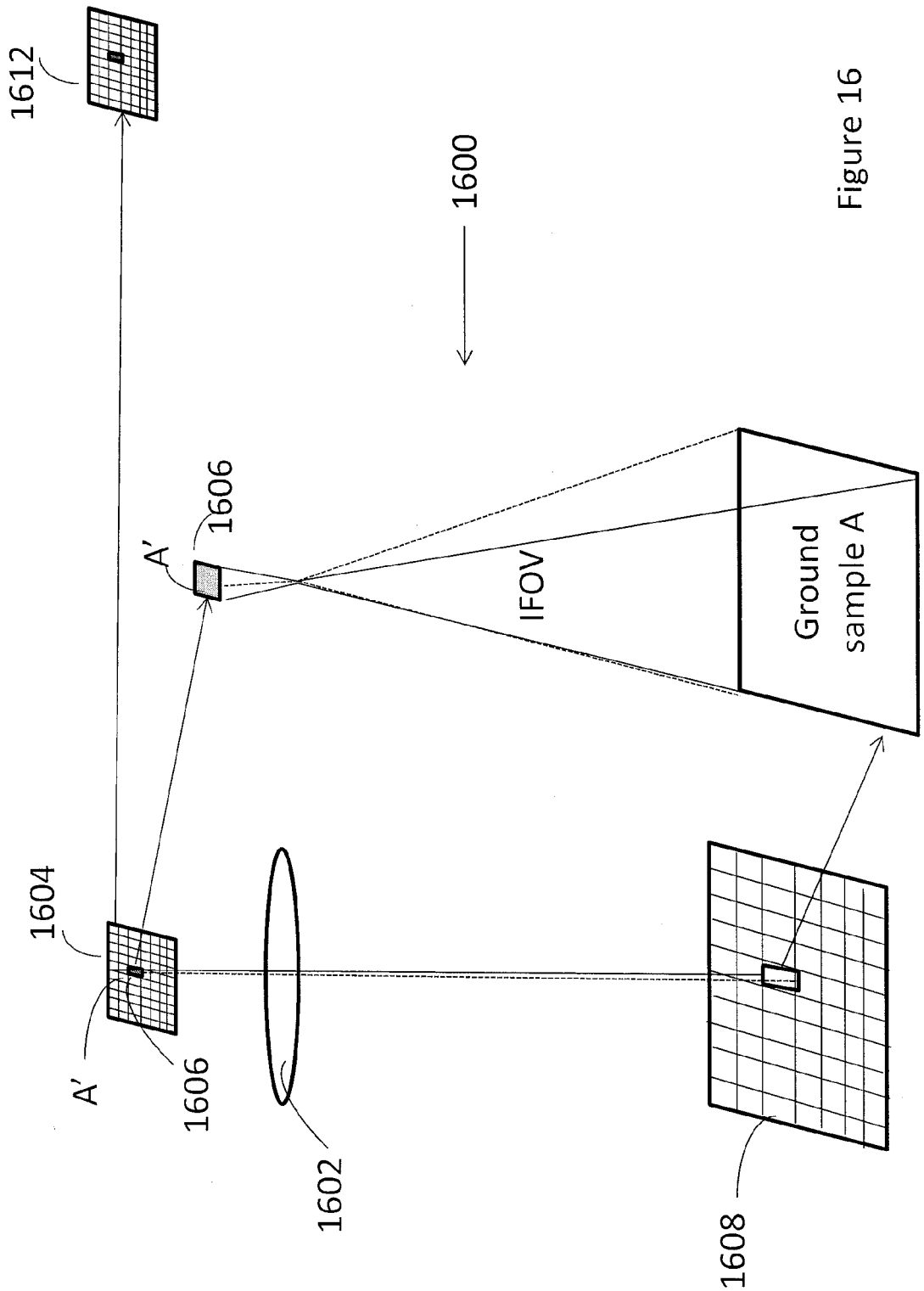
FIG. 16 is a view illustrating an operation of elements of a non-contact switch system, in accordance with some embodiments.

FIG. 16 is a view illustrating an operation of elements of a non-contact switch system 1600, in accordance with some embodiments. The system 1600 includes an imaging optics 1602 and a detector array 1604. The detector array 1604 comprises a plurality of image sensing detectors 1606, arranged in rows and columns at the array 1604, which incorporate an array of pixels. Each detector 1606, also referred to as a function key sensor, collects incident light from a small region of an imaging area 1608, or ground sample A. Each function key sensor at the detector array 1604 contains a light sensitive photo diode or the like for measuring light, thereby recording an image of the ground sample. Accordingly, the function key sensor can be identified from or formed according to selected pixels of the array 1604. The output signals produced by the pixels are read out, for example, one row at a time, to form an image. The captured images can be output as an output image 1612, for example, to a display.

The solid angle extending from detector 1606 and imaging optics 1602 is referred as an instantaneous field of view (IFOV). The projection angle of detector 1606 to ground sample A through the imaging optics can be referred to as an IFOV of detector 1606. Detector 1606 collects only light within this IFOV. The output of detector 1606 or pixel A' is the image of ground sample A. The volume within this IFOV can be used as a function key of a non-contact switch in some embodiment. A target such as a hand detection within this IFOV can be assigned a specific meaning or function in some embodiment. Target detection only occurs when the signal level of pixel A' falls within a certain range. For example, a thermal signal from a hot soldering iron or a book at ambient temperature is not interpreted as a target signal because it is either too high or too low.

Figure 17:
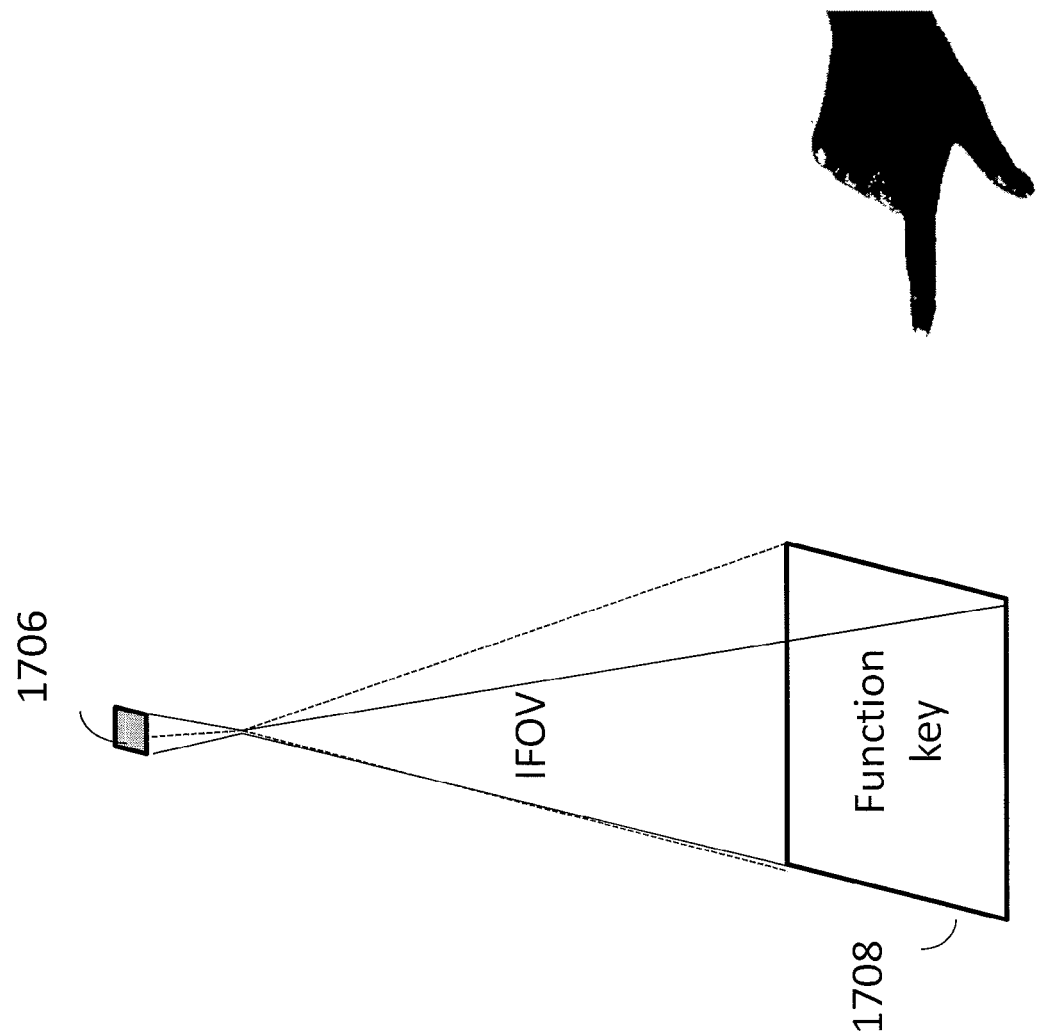
FIG. 17 is a view of a function key of a non-contact switch, in accordance with some embodiments.

FIG. 17 is a view of a function key 1708 of a non-contact switch, in accordance with some embodiments. In describing FIG. 17, reference is made to elements of the non-contact switch system 1600 of FIG. 16.

In some embodiments, pixel A' of the system 1600 shown in FIG. 16 is identified as a function key for the non-contact switch. In some embodiments, a collection of pixels can be used as a function key. Detector 1606 can sense an object such as a hand carrying signal entering the IFOV of the image, or ground sample, selected as the function key 1708. For example, the hand can block the IFOV provided by a function key pixel sensor 1706 to activate the function key 1708. Accordingly, the location and/or movement of the hand activates the function key 1708 without physically contacting it. The imaging sensor in an embodiment can include multiple function keys. The function key and the imaging optics form a function key sensor in some embodiments. The imaging sensor therefore can include multiple function key sensors.

Figure 18:
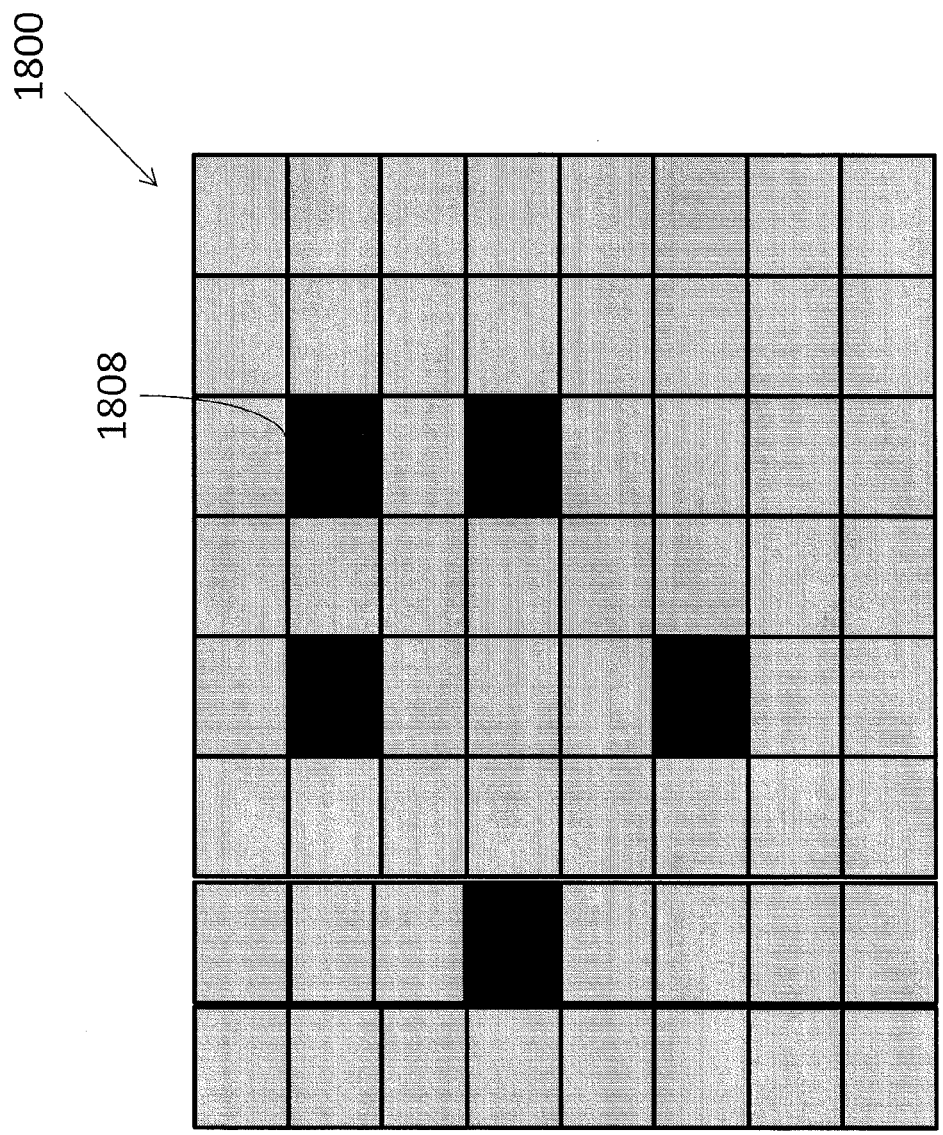
FIG. 18 is an illustration of multiple non-contact keys constructed from the pixels of a sensor image, in accordance with some embodiments.

FIG. 18 is an illustration of multiple non-contact keys constructed from the pixels of a sensor image 1800, in accordance with some embodiments.

As described above, some function keys can be configured for switching functions, for example, function key control signals generated by one or more function key pixel sensors 1706 of FIG. 17, while other function keys can be configured to permit control-related functions to be performed. In some embodiments, function keys are identified according to a calibration procedure in FIG. 20. Non-contact function keys are separated from each other at an image area to avoid unintentionally activating multiple keys at the same time. A non-contact switch in accordance with some embodiments can provide a sufficient number of keys 1808 to perform both switching and controlling functions. In some embodiments, images captured at a non-contact sensor have a low resolution comprising a small number of pixels. Accordingly, the collection time and processing time are short and the cost is low. A non-contact switch including non-contact sensors can therefore be fast and inexpensive. In some embodiments, images of a non-contact sensor can be of a high resolution. In some embodiments, a function key is identified by inserting a ground truth target such as a hand into a control spot and collecting an image of the ground truth target. A pixel or group of pixels with a highest detector output is identified as the function key. Other function keys can be identified in the same way. The positions of the function keys can be stored in the processor. Control functions of one or more devices under control can be assigned to function keys in the processor prior to a control operation.

Figure 19B:
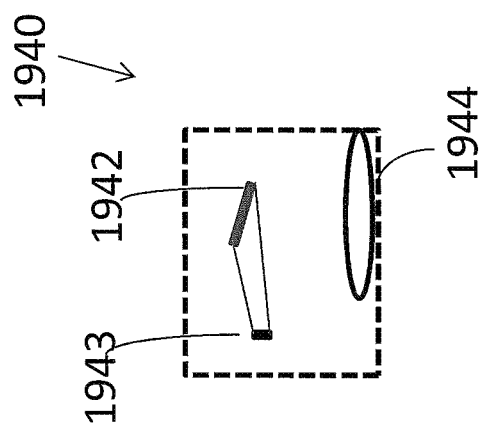
FIGS. 19A and 19B are views of a staring-type non-contact sensor and a scanning-type non-contact sensor, respectively, in accordance with some embodiments.
Figure 19A:
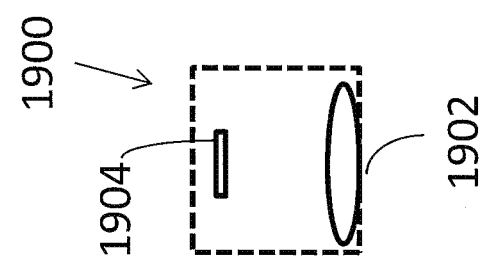

FIGS. 19A and 19B are views of a staring-type non-contact sensor 1900 and a scanning-type non-contact sensor 1940, in accordance with some embodiments.

In some embodiment, as shown in FIG. 19A, the staring non-contact sensor 1900 comprises of imaging optics 1902 and a two-dimension detector array 1904, or focal plane detector array. The detector array 1904 can be the same as or similar to the detector array 1604 of FIG. 16. A full image, for example, of the imaging area 1608 of FIG. 16, can be formed by all detectors in the two-dimension detector array 1904. In particular, an image can be created by focusing light received from the scene onto individual detectors of the two-dimension detector array 1904.

In some embodiments, as shown in FIG. 19B, the scanning non-contact sensor 1940 comprises of imaging optics 1944, a scan mirror 1942, and a line of detectors or a single element detector 1943. The scan mirror 1942 can be configured for one axis for a line detector array and for two axes for a single element detector. In some embodiments, the scan mirror 1942 is a MEMS type or the like. In some embodiments, the scan mirror 1942 is a piezoelectric type. In some embodiments, the scan mirror 1942 is an electromagnetic type. In some embodiments, the scan mirror 1942 is a mechanical type.

Figure 21A:
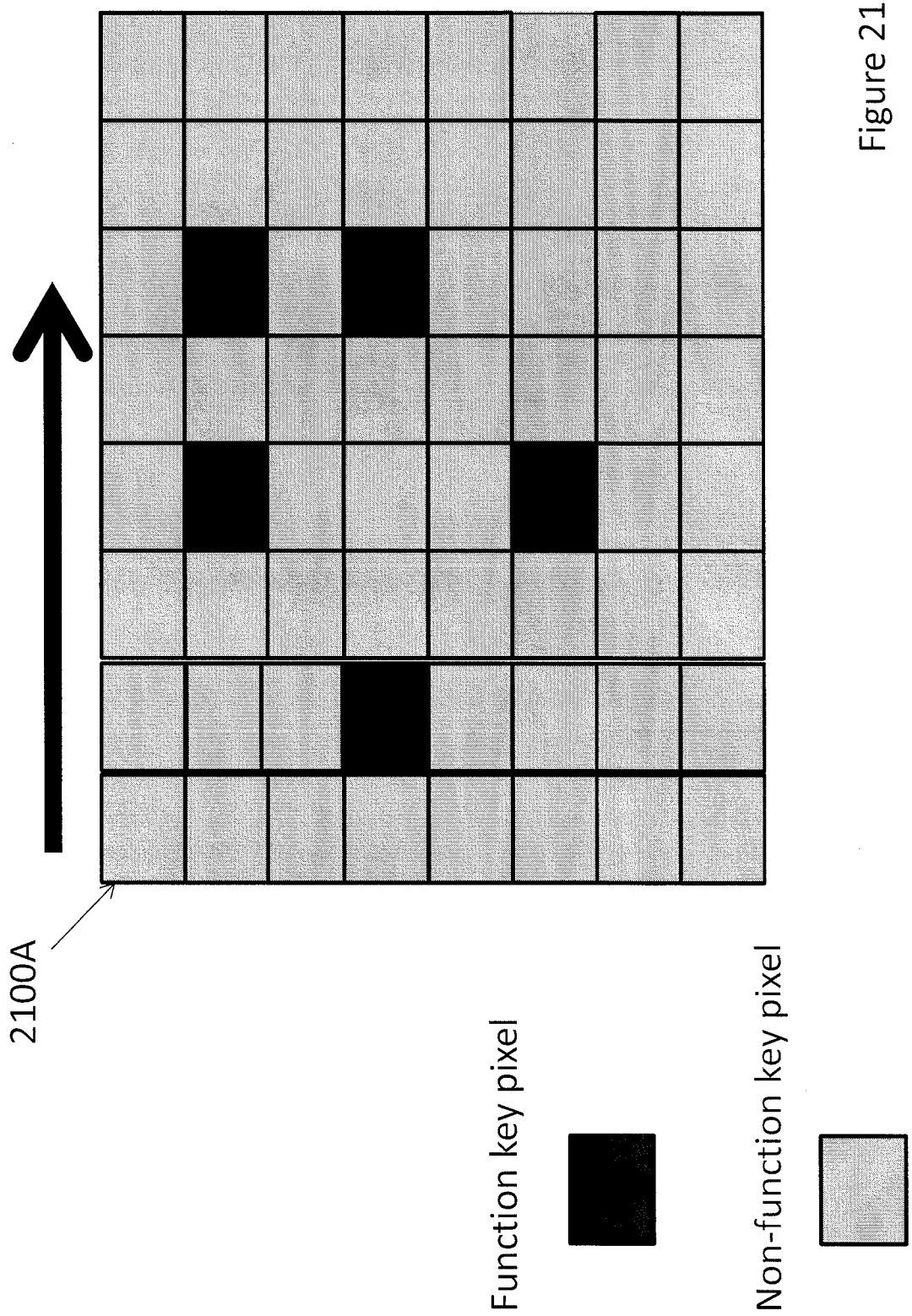
FIG. 21A is an illustration of a parallel scanning configuration for a line detector array, in accordance with some embodiments.

The scanning non-contact sensor 1940 creates an image by sequentially scanning and focusing light from various parts of the scene onto the detector 1943, i.e., a single detector or a one-dimension array of detectors. The scan mirror 1942 scans portion of the field of view (FOV) of the sensor 1940 at a time generating a partial image. It continues to scan until the full FOV is covered. The full image is then created. For the single element detector system, the scan mirror 1942 scans one IFOV corresponding to one pixel at a time. The full image is output of the same detector looking in different directions within the sensor FOV at different times. In FIG. 21A, the scan mirror scans one IFOV for a column of detectors at a time. It continues from left to right until the full image is obtained. In FIG. 21B the scan mirror scans from FOV from left to right and right to left in a raster pattern until the full image is obtained.

Figures 19C, 19D:
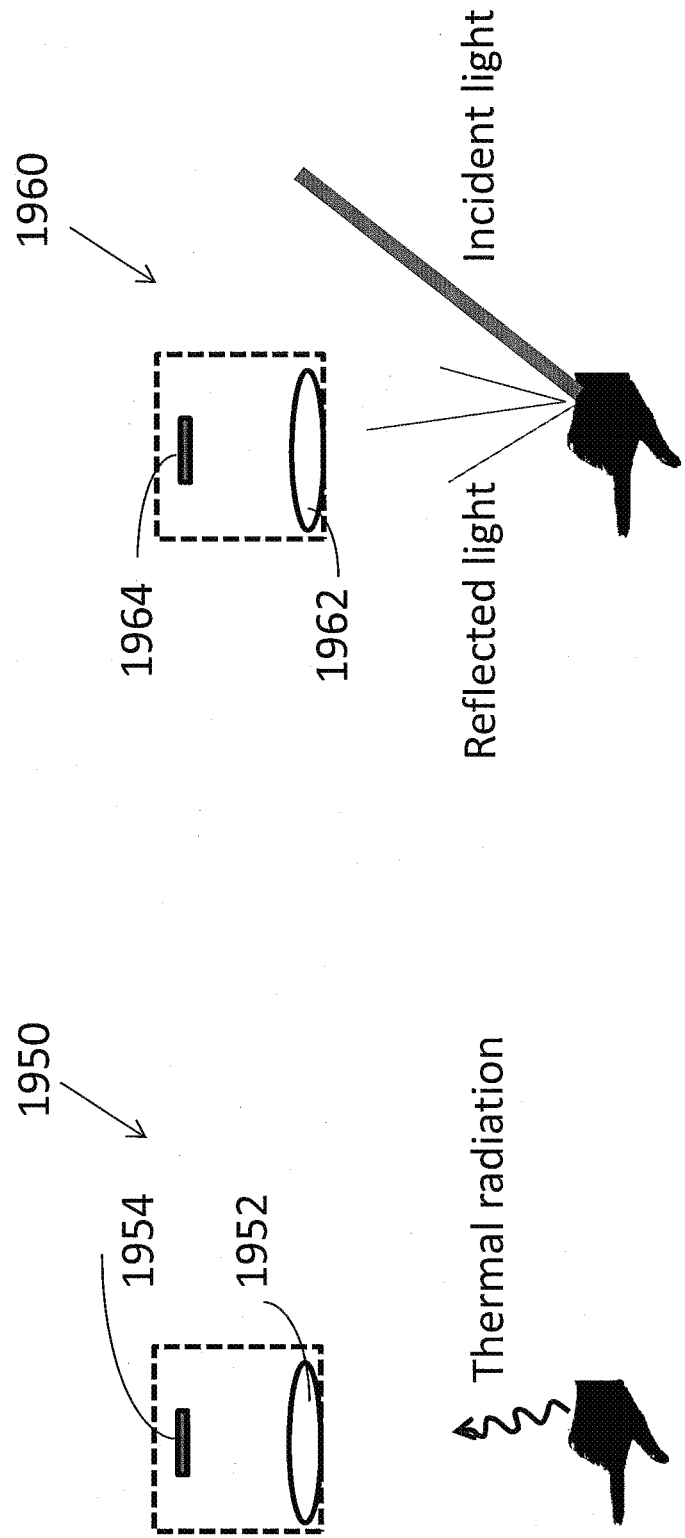
FIGS. 19C and 19D are views of a thermal sensor and a skin color sensor, respectively, in accordance with some embodiments.

FIGS. 19C and 19D are views of a thermal sensor 1950 and a skin color sensor 1960, respectively, in accordance with some embodiments.

In some embodiments, the sensing mode of a non-contact sensor can be emissive. Thermal radiation emitted from a body object, for example, a human hand, is collected by the thermal sensor 1950, which can be staring or scanning type. In embodiments where the thermal non-contact sensor 1950 is part of a staring system, the sensor 1950 comprises thermal imaging optics 1952 and a detector array 1954. In embodiments where the thermal non-contact sensor 1950 is part of a scanning system, the sensor 1950 comprises of imaging optics, a scan mirror, and detector line array or a single detector, for example, similar to the sensor 1940 of FIG. 19B

In other embodiment, the sensing mode can be reflective. Color light reflected off skin of body object is collected by the skin color sensor 1960, which can be scanning or staring type. A skin color non-contact sensor 1960 comprises of imaging optics 1962, color filters (not shown), and a detector array 1964 for a staring system. It comprises of imaging optics, color filters, scan mirror, and detector array in a scanning system. The skin color non-contact sensor 1660 can include other elements and functions described in U.S. patent application Ser. No. 13/826,177, the entire contents of which are incorporated herein by reference.

Figure 20:
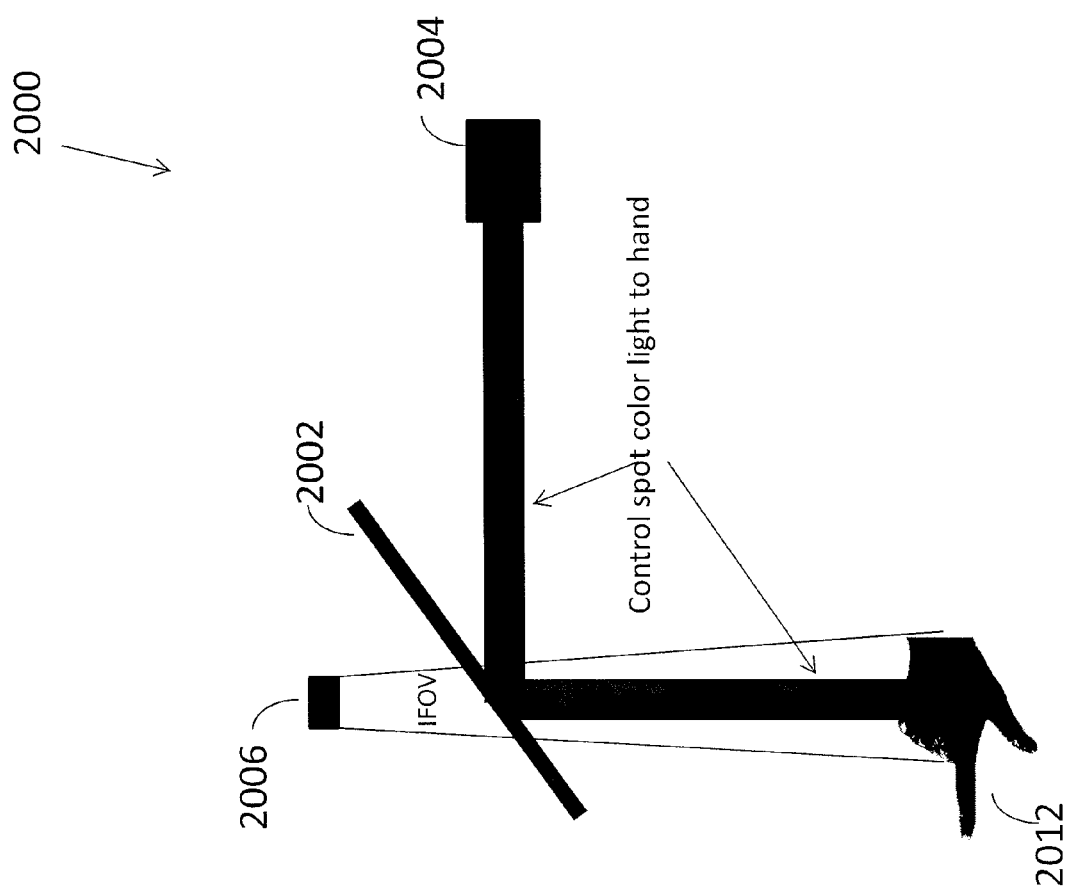
FIG. 20 is a view of a system 2000 for aligning a function key pixel and a control spot, in accordance with some embodiments.

FIG. 20 is a view of a system 2000 for aligning a function key pixel and a control spot, in accordance with some embodiments.

In order to permit a user to identify locations of non-contact keys, light at different colors can be emitted to illuminate the IFOVs of one or more non-contact keys. Each non-contact key is assigned to a color, in some embodiments. In order to shine the path of the IFOV for each non-contact key, the system 2000 includes a spot generator 2004 and a beamsplitter 2002. As illustrated in FIG. 20, the beamsplitter 2002 is placed at the angular bisector between the nadir looking non-contact sensor 2006 and the horizontal pointing control spot generator 2004, in some embodiments. The reflected light of the control spot generator 2004 at the beamsplitter 2002 coincides with the IFOV of the relevant function key. In some embodiments, the alignment of a control spot 2012 and identification of a function key is achieved by inserting a hand or other thermal emitting object into the control spot region 2012 and take an image of target in the control spot. The pixel or group of pixels with high output is the non-contact key pixel or pixels for this control spot 2012. Employing the same procedure, the other function key pixels for other control spots can be identified. Once the function key pixels for all control spots are identified, they can be assigned to various functions in some embodiment. In some embodiment, the beamsplitter 2002 can be of a coated type or uncoated type. The coating can be applied to one or both substrate surfaces. The uncoated type is usually made of infrared materials such as Si. Here the transmission and reflection is governed by Fresnel reflection.

FIG. 21A is an illustration of a parallel scanning configuration for a line detector array 2100A, in accordance with some embodiments. Each element represents the IFOV of a pixel. The whole array in FIG. 21A is the field of view (FOV) of the sensor. As shown in FIG. 21A, the IFOVs of a line array 2100A are oriented in a vertical position and scanned in one direction, for example, from left to right as shown in FIG. 21A, by a scan mirror or the like, for example, illustrated at FIG. 19, to create a full image. The array 2100A can include a mixture of function key pixels and non-function key pixels, described herein.

FIG. 21B is an illustration of a scanning configuration for a single element non-contact sensor 2100B, in accordance with some embodiments. The scanning method applied in FIG. 21B is serial. Here, the IFOV of the single element detector is scanned left to right, right to left, and so on, or a serpentine flow, in a raster scanning path to create a full image. Because only a few pixels out of the whole image are assigned to function key pixels, most of the pixels in the full image are not used. Instead of creating a full image, a partial image comprising of all function key pixels and minimum number of non-function key pixels in some embodiments.

FIG. 21C is an illustration of a fast scanning configuration for a single element non-contact sensor 2100C, in accordance with some embodiments. Here, a scan path is formed that creates a partial image including all function key pixels and a minimum number of non-function key pixels. The scan path can be any route as long as it contains all the function key pixels. Because the number of pixels that need to be scanned is small and only one detector is required, a non-contact switch that incorporates this configuration can be fast and inexpensive as compared to other configurations.

Figure 22:
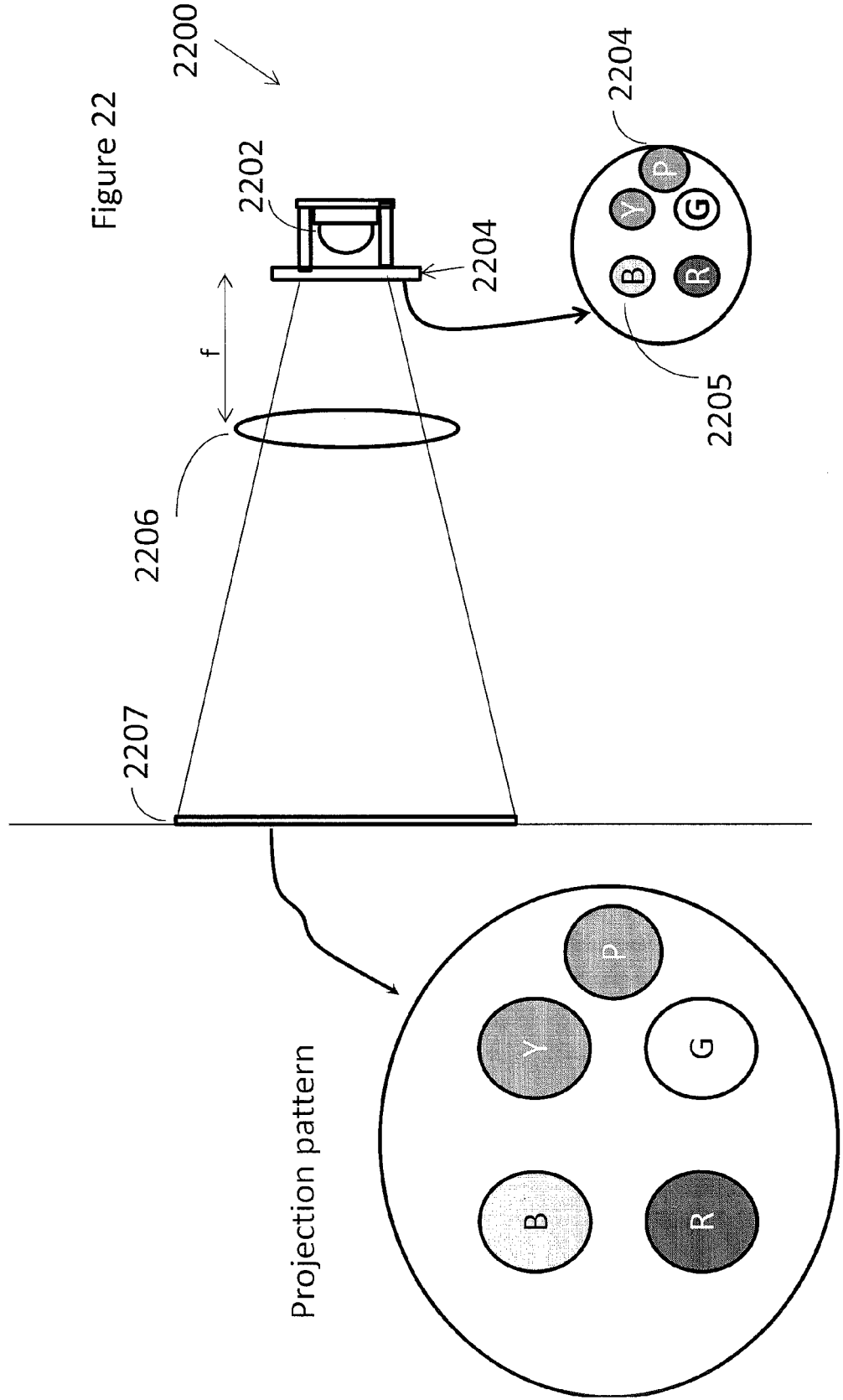
FIG. 22 is a view of a control spot generator, in accordance with some embodiments.

FIG. 22 is a view of a control spot generator 2200, in accordance with some embodiments. The control spot generator 2200 comprises of a white LED 2202, a control spot generator plate 2204 with color filters 2205, and a lens 2206. The lens 2206 is separated from the filter plate 2204 by a distance f. Color light is generated from color filters 2205 when the white LED light illuminates. Images of the color filters are created by the lens. As shown in FIG. 22, the control spot generator 2200 can project multiple well defined illumination control spots onto a projection surface 2207. For example, a projection pattern on the surface 2207 can comprise blue (B), green (G), yellow (Y), red (R), and purple (P) control spots.

Figure 23:
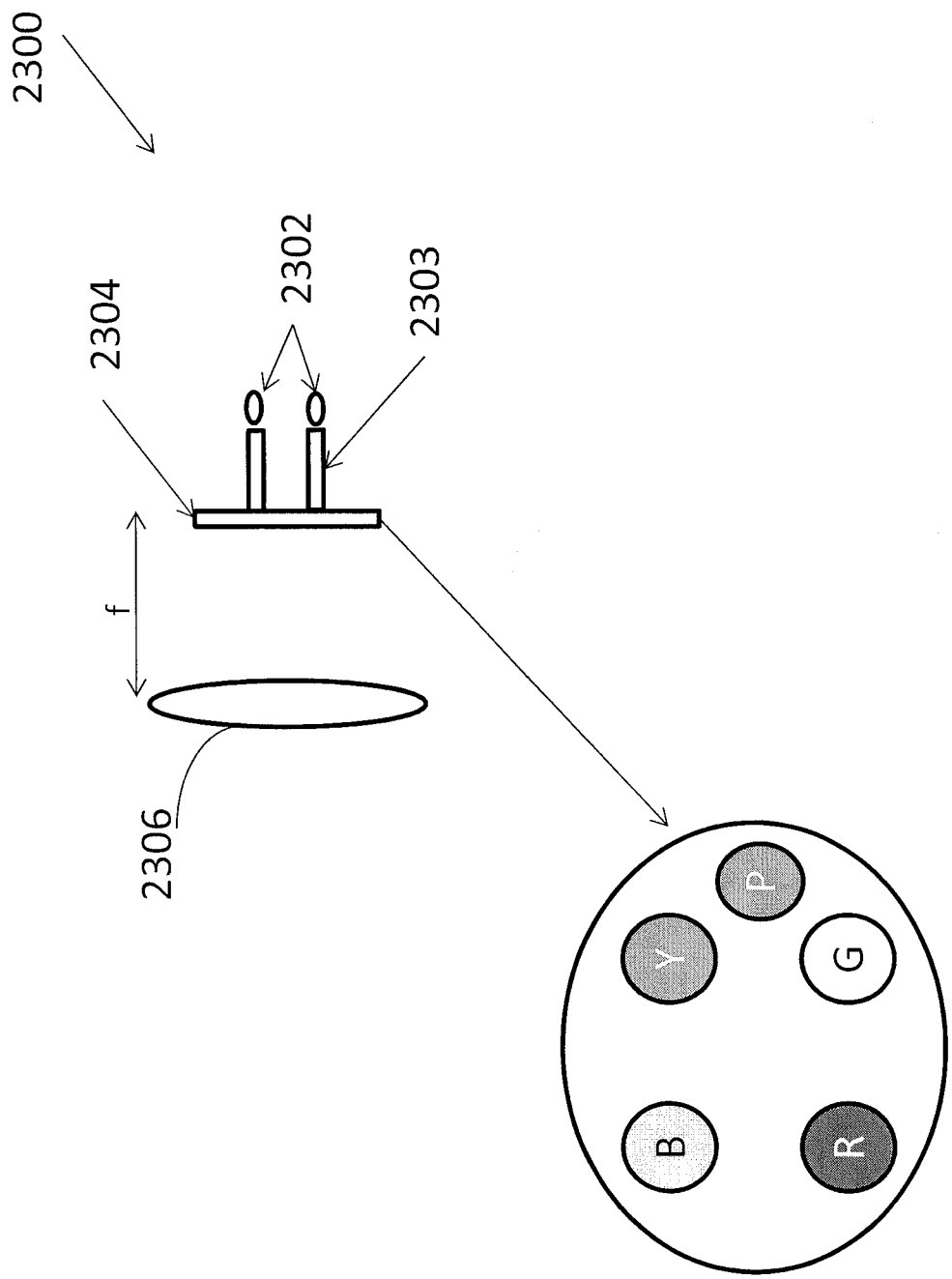
FIG. 23 is a view of a control spot generator, in accordance with some embodiments.

FIG. 23 is a view of a control spot generator 2300, in accordance with some embodiments. In some embodiment, the control spot generator 2300 comprises a plurality of color LEDs 2302, light pipes 2303, a light pipe mounting plate 2304, and a lens 2306. The lens 2306 is separated from the mounting plate 2304 by a distance f. The light pipes 2303 include exit ports at a focal plane of the lens 2306. As shown in FIG. 23, LEDs 2302 and corresponding light pipes 2303 can generate control spots of different colors, for example, blue (B), green (G), yellow (Y), red (R), and/or purple (P) control spots. The control spot light is used to illuminate the IFOVs of function keys shown in FIG. 24-28. In some embodiments, a control spot generator can also be constructed from color lasers as oppose to LEDs as in FIG. 22-23.

Figure 24:
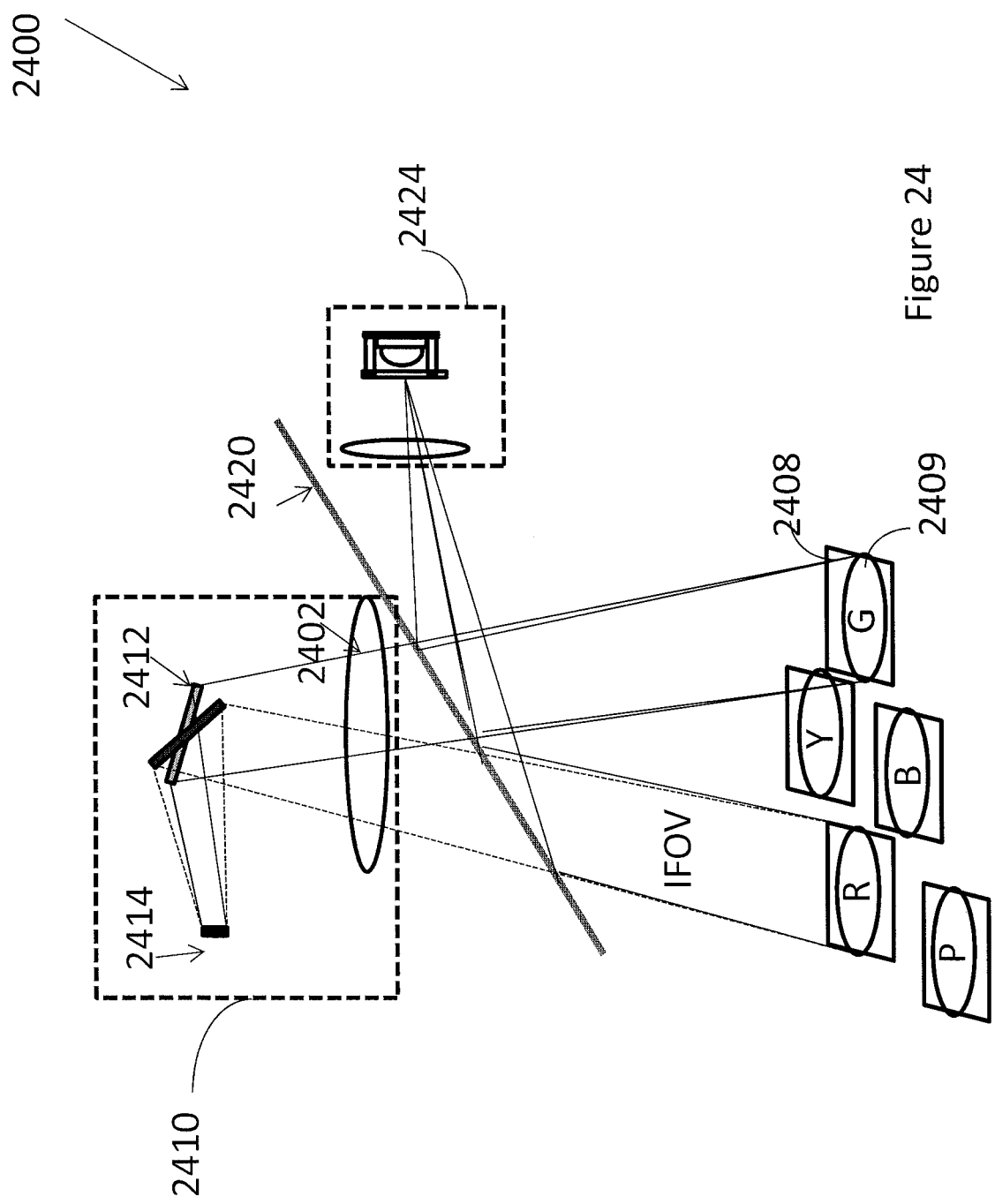
FIG. 24 is a view of a non-contact switch including a scanning non-contact sensor, in accordance with some embodiments.

FIG. 24 is a view of a non-contact switch 2400 including a scanning non-contact sensor 2410, in accordance with some embodiments. The non-contact switch 2400 can be the same as or similar to other embodiments herein. Details thereof are not therefore not repeated due to brevity. In some embodiments, the non-contact switch 2400 comprises the scanning non-contact sensor 2410, a beamsplitter 2420, and a control spot generator 2224. The sensor 2410 includes a detector or a line detector array 2414 and a scan mirror 2412. A scan mirror 2412 can be a one-axis mirror for a line detector array, or a two-axes mirror for a single element detector, as described herein with reference to other embodiments. The scan mirror 2412 scans the FOV of the sensor continuously in pattern shown FIG. 21A or 21C. The scanning sensor 2410 preferably scans a portion of a field of view at a time until the complete field of view is scanned. Detector or detectors continuously send output light signals captured from IFOVs of function and non-function key pixels to a processor. Light signals from various IFOVs are captured by the same detector for single element detector or same detectors for line detector array. The processor only processes signal from function key pixels. If a target is detected in a function key, then a command is generated and output to a device under control 2602 as shown in FIG. 26.

Figure 25:
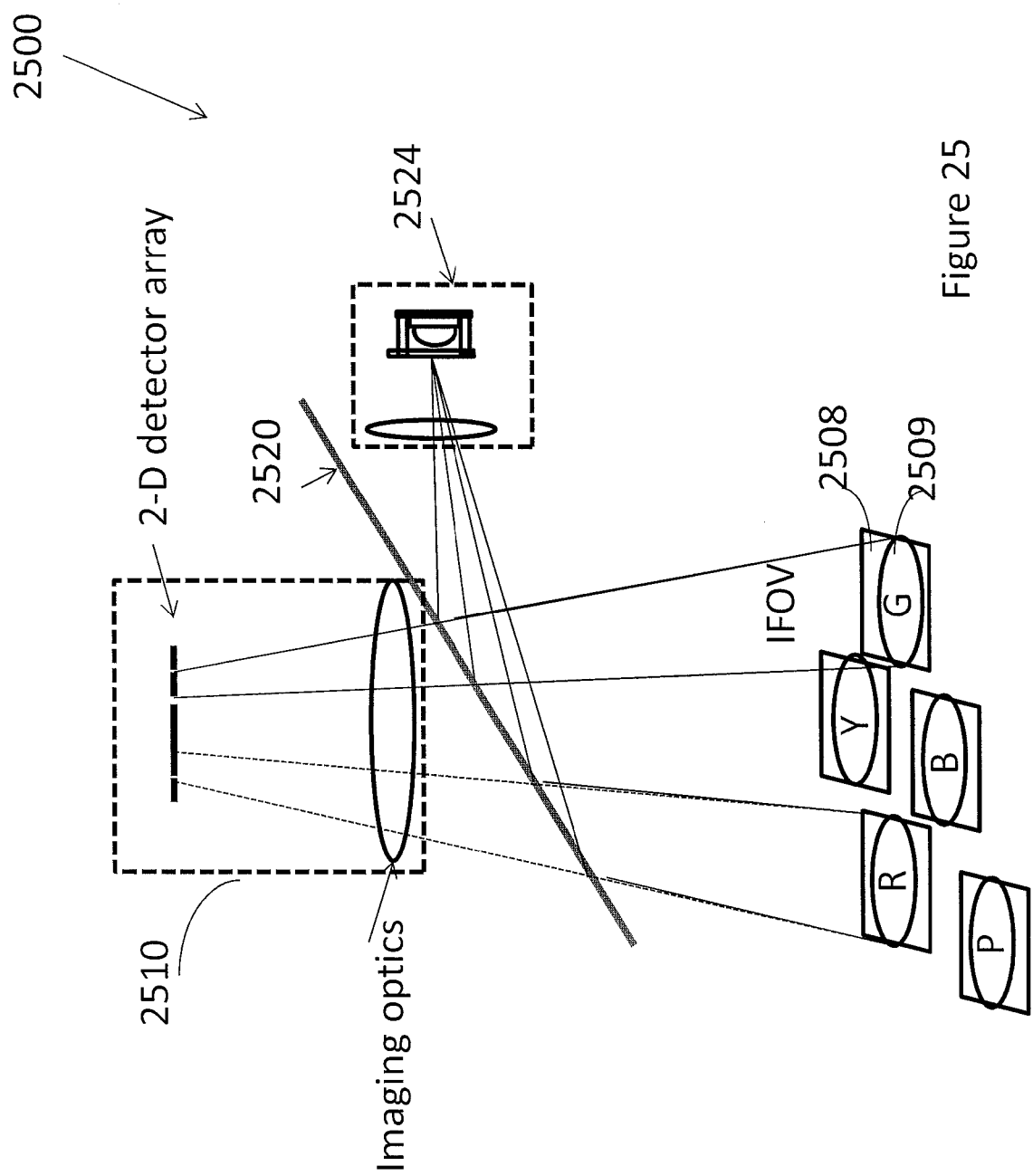
FIG. 25 is a view of a non-contact switch including a staring non-contact sensor, in accordance with some embodiments.

FIG. 25 is a view of a non-contact switch 2500 including a staring non-contact sensor 2510, in accordance with some embodiments. In addition to the staring non-contact sensor 2510, the switch 2500 comprises a beamsplitter 2520, and a control spot generator 2524. The non-contact switch 2500 can be the same as or similar to other embodiments herein. Details thereof are not therefore not repeated due to brevity. The operation of this non-contact switch is similar to that of scanning non-contact switch except the light signals from various IFOVs are captured by different detectors, and that the staring sensor 2510 generates all image pixels simultaneously.

In FIGS. 24 and 25, the function keys 2408, 2508, respectively, are aligned with control spots 2409, 2509, respectively, along the paths of the IFOVs by the beamsplitter 2420, 2520, respectively. In FIGS. 24 and 25, there are five function keys 2408, 2508 shown, each aligned with a control spot having a different color, e.g., blue (B), green (G), yellow (Y), red (R), and purple (P) control spots. In some embodiments, two of the function keys 2408, 2508 can correspond to on/off switches. For example, the R function key can function as an off switch when a hand gesture is positioned in the IFOV of the R function key/control spot, and the G function key can function as an on switch when a hand gesture is positioned in the IFOV of the G function key/control spot. Because there are more than two function keys, extra function keys can be used for controlling. A non-contact switch can be also referred as non-contact controller. In some embodiments, two other function keys 2408, 2508 can be assigned to amplitude increasing/decreasing functions. For example, the amplitude can be light level if it is a light switch, or can refer to the speed of a fan if it is a fan switch. For example, the B function key can be used to increase an amplitude of an apparatus under control when a hand gesture is positioned in the IFOV of the B function key/control spot, and the Y function key can be used to decrease an amplitude of an apparatus under control when a hand gesture is positioned in the IFOV of the Y function key/control spot. In some embodiments, the last function key can be assigned to an ambient background measurement function. This is especially important for a thermal non-contact sensor because thermal detectors generate more noise than other detectors. Removing the ambient background can reduce undesirable noise. In embodiments where the thermal sensor is a scanning system with a single element detector, removing the background also removes the dark current of the detector. This is done by subtracting the ambient key pixel from other function key pixels, thereby enhancing the signal to noise ratio. When using other function keys, the user can verify that the IFOV only intercepts an ambient background, and that a hand or other warm targets are not placed in the IFOV.

Figure 26:
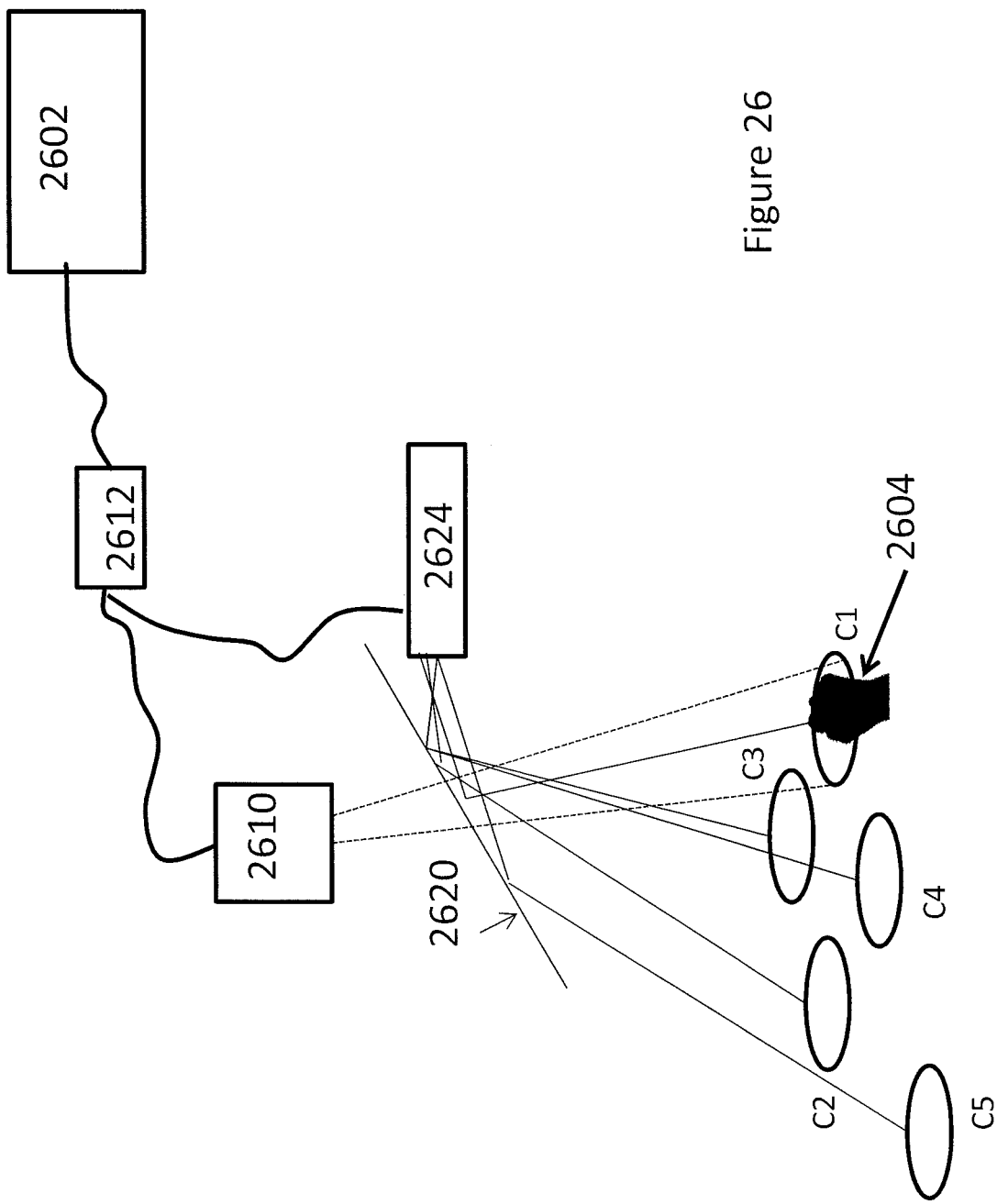
FIG. 26 is an illustration of an apparatus controlled by a non-contact switch, in accordance with some embodiments.

FIG. 26 is an illustration of an apparatus 2602 controlled by a non-contact switch, in accordance with some embodiments. The non-contact switch can be the same as or similar to other embodiments herein. Details thereof are not therefore not repeated due to brevity.

When a non-contact sensor 2610 of the non-contact switch detects a hand signature in a control spot 2604 generated by a control spot generator 2624, the sensor 2610 outputs the information to a processor 2612, which can be integral with or physically separate from other elements of the non-contact switch. Although not shown, the processor 2612 can include a transceiver. In some cases, the non-contact switch 2610 and the device under control 2602 are separated by large distance, the transceivers can communicate wirelessly. The processor 2612 determines which function key is in communication with a hand gesture. The locations of control spots correspond to the locations of the function keys. Function keys do not have to fill the control spots completely, but must be at least partially aligned. Accordingly, the control spots can serve as function keys. In response, the processor 2612 generates a command C1-C5 that is output to the apparatus under control 2602. For example, command C1 can be a switch on command, command C2 can be a switch off command, command C3 can be an amplitude increase command, command C4 can be an amplitude decrease command, and command C5 can be an ambient background command.

Figure 27:
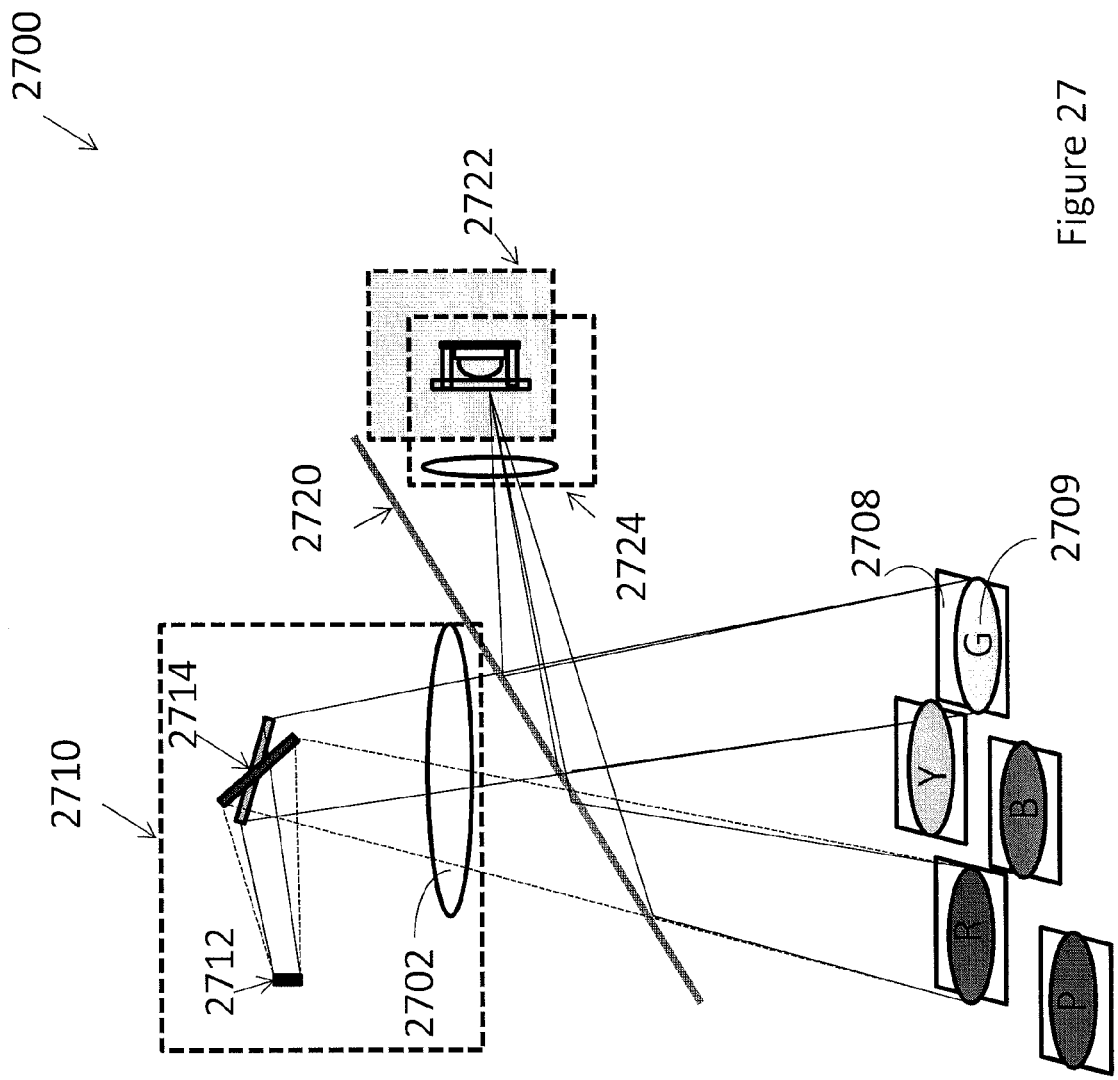
FIG. 27 is a view of a non-contact switch including a camera, in accordance with some embodiments.

FIG. 27 is a view of a non-contact switch 2700 including a camera or cameras 2722, in accordance with some embodiments. In some embodiments, the camera 2722 is a visible band camera. In some embodiments, the camera 2722 is a near infrared (NIR) band camera. In some embodiments, the camera 2722 is a shortwave infrared (SWIR) band camera. Other spectrums can equally apply. In FIG. 27 the camera or cameras 2722 is placed next to the spot generator. In some embodiment, cameras 2722 can be placed in other locations.

The non-contact switch 2700 can include a non-contact sensor 2710 or the like, which can be the same as or similar to other embodiments herein. For example, the non-contact switch 2700 can include imaging optics 2702, scan mirror 2712, detector 2714, beamsplitter 2720, and control spot generator 2724, which can be the same as or similar to those described in other embodiments herein.

Figure 28:
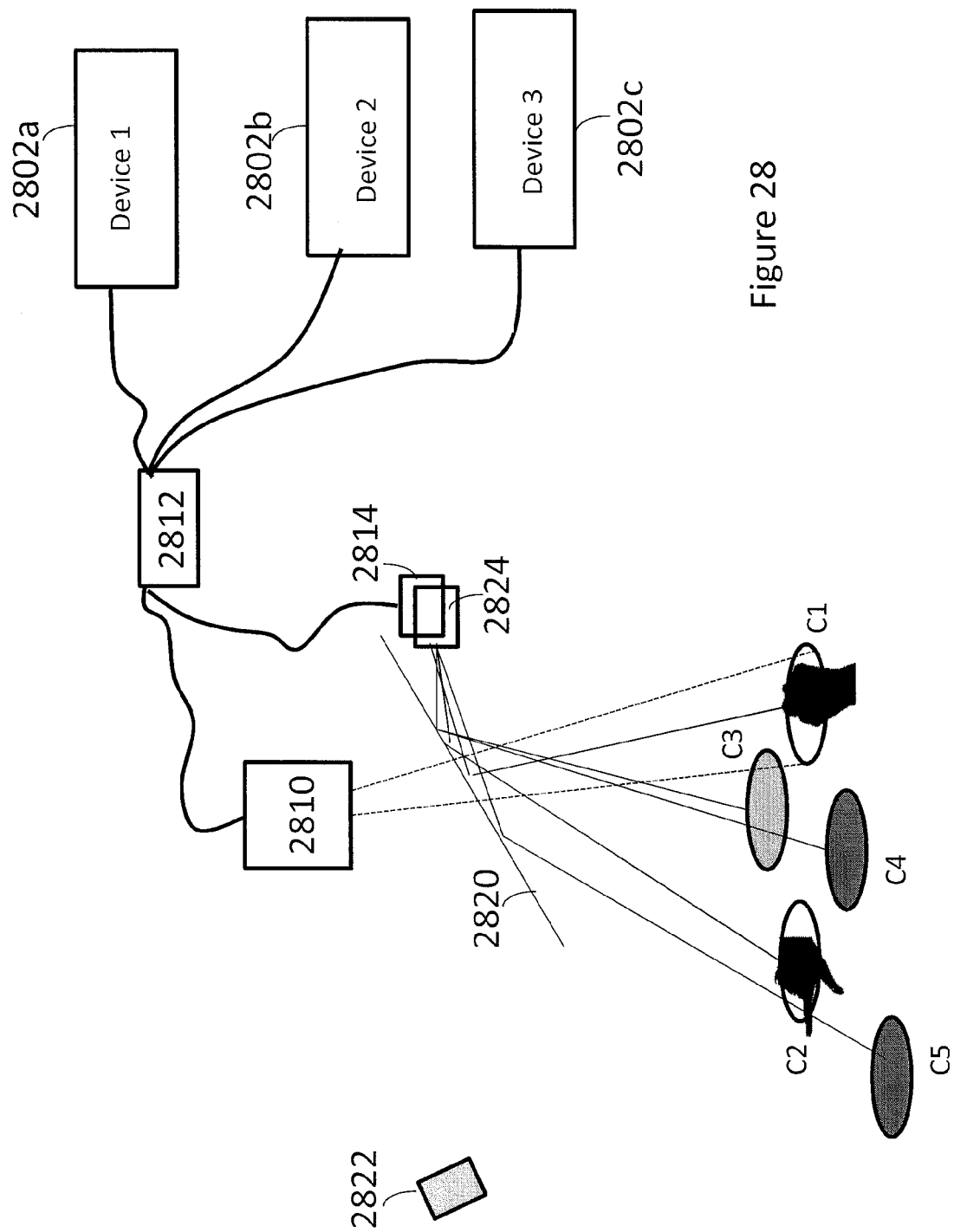
FIG. 28 is an illustration of multiple devices controlled by a non-contact switch, in accordance with some embodiments.

The camera 2722 receives hand gesture information that can be used to enhance a control function of the non-contact switch 2700. Accordingly, multiple hand gestures can be processed for a given function key as illustrated by the examples of FIGS. 30, 31, 32, 33, 35, and 36. For example, the hand gestures are used to control the direction of motion for a drone. In some embodiments, one can control multiple devices by using a combination of function keys and hand gestures. For example, the number of fingers can be assigned to control each of a plurality of lamps, for example, one finger for first lamp, two fingers for a second lamp, three fingers for a third lamp, and so on. A plurality of function keys 2709 and corresponding control spots 2708 can be provided. To switch from the current device to a different device, two hand gestures at two different control spots at simultaneously are needed in some embodiment. FIG. 28 provides more details.

FIG. 28 is an illustration of multiple devices 2802a-c (generally, 2602) controlled by a non-contact switch 2800. The non-contact switch 2800 can include a non-contact sensor 2810 or the like, which can be the same as or similar to other embodiments herein. For example, the non-contact switch 2700 can include a non-contact sensor 2810, a camera 2814 or multiple cameras, beamsplitter 2820, and control spot generator 2824 and/or other elements that are the same as or similar to those described in other embodiments herein. The cameras 2814 can be mounted next to the control spot generator 2824 or other place. An illumination source 2822 can provide light for the cameras.

A hand gesture can be positioned at different control spots to control the current device. To switch to another device, two hands at two different control spots at the same time are needed. For example, when both hands are inserted in on and off control spots C1, C2 at the same time, a device changing signal, or selection signal, is triggered in the processor 2812. The hand gesture in C2 contains device number. Number of fingers can be used as device number, for example. A two fingers hand gesture in C2 signals switching from current device to device 2. After the processor 2812 analyzes the hand gesture image from the camera 2814, a device number is obtained. The processor 2812 communicates directly with the selected device 2802.

In some embodiments, the non-contact switch 2800 can be in a tracking mode. This is usually for slow moving controlling such as a non-contact mouse motion of a computer. One control spot C1 can be used to activate the tracking mode using a special hand gesture in some embodiment. During tracking, the control spots C2-C5 are inactive. Signals from C2-C5 will not be processed. The camera 2814 takes over. The processor now only processes camera images and signal from the control spot C1. A stop hand gesture, for example, at a predetermined control spot C1, can be used to end the tracking.

Figure 29:
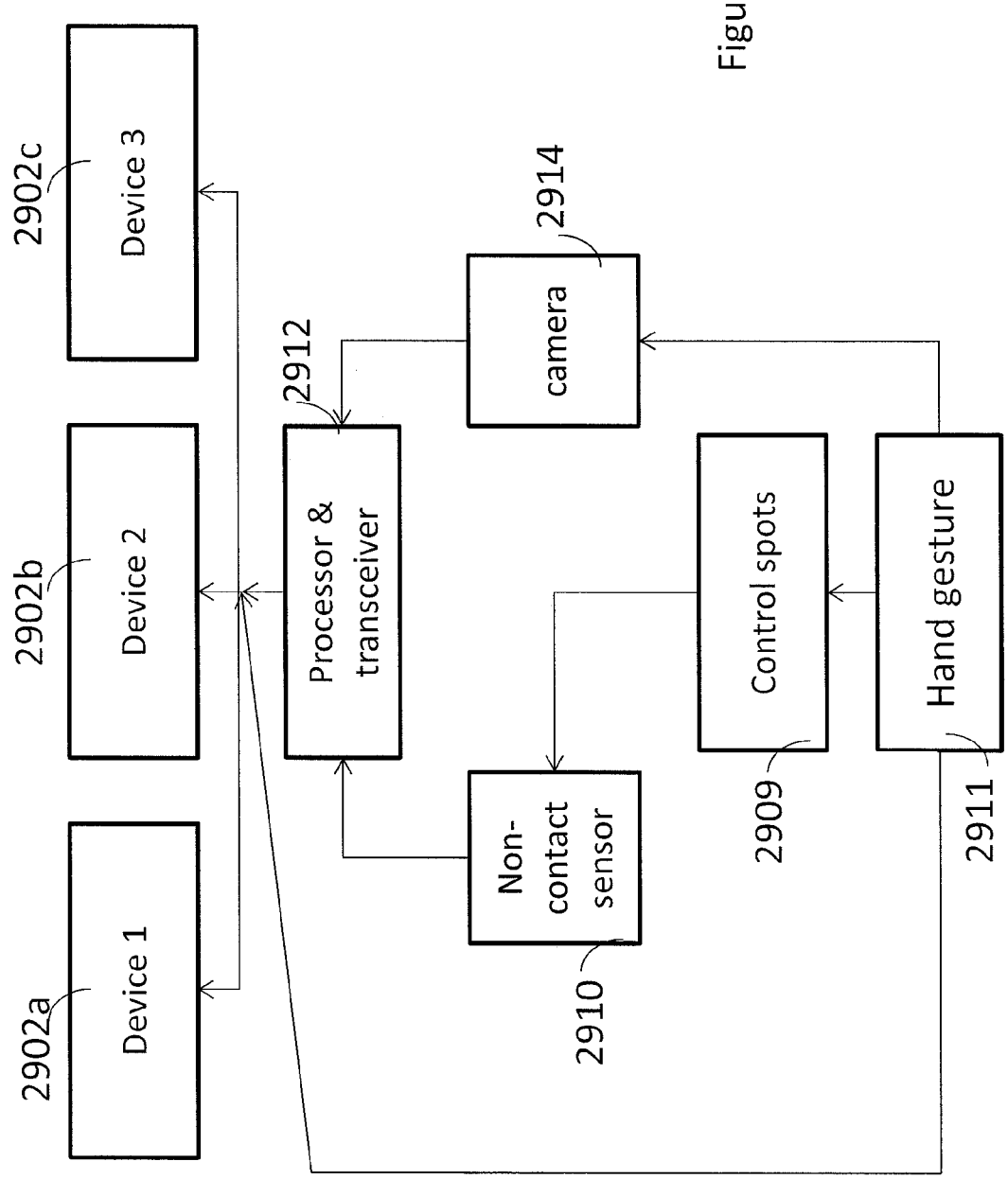
FIG. 29 is a flowchart illustrating the relationship between elements of a non-contact switch in an operation, in accordance with some embodiments.

FIG. 29 is a flowchart illustrating the relationship between elements of a non-contact switch in an operation, in accordance with some embodiments.

The non-contact sensor 2910 can scan the control spots 2909 for a hand heat signature or color information. During operation, a hand gesture is inserted into a control spot first. The thermal signal from the hand is captured by the non-contact sensor 2910. A camera 2914 can capture an image of a region of the control spot 2909. More specifically, the camera captures the hand gesture, control spot and the background, but only the hand gesture is extracted for processing. If the heat signature or color of hand gesture 2911 is detected in one control spot 2909, then the operation will control a current device. The camera or cameras 2914 will capture images of hand gesture. The heat signature or color signal from control spot 2909 and the hand gesture information from the camera 2914 are used by the processor 2912 to generate a command. If a tracking mode is detected, then all but one control spots 2909 become inactive. The processor simply stops process the control spot information. Hand tracking can continue until a stop hand gesture is given. When tracking ends, the control spots 2909 become active again. The command is sent to the device 2902 under control. When a hand gesture is detected in another control spot 2909, the same process will be repeated. If a heat signature or color signal is detected in two control spots 2909, on and off control spots for example, simultaneously, a device change mode is activated in the processor 2912. The number of fingers in the image of the hand gesture 2911 will determine which device 2902 the operation will be in. The processor 2912 now communicates only to the current device 2902. The switching or controlling only occurs in at the selected device 2902.

In some embodiments, a non-contact switch can be mounted on any surface, on the ceiling, the wall, or floor. In some embodiment, a non-contact switch can be mounted on forehead, for example, by a headband shown in FIG. 15. Accordingly, a video game player can use the non-contact switch as a video game controller in some embodiments. The control spots can serve as "buttons" of a video game controller. A player can play the video game by inserting his/her hand gestures into the control spots. The non-contact game controller in a car racing video game can control a remote control car by wearing the controller on the user's head. Because of the simplicity of the process, the process time is fast. This makes fast-action electronic games or devices, such as a remote control car described herein, enjoyable to play. In some embodiments, an inexpensive reflection panel can be used to enhance the control spot visibility with respect to such games. This may be helpful for beginner game players. As the player plays more, he/she will remember the positions of the control spots.

Figure 30:
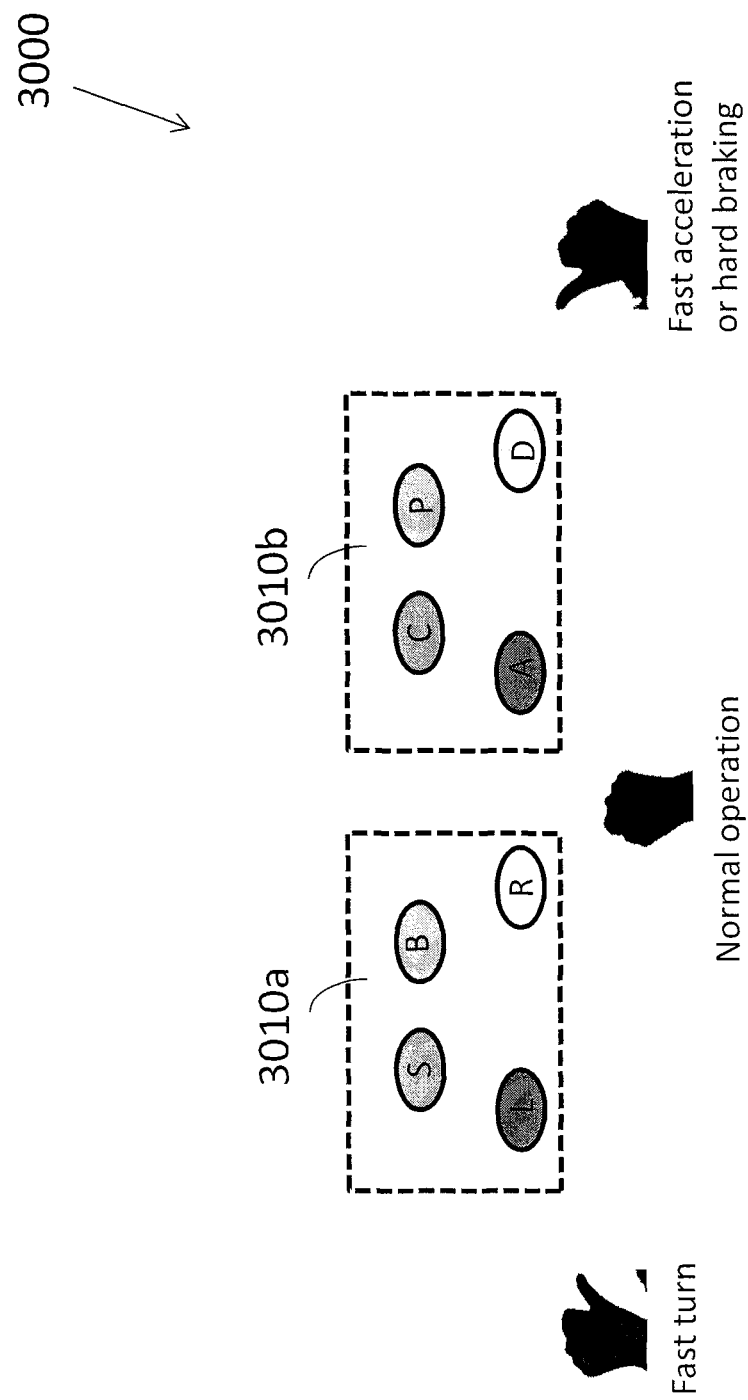
FIG. 30 is a view of control spot functions of a remote controller for a remote control vehicle, in accordance with some embodiments.

FIG. 30 is a view of control spot functions of a remote controller 3000 for a remote control vehicle, in accordance with some embodiments. The remote controller 3000 includes elements of a non-contact switch in other embodiments herein. Details thereof are therefore not repeated for brevity.

In an embodiment, a remote control vehicle is controlled by two non-contact controllers, in particular, a left controller 3010A for direction control and a right controller 3010B for speed control.

The control spots from the non-contact controllers 3010A, 3010B are projected on a surface. The control spots can be distinguished from each other by color, size, or other characteristic. The four control spots displayed by the left controller 3010A are provided for direction control while the four control spots displayed by the right controller 3010B are for speed control. In some embodiments, the hand gesture is a first corresponding to a normal operation command, the left hand gesture with a thumb is for fast turning, and the right hand gesture with a thumb is for fast acceleration or hard braking, depending on which control spot the right hand is in. A predefined key can be established for associating each control spot with a particular hand gesture and corresponding command. For example, control spot A corresponds to an accelerate command, control spot B corresponds to a backup command, control spot C corresponds to a cruising command, control spot D corresponds to a decelerating command, control spot L corresponds to a left command, control spot P corresponds to a park command, and control spot R corresponds to a right command. Accordingly, if a user wants to remotely control a vehicle or a vehicle displayed in a video game, and desires for the vehicle to accelerate in a straight line, the user can position a left first on control spot S and a right first with extended thumb on control spot A for fast acceleration.

Figure 31:
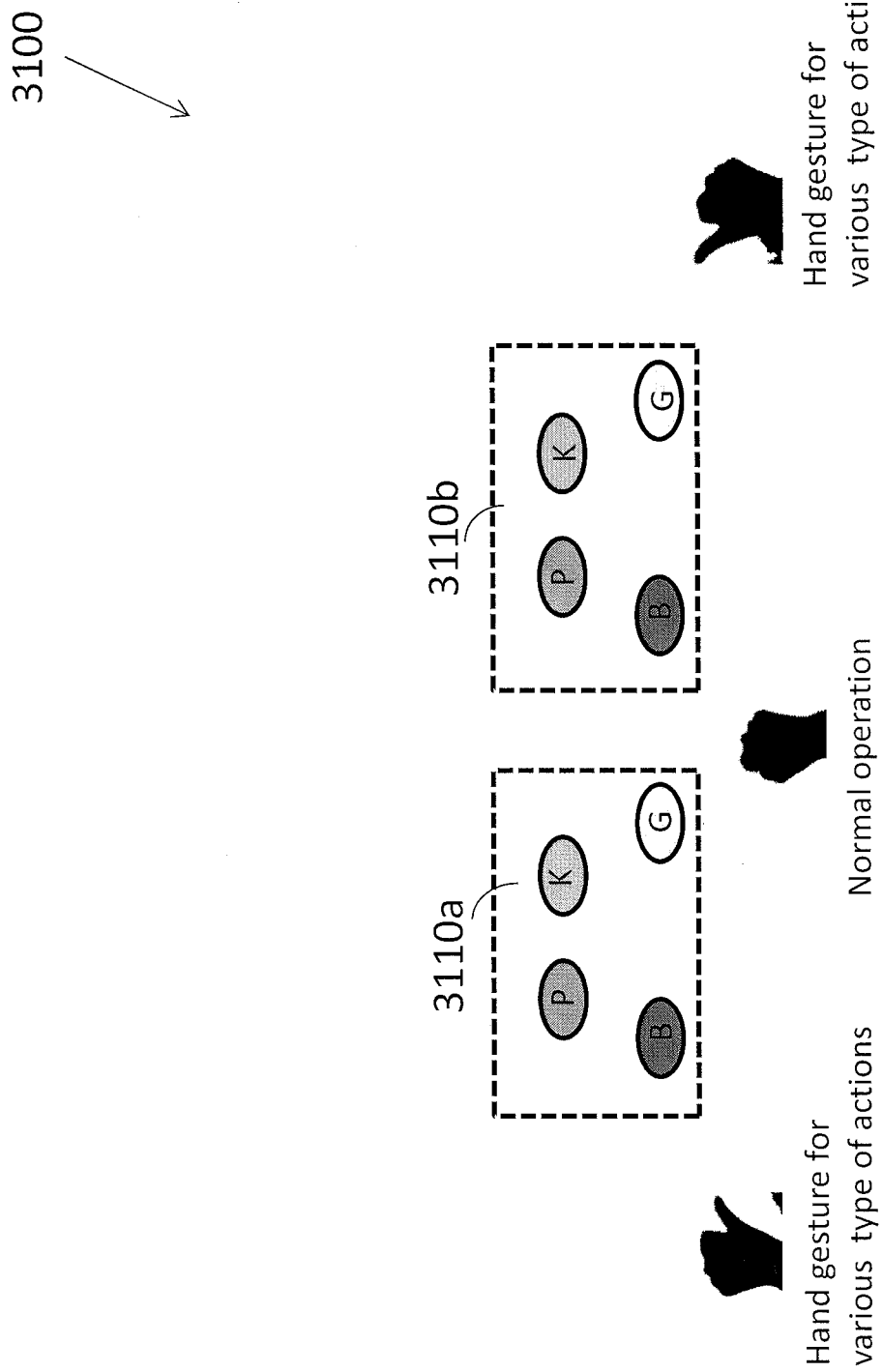
FIG. 31 is a view of control spot functions of a game controller for a video game console, in accordance with some embodiments.

FIG. 31 is a view of control spot functions for a game controller 3100 for a video game console, in accordance with some embodiments. The controller 3100 includes elements of a non-contact switch in other embodiments herein. Details thereof are therefore not repeated for brevity.

In some embodiment, one or multiple non-contact controller units similar to or the same as non-contact switches herein can be used as a video game controller 3110A, 3110B (generally, 3110), for example to control a martial arts video game such as the Kickstarter™ program, but not limited thereto. Other video games or electronic devices can equally apply.

The left controller 3110A controls movements of left limbs of a martial arts character displayed in the video game. The right controller 3110B controls movements of right limbs of the martial arts character.

A plurality of control spots from the non-contact controllers 3110A, 3110B are projected on a surface. The control spots can be distinguished from each other by color, size, or other characteristic. The four control spots displayed by the left controller 3110A are provided for left limb control while the four control spots displayed by the right controller 3110B are for right limb control.

A predefined key can be established for associating each control spot with a particular hand gesture and corresponding command. For example, control spot P corresponds to a punch command, control spot K corresponds to a kick command, control spot B corresponds to a block command, and control spot G corresponds to a grab command.

Hand gestures can be used as additional features in some embodiment. For example, a hand gesture with an extended thumb at the K control spot generates a signal instructing a sidekick to be executed by the video game character.

Figure 32:
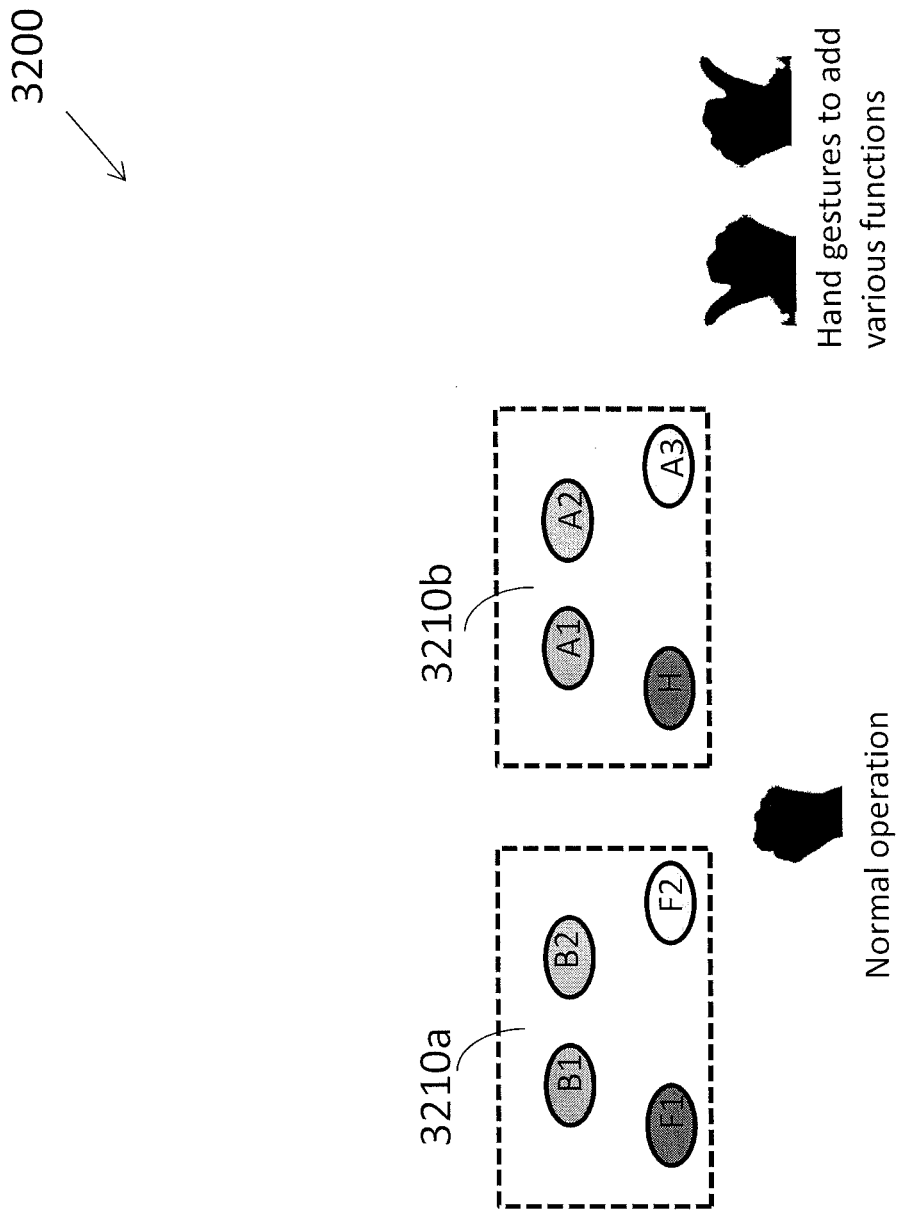
FIG. 32 is a view of control spot functions for two non-contact controllers controlling an excavator, in accordance with some embodiments.

In some embodiments, one or more non-contact switch/controllers can be used to control a mechanical apparatus. For example, as illustrated in FIG. 32, the control spots of two non-contact controllers 3210A, 3210B (generally, 3210) of a controller system 3200 can be used to control an excavator or related apparatus. The two controllers 3210A, 3210B can replace two joysticks conventionally located at an excavator. The left controller 3210A corresponding to a left joystick is for controlling the fore arm and bucket of the excavator. The right controller 3210B corresponding to a right joystick is for controlling the back arm and housing movements of the escalator.

A plurality of control spots from the non-contact controllers 3210A, 3210B are projected on a surface. The control spots can be distinguished from each other by color, size, or other characteristic.

A predefined key can be established for associating each control spot with a particular hand gesture and corresponding command. For example, control spot A1 of the right controller 2310B corresponds to a command whereby the escalator arm moves up. Control spot A2 corresponds to a command whereby the escalator arm moves down. Control spot A3 corresponds to a command whereby the escalator arm rotates. When a hand gesture having a thumb extending in a left direction is placed at control spot A3, the escalator arm rotates to the left. When a hand gesture having a thumb extending in a right direction is placed at control spot A3, the escalator arm rotates to the right. When a hand gesture in the form of a first is placed at control spot A3, the escalator arm stops rotating. Control spot H corresponds to a rotation of the escalator housing. When a hand gesture having a thumb extending in a left direction is placed at control spot H, the escalator housing rotates to the left. When a hand gesture having a thumb extending in a right direction is placed at control spot H, the escalator housing rotates to the right. When a hand gesture in the form of a first is placed at control spot H, the escalator housing stops rotating.

In other examples, control spot B1 of the left controller 2010B corresponds to a command whereby the escalator bucket makes a scoop motion. Control spot B2 of the left controller 2010B corresponds to a command whereby the escalator bucket makes a dump motion. Control spot F1 of the left controller 2010B corresponds to a command whereby the escalator forearm is extended. Control spot F2 of the left controller 2010B corresponds to a command whereby the escalator forearm is curled or retracted.

Hand gestures can be used to enhance the controlling functions. For example, a thumb pointing left on control spot A3 rotates the back arm to the left while a thumb pointing to the right on control spot A3 rotates the back arm to the left. A closed first hand gesture can correspond to an instruction to remain at a current status.

FIG. 33A is a side view of a non-contact controller system 3300 for controlling a drone 3350, in accordance with some embodiments. FIG. 33B is a front view of the non-contact controller system 3300 of FIG. 33A. FIG. 33C is a view of a drone 3350 controlled by the non-contact controller system 3300 of FIGS. 33A and 33B.

In some embodiments, the system 3300 comprises two non-contact controllers 3304A, 3304B (generally, 3304) and a head mounted display 3302 such as a Google Glass wearable computer. A transceiver 3306 can be also worn on the head or any part of the user's body. Communications between the non-contact controller 3300 and the drone 3350 is via the transceiver 3306 of the controller 3300 and a transceiver on the drone 3350. The non-contact controllers 3304 are used to control the drone 3350 while the head mounted display 3302 is used to display flight information, onboard camera images, and/or other information related to an operation of the drone 3350.

In some embodiments, the two non-contact controllers 3304 are mounted on the user's forehead above the display device 3302. Two non-contact controllers allow the user to have enough function keys for controlling certain devices. In this manner, control spot beams 3305 can be projected from the non-contact controllers 3304 in front of the user. The user can position hand gestures along a path of the control spot beams. The control spots 3305 can be formed on and/or about the hand gestures for controlling the drone 3350. The control spots 3305 can illuminate a surface, and a hand gesture can be made over the surface but at the control spot for controlling the drone 3350.

FIG. 34 is another illustration of a non-contact controller system 3400 for controlling a drone, in accordance with some embodiments. The remote controller 3400 includes elements of a non-contact switch in other embodiments herein such as the controllers 3304 of FIG. 33. Details thereof are therefore not repeated for brevity. The controllers 3304A, 3304B can be left and right controllers, respectively. Only the function keys illuminated by control spot light in the two controllers are shown. The physical controllers can be similar to those described with reference to FIG. 27. Each controller 3304 can provide different control spot functions with respect to controlling a drone or other remote device.

In some embodiments, the controller system 3400 performs two modes of operation: manual control and automatic control, which can be established by a hand gesture, described below.

A plurality of control spots from the non-contact controllers 3304A, 3204B are projected on a surface. The control spots can be distinguished from each other by color, size, or other characteristic.

A predefined key can be established for associating each control spot with a particular hand gesture and corresponding command. For example, control spot Y of the right controller 3304B corresponds to a command that instructs the drone 3350 to move in a yaw direction. Control spot AD corresponds to a command that instructs the drone 3350 to ascend or descend. Control spot F corresponds to a command that instructs the drone 3350 to move forward. Control spot H corresponds to a command that instructs the drone 3350 to hover. When a hand gesture having a thumb extending in a left direction is placed at control spot Y, the drone 3350 is instructed to yaw to the left. When a hand gesture having a thumb extending in a right direction is placed at control spot Y, the drone 3350 is instructed to yaw to the right. When a hand gesture having a thumb extending in a left direction is placed at control spot AD, the drone 3350 is instructed to ascend. When a hand gesture having a thumb extending in a right direction is placed at control spot AD, the drone 3350 is instructed to descend.

Referring to the controller 3304A, control spot P corresponds to a command that instructs the drone 3350 to pitch. Control spot LT corresponds to a command that instructs the drone 3350 to land or takeoff Control spot R corresponds to a command that instructs the drone 3350 to roll. Control spot T corresponds to a command that instructs the drone 3350 to toggle between automatic and manual modes and/or to change a camera configuration. When a hand gesture having a thumb extending in a right direction is placed at control spot P, the drone 3350 is instructed to pitch up. When a hand gesture having a thumb extending in a left direction is placed at control spot P, the drone 3350 is instructed to pitch down. When a hand gesture having a thumb extending in a right direction is placed at control spot LT, the drone 3350 is instructed to take off. When a hand gesture having a thumb extending in a left direction is placed at control spot LT, the drone 3350 is instructed to land. A closed first hand gesture can correspond to an instruction to remain at a current status. When a hand gesture having a thumb extending in a left direction is placed at control spot R, the drone 3350 is instructed to roll in the positive direction. When a hand gesture having a thumb extending in a right direction is placed at control spot R, the drone 3350 is instructed to roll in the negative direction. The direction of roll obeys the right hand rule.

To toggle between the automatic mode and the manual mode, the user can insert his/her hand into the T control spot generated by controller 3304A, in some embodiments. A hand gesture with a thumb pointing right is for a manual mode. A hand gesture with a thumb pointing left is for an automatic mode.

Figure 35A:
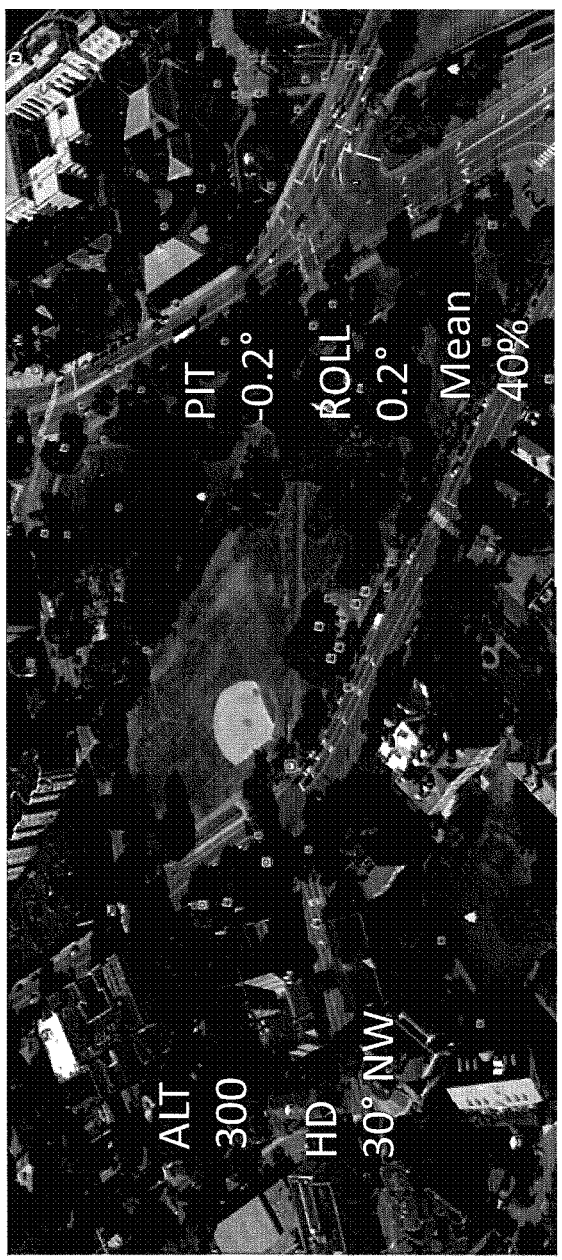
FIG. 35A is an image generated from an onboard camera of the drone of FIG. 33C when the controller system is configured for a manual mode of operation, in accordance with some embodiments.
Figures 35B, 35C:
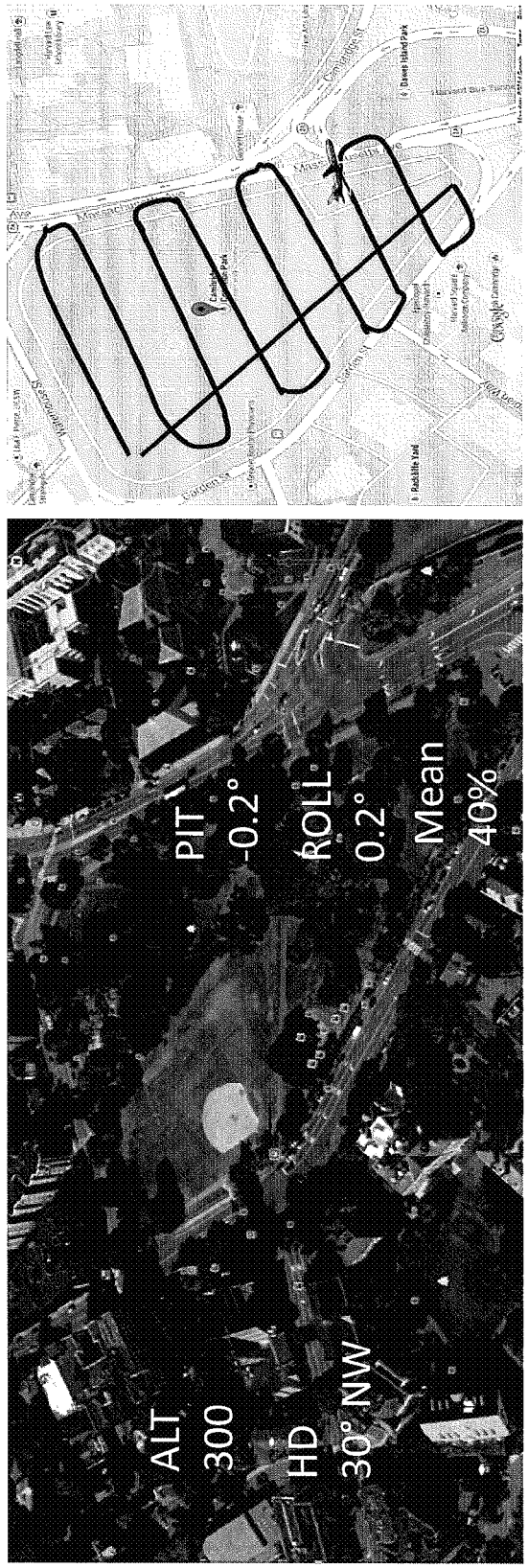
FIG. 35B is an image generated from the onboard camera of the drone of FIG. 33C when the controller system is configured for an automatic mode of operation, in accordance with some embodiments.
FIG. 35C is a view of the flight track of the drone of FIG. 33C.

FIG. 35A is an image generated from an onboard camera of the drone 3350 of FIG. 33C when the controller system is configured for a manual mode of operation, in accordance with some embodiments. FIG. 35B is an image generated from the onboard camera of the drone 3350 of FIG. 33C when the controller system is configured for an automatic mode of operation, in accordance with some embodiments. FIG. 35C is a view of the flight track of the drone 3350 of FIG. 33C.

As described above, the display device 3302 can be a Google Glass screen or the like, and can include an onboard camera. The image 3500A captured by the onboard camera of a drone, for example, described herein, is shown on the top with drone information such as altitude, heading, pitch/yaw, and image mean in percentage of the camera full dynamic range. Other information regarding the camera such as roll, pitch/yaw, and frame rate can also be displayed at the bottom of the display.

With regard to the image 3500B of FIG. 35B, as in the manual mode, the upper left corner includes the onboard camera image with drone information. Other information regarding the camera such as roll, pitch/yaw, and frame rate can also be displayed at the bottom of the display. As shown in FIG. 35C, other information can include a flight track and current position of the drone overlaying the map of the flight area. Flight track and altitude are pre-planned using GPS coordinates. The drone 3350 will fly according to the planned track at the prescribed altitude and return to the ground automatically.

In a manual mode, for example, as illustrated in FIG. 34, the user can control the pitch, yaw (heading), roll, forward, and hovering motions of the drone 3350 by putting hand gestures in the appropriated control spots in some embodiment. In some embodiments, multiple hand gestures can be employed, for example, fist, hand with thumb pointing left, and hand with thumb pointing right. The left thumb pointing gesture can be changed to right pointing gesture by rotating the arm or vice-versa. The direction of the thumb is the direction of an operation. For example, if the user wants the drone 3350 to turn left from the current direction, he/she will put one hand in control spot Y with thumb pointing left for turning left and another hand on control spot R with thumb pointing right for negative roll. The sign of the roll obeys the right hand rule. In order to turn smoothly, the drone 3350 must roll slightly. The limited number of simple hand gestures allows the algorithm short processing time. In some embodiments, more complex hand gestures can be employed.

Figure 36:
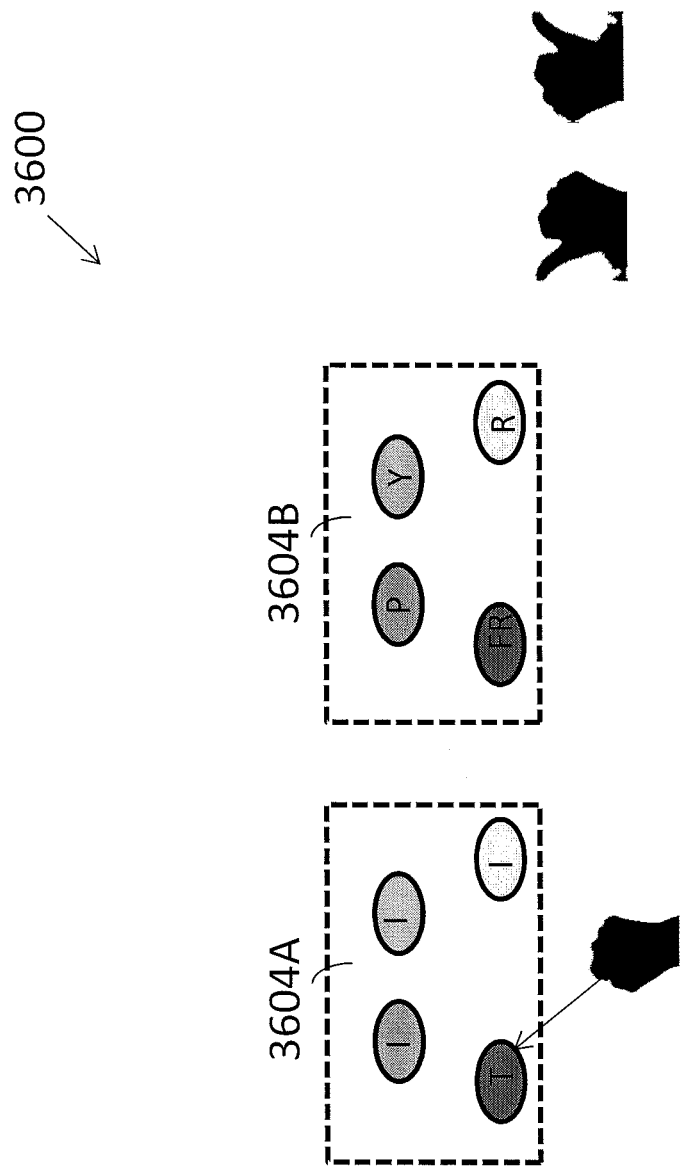
FIG. 36 is an illustration of a controller system controlling an onboard camera, in accordance with some embodiments.

FIG. 36 is an illustration of a controller system 3600 controlling an onboard camera, in accordance with some embodiments. The camera can be on the drone 3350 described with respect to FIG. 33C. The controller 3600 includes elements of a non-contact switch in other embodiments herein. Details thereof are therefore not repeated for brevity. The controllers 3604A, 3604B (generally, 3604) can be left and right controllers, respectively. Each controller 3604 can provide different control spot functions with respect to controlling an onboard camera configuration.

A plurality of control spots from the non-contact controllers 3604A, 3604B are projected on a surface. The control spots can be distinguished from each other by color, size, or other characteristic.

A predefined key can be established for associating each control spot with a particular hand gesture and corresponding command. For example, control spot Y of the right controller 3604B corresponds to a command that instructs the onboard camera to move in a yaw direction. Control spot P corresponds to a command that instructs the onboard camera to pitch. Control spot R corresponds to a command that instructs the onboard camera to roll. Control spot FR corresponds to a command that changes a frame rate of the onboard camera. When a hand gesture having a thumb extending in a left direction is placed at control spot Y, the camera is instructed to yaw to the left. When a hand gesture having a thumb extending in a right direction is placed at control spot Y, the camera is instructed to yaw to the right. When a hand gesture having a thumb extending in a left direction is placed at control spot R the camera is instructed to roll in the positive direction. When a hand gesture having a thumb extending in a right direction is placed at control spot R the camera is instructed to roll in the negative direction. When a hand gesture having a thumb extending in a left direction is placed at control spot FR, the frame rate increases. When a hand gesture having a thumb extending in a right direction is placed at control spot FR, the frame rate decreases.

Referring to the controller 3604A, control spot I corresponds to a command that instructs the camera to be inactive. Control spot LT corresponds to a command that instructs the drone 3350 to land or takeoff. Control spot T corresponds to a command that toggles the camera between automatic and manual modes and/or to change a camera configuration. When a hand gesture with left pointing thumb is positioned at control spot T, the onboard camera can be placed in a manual mode. When a hand gesture with right pointing thumb is positioned at control spot T, the onboard camera can be placed in an automatic mode. The function keys on the left controller 3604A can become inactive when a first is inserted into control spot T.

Figure 37:
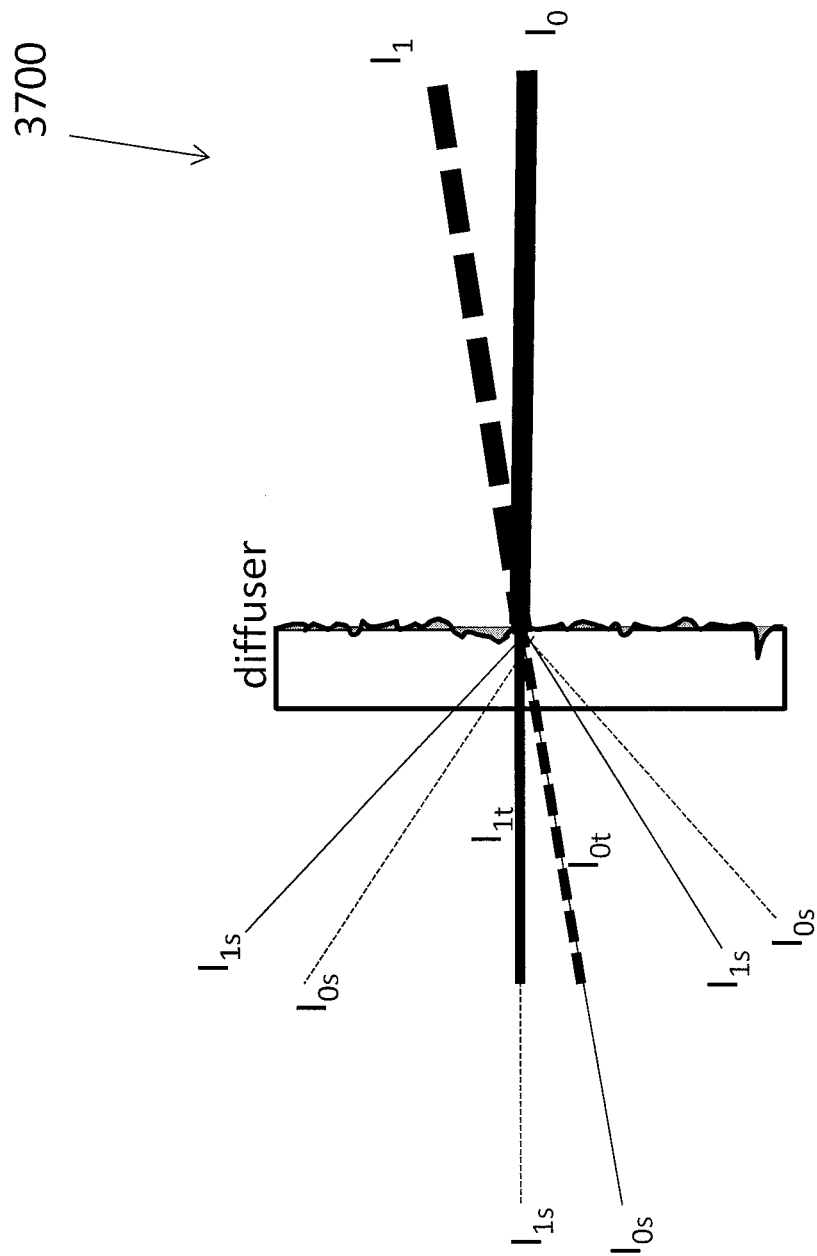
FIG. 37 is an illustration of a diffuser scattering light, in accordance with some embodiments.

FIG. 37 is an illustration of a diffuser 3700 scattering light, in accordance with some embodiments.

While non-contact switches or controllers in accordance with embodiments are often implemented for remote control applications, a diffuser-based switch in accordance with other embodiments is implemented for close proximity control applications. The diffuser 3700 scatters light into different directions. The scattering can occur in the diffuser's volume or on its surfaces. It can occur in transmission or reflection. Scattering not only scattered light out of the original direction of an incident light ray, it can also scatter light into the original direction from other light rays. As shown in FIG. 37, the unscattered transmitted light rays of incident light rays $I_0$ and $I_1$ are $I_{0t}$ and $I_{1t}$, respectively. The scattered transmitted light rays of incident light rays $I_0$ and $I_1$ are $I_{0s}$ and $I_{1s}$, respectively. As illustrated in FIG. 37, scattered light from $I_1$ is scattered into $I_{0t}$ direction. And scattered light from $I_0$ is scattered into $I_{1t}$ direction. The net result is smearing of target and background. The smearing is worsened as the target moves away from the diffuser 3700.

In FIG. 38A-D, a ground glass diffuser is positioned between a camera and object, namely, a U.S. map so that the field of view of the camera is directed at a portion of the map via the diffuser. The map is about 2 feet away from the diffuser. The region of the map behind the diffuser shows an uniform background with no detail due to smearing of the diffuser. In the region unblocked by the diffuser, map details are shown as illustrated in image 3800A of FIG. 38A. In the image 3800B shown in FIG. 38B, a hand touches the diffuser, whereby image of the hand is clearly visible although a bit blurry. In the image 3800C shown in FIG. 38C, the hand is near but does not touch the diffuser. Here, the hand is still visible but more distorted than in the image 3800B. In the image 3800D shown in FIG. 38D, the hand moves further away from the diffuser, whereby the hand has lost details. How fast the diffuser smears out details depends also on density of the diffuser grid. It is faster for denser grid and slower for less denser grid.

Figure 39:
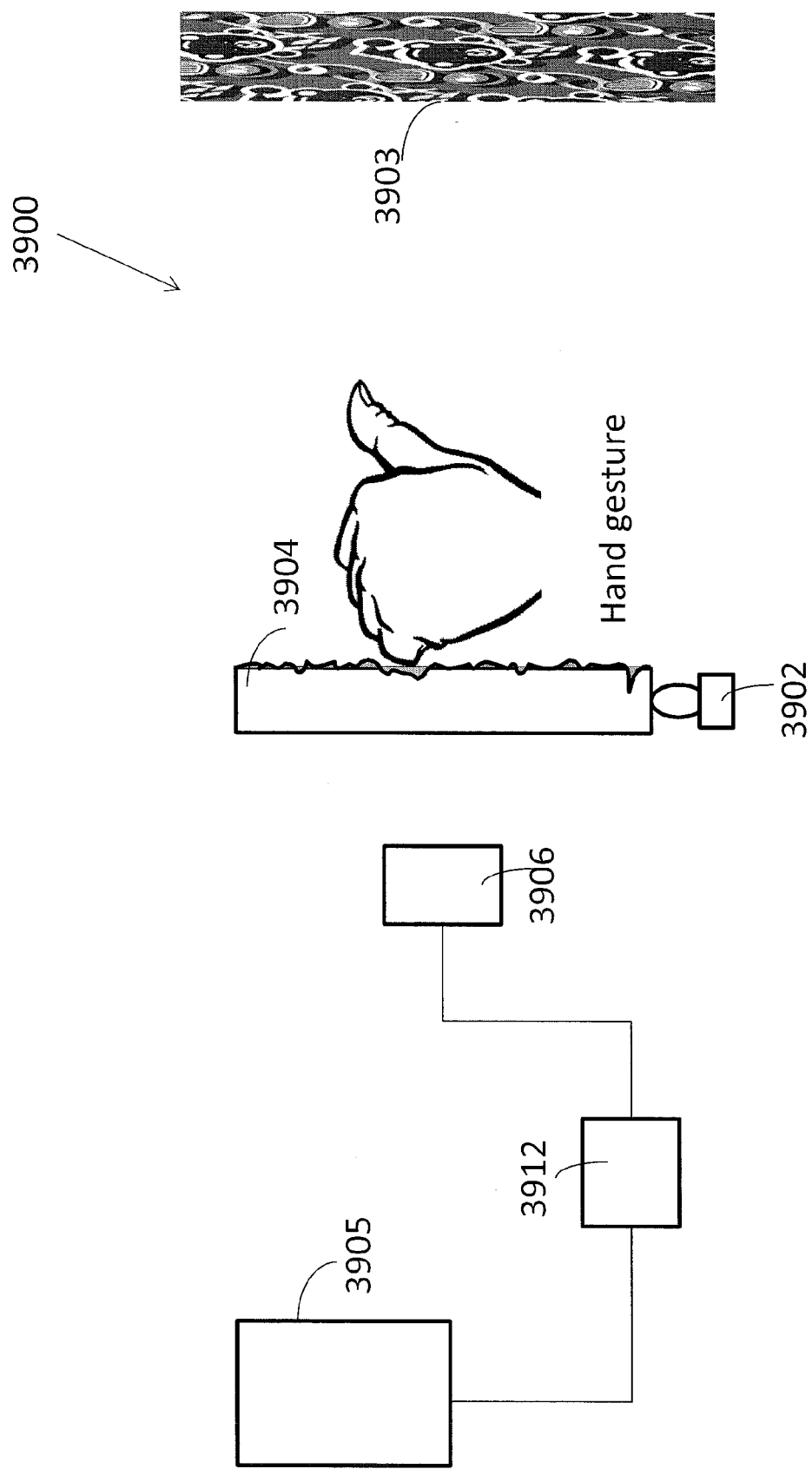
FIG. 39 is a view of elements of a switch having a diffuser, in accordance with some embodiments.

Using the smearing effect of the diffuser, a switch is constructed in some embodiment. This effect smears the details in the background while keeping the details near the diffuser. FIG. 39 shows a layout for such a switch 3900. The switch 3900 comprises a diffuser 3904, an imaging sensor 3906, a light source 3902, a processor 3912, and the device under control 3905. In some embodiment, the light source 3902 can illuminate a target from either side of the diffuser 3904. For side illumination, a light guide is usually used in conjunction with the diffuser 3904. When a hand touches or is near the diffuser 3904, the image only shows the hand. The background is blurred out. The processor 3912 can process the hand gesture image and send a command to the device under control 3905 based on hand gesture information, for example, described in other embodiments herein. In some embodiments, two imaging sensors 3906 can be used.

FIG. 40A is a top view of a switch 4000 having a diffuser, in accordance with some embodiments. FIG. 40B is a side view of the switch 4000 of FIG. 40A.

A plurality of control spots are formed by a diffuser 4004 in some embodiments. When user's hand is placed on the control spots, this indicates that the user intends to control the device in communication with the switch 4000. In some embodiments, color control spots are placed on the diffuser 4004. The control spots can be generated by color filters 4006 coated or mounted on the surfaces of the diffuser 4004 in some embodiments. In other embodiments, the control spots can be generated by shining color lights on the control spots. The control spots correspond to function key positions, for example, similar to other embodiments herein.

Figure 41:
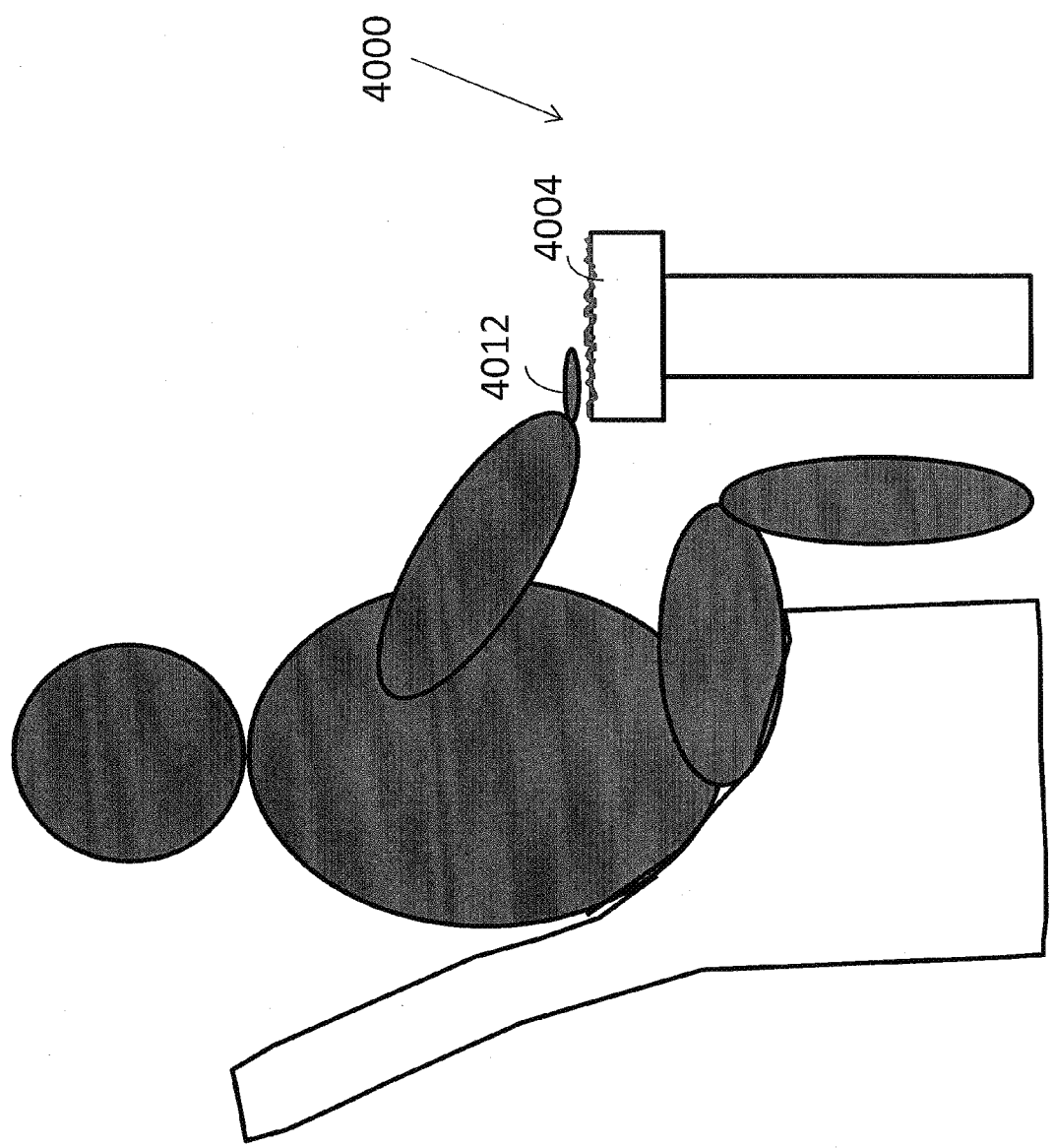
FIG. 41 is an illustration of an operator using a diffuser-based controller, in accordance with some embodiments.

The switch 4000 can be useful for machine operation and video gaming in some embodiments. For example, the non-contact controllers 3200 in FIG. 32 can be replaced by two diffuser based controllers: one positioned at the left side of a driver's seat, the other at the right side. The functions keys of the switch 4000 can be the same as those of other switches or controllers described herein except the control spots are located on the surfaces of the diffuser 4004. Same hand gestures can be used except imaging sensors 4010 are implemented instead of cameras. In this example, the joysticks described in FIG. 32 can be replaced by diffuser based switch/controllers in some embodiments. Joystick functions can be assigned to control spots and hand gestures. FIG. 41 is an illustration of an operator using the diffuser-based controller 4000 of FIG. 40, in accordance with some embodiments. In replacing the controllers 3200 of FIG. 32, two diffuser-based controllers 4000 can be provided, one for each hand. A hand gesture 4012 is positioned at the diffuser 4004, under which one or more control spots are provided corresponding to various function key positions.

In some embodiment, one of the control spot can be reserved for a tracking mode. When user's hand is placed over this control spot, all other control spots are inactive. A sensor is provided to for tracking a user's hand motion. Tracking will stop when the user inserts a particular hand gesture over the same control spot. Hand tracking can be used in beam steering control in some embodiments. It can also be employed as a mouse for a computer in some embodiments.

Figure 42:
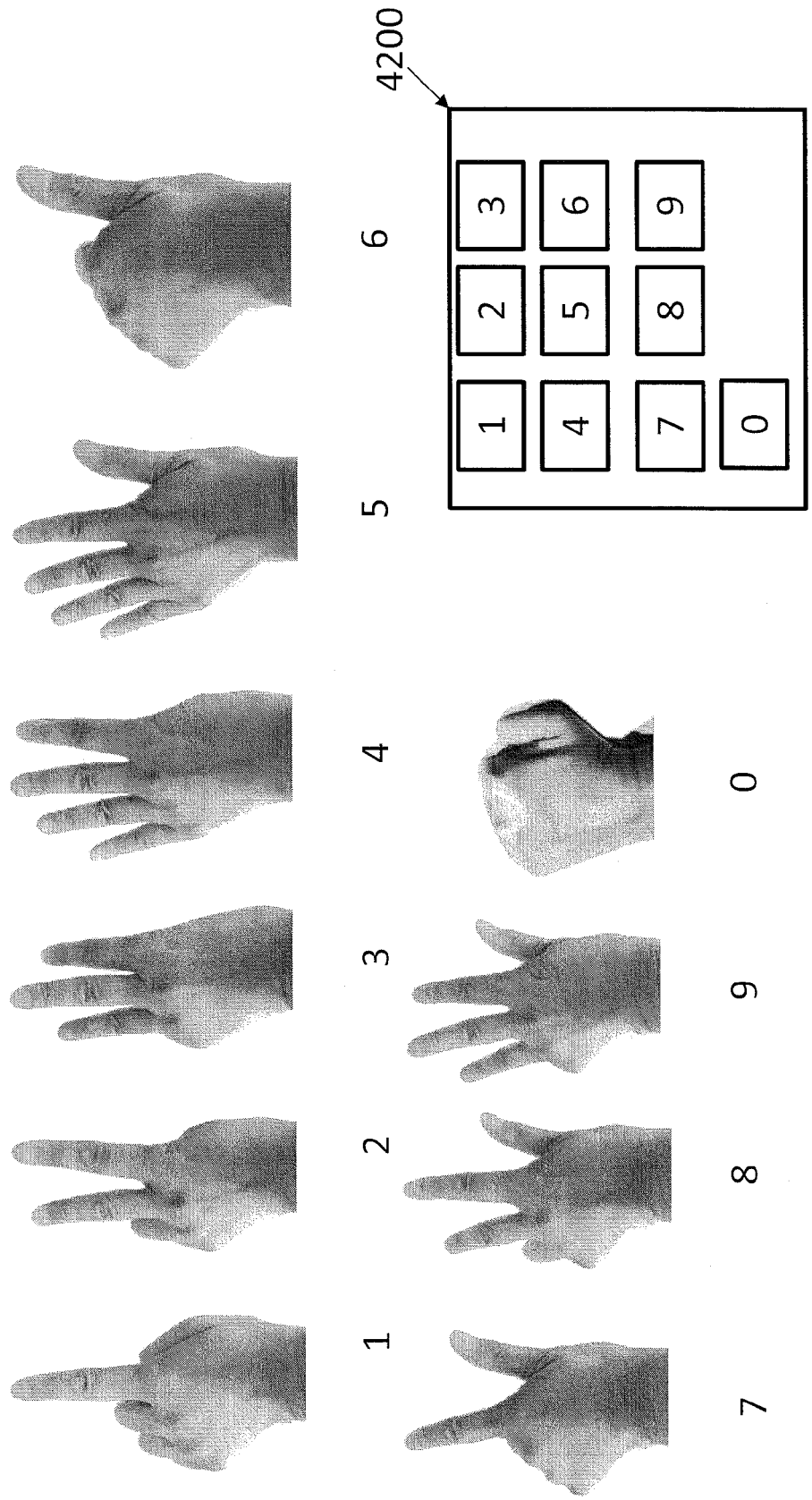
FIG. 42 are views of hand gestures representing combination lock integers, in accordance with some embodiments.

A combination lock used combination of integers to lock and unlock. Hand gestures can be used to represent these integers as illustrated in FIG. 42 in some embodiments. The number panel of a combination lock 4200 is also shown in FIG. 42. In some embodiments, hand gestures can be used to lock and unlock a door or any device.

Figure 43:
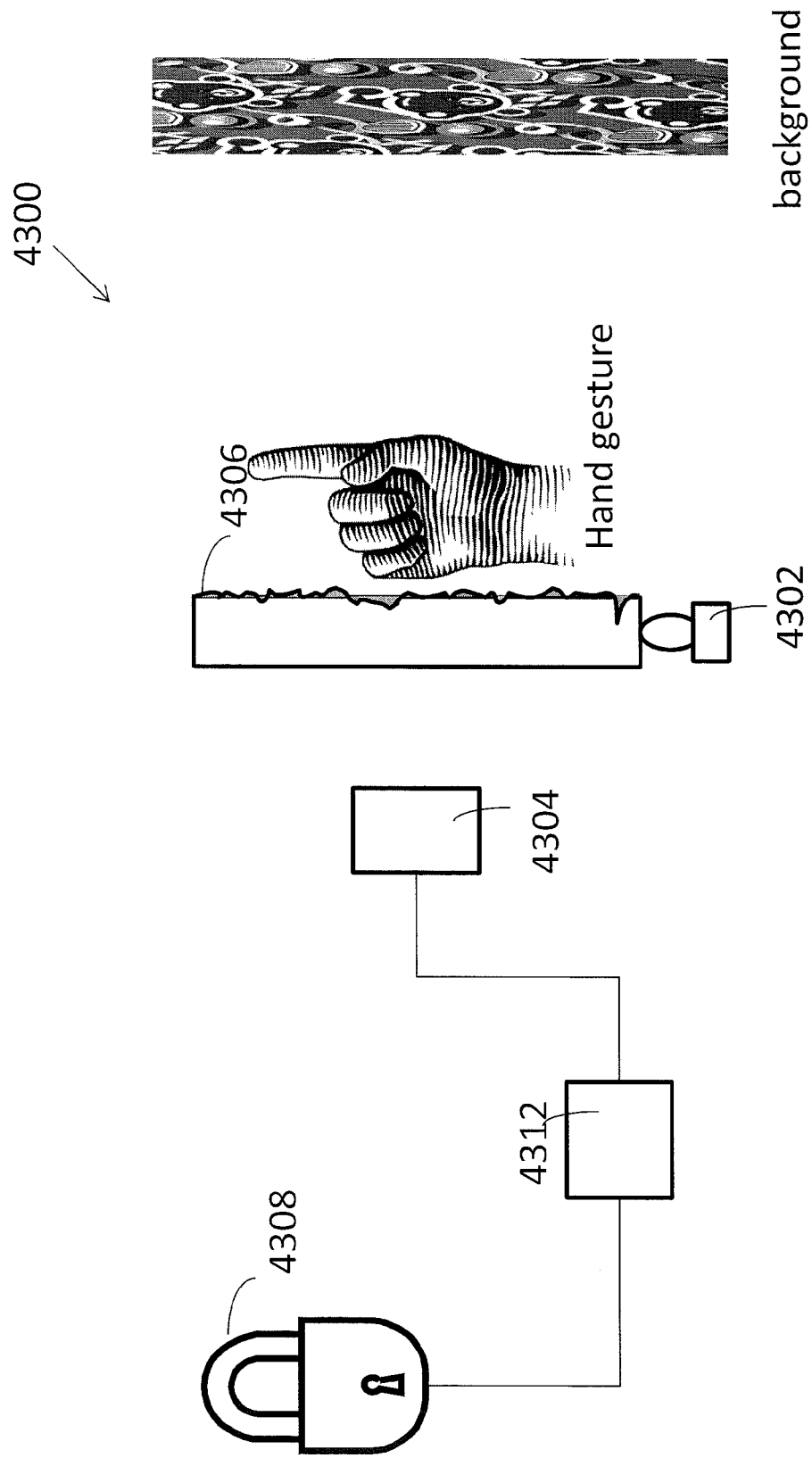
FIG. 43 is an illustration of a diffuser-based hand gesture lock mechanism, in accordance with some embodiments.

FIG. 43 is an illustration of a diffuser-based hand gesture lock mechanism 4300, in accordance with some embodiments.

In some embodiment, the hand gesture lock mechanism 4300 can comprise of a light source 4302, an imaging sensor 4304, a diffuser 4306, and a processor 4312, which are the same as or similar to those of other switches and controllers herein. A description thereof is not repeated for brevity. An electromechanical locking/unlocking mechanism 4308 is also provided. For example, if the combination is 5912, then a hand gesture of 5 fingers is placed near or on the diffuser first, followed by a "pinkyless" hand gesture, proceeded by index finger hand gesture. Index and middle fingers hand gesture is the last hand gesture. Processor 4312 can process the images and generate a command to the electromechanical locking/unlocking mechanism 4308 to unlock the door. The background shown in FIG. 43 is not seen by the imaging sensor because it is smeared out due to its distance from the diffuser.

While the present inventive concepts have been particularly shown and described above with reference to exemplary embodiments thereof, it will be understood by those of ordinary skill in the art, that various changes in form and detail can be made without departing from the spirit and scope of the present inventive concepts.

What is claimed is:

1. A non-contact sensing device, comprising:
  a sensor comprising a plurality of function key sensors having a plurality of non-overlapping field of views (FOVs), each FOV corresponding to a different function key;
  a function key sensor of the plurality of function key sensors constructed and arranged to detect a presence of a body part at in its field of view, and to generate a function key control signal in response to detecting the body part at the field of view, wherein the body part of a user activates a function key to which the FOV of the function key sensor corresponds without the user physically touching the function key;
  a processor that receives and processes the function key control signal and outputs a command according to an assigned task of the function key sensor to a remote apparatus under control of the non-contact sensing device in response to the processed function key control signal, wherein the processor further stores data of the function key for identifying the function key and associating the function key with the assigned task of the function key sensor; and
  a control spot generator that illuminates the non-overlapping FOVs corresponding to the function keys to visually distinguish the different function keys.

2. The non-contact sensing device of claim 1, further comprising one or more cameras that recognize a hand gesture, wherein the command is generated from a combination of a function key control signal corresponding to the function key sensor and the recognized hand gesture.

3. The non-contact sensing device of claim 1, wherein the sensor is a staring sensor comprising a detector array that includes a combination of the function key sensors and non-function key sensors, the staring sensor generating all image pixels of the detector array simultaneously.

4. The non-contact sensing device of claim 1, wherein the sensor is a scanning sensor that scans a portion of a field of view at a time.

5. The non-contact sensing device of claim 1, wherein the sensor includes a scan mirror that scans all function key sensors and only the non-function key sensors in the path of the scan to shorten the data acquisition time.

6. The non-contact sensing device of claim 1, wherein the sensor is constructed and arranged as an emissive mode sensor comprising a thermal sensor that collects thermal radiation emitted from the hand or other body part.

7. The non-contact sensing device of claim 1, wherein the sensor is constructed and arranged as a reflective mode sensor comprising a color sensor that collects color light reflected from a hand or other body part.

8. The non-contact sensing device of claim 1, wherein the control spot generator generates a control spot that is aligned with the field of view of the function key sensor, and wherein the function key sensor detects a hand or body part within the control spot.

9. The non-contact sensing device of claim 1, further comprising a beamsplitter positioned between the sensor and the control spot generator, wherein light beams outputted from the control spot generator directed at the beamsplitter coincide with the field of views of the function key sensors.

10. The non-contact sensing device of claim 1, wherein the function key corresponding to the function key sensor distinguished from other function key sensors is identified by positioning a ground truth target at the control spot among a plurality of control spots and collecting by the non-contact sensing device an image of the ground truth target, wherein a pixel or group of pixels at the sensor having a highest detector output is identified as the current function key.

11. The non-contact sensing device of claim 1, wherein the control spot generator comprises a white light emitting diode (LED), a control spot generator plate having a plurality of color filters, and a lens, wherein color light is generated from the color filters when the white LED illuminates, and wherein a plurality of control spots are generated.

12. The non-contact sensing device of claim 11, wherein each color control spot is aligned with a field of view of a function key sensor.

13. The non-contact sensing device of claim 1, wherein the control spot generator comprises a plurality of color LEDs, light pipes, a light pipe mounting plate, and a lens, wherein the color LEDs are placed at the input ends of light pipes and the output ends of light pipes are placed at the focal plane of the lens, thereby generating control spots of different colors that each illuminate a field of view of a different function key sensor, and wherein the light pipe plate holds the light pipes together at the focal plane of the lens.

14. The non-contact sensing device of claim 1, wherein the remote apparatus comprises a plurality of devices, and wherein the processor generates a device number for a device of the plurality of devices, each device number corresponding to a different hand gesture at a designated control spot, thereby allowing a user to choose what device to operate.

15. The non-contact sensing device of claim 1, wherein a hand gesture at a chosen control spot corresponding to a function key triggers a tracking mode in which a camera tracks hand gesture motion commands for controlling one or multiple apparatuses, wherein in the tracking mode all function keys except the chosen one become inactive, and the processor will not process signals from these function keys, and wherein when exiting the tracking mode, a stop hand gesture can be inserted into the chosen control spot, wherein the other function keys become active again.

16. The non-contact sensing device of claim 1, wherein the sensor is a color sensor comprising color filters on a rotating wheel in front of the sensor, wherein an image of a scene is taken for each color filter, and wherein function key pixels of color images are processed by the processor to determine if a skin color spectrum is detected.

17. The non-contact sensing device of claim 1, wherein the sensor is a color sensor comprising a color camera, and wherein function key pixels of color images are processed to determine if a skin color spectrum is detected.

18. The non-contact sensing device of claim 1, wherein the processor distinguishes the function key sensor from other function key sensors of the plurality of sensors from the function key positions stored in the processor during a function key identification calibration process.

19. The non-contact sensing device of claim 1 further comprising a head mounted display collocated with the sensor, the display providing visual information regarding an operation of the remote apparatus.

20. The non-contact sensing device of claim 19, wherein the remote apparatus is a drone, and wherein the non-contact sensing device is constructed and arranged to control the operation of the drone, and wherein the head mounted display displays a combination of flight information, onboard camera images, and other information regarding the operation of the drone.

21. The non-contact sensing device of claim 1, a camera captures image data corresponding to the hand gesture and the processor converts the captured image data into a cursor command signal that controls a cursor at a display.

* * * * *